US009581962B1

(12) United States Patent
Duffy

(10) Patent No.: US 9,581,962 B1
(45) Date of Patent: Feb. 28, 2017

(54) METHODS AND SYSTEMS FOR GENERATING AND USING SIMULATED 3D IMAGES

(71) Applicant: John Paul Duffy, Toronto (CA)

(72) Inventor: John Paul Duffy, Toronto (CA)

(73) Assignee: ARHT Media Inc., Toronto (CA)

(*) Notice: Subject to any disclaimer, the term of this patent is extended or adjusted under 35 U.S.C. 154(b) by 0 days.

(21) Appl. No.: 15/076,681

(22) Filed: Mar. 22, 2016

Related U.S. Application Data

(60) Provisional application No. 62/258,172, filed on Nov. 20, 2015.

(51) Int. Cl.
*G03H 1/00* (2006.01)
*G03H 1/08* (2006.01)
*G03H 1/26* (2006.01)
*H04N 7/18* (2006.01)

(52) U.S. Cl.
CPC ......... *G03H 1/0005* (2013.01); *G03H 1/0891* (2013.01); *G03H 1/26* (2013.01); *H04N 7/183* (2013.01); *G03H 2001/0088* (2013.01)

(58) Field of Classification Search
CPC .... H04N 7/183; G03H 1/0005; G03H 1/0891; G03H 1/26; G03H 2001/0088
See application file for complete search history.

(56) References Cited

U.S. PATENT DOCUMENTS

| | | | |
|---|---|---|---|
| 5,865,519 A | 2/1999 | Mass | |
| 6,366,370 B1 * | 4/2002 | Holzbach | G03H 1/26 345/427 |
| 7,883,212 B2 | 2/2011 | O'Connell et al. | |
| 8,172,400 B2 | 5/2012 | O'Connell et al. | |
| 8,284,119 B2 | 10/2012 | Kim et al. | |
| 8,328,361 B2 | 12/2012 | O'Connell et al. | |

(Continued)

FOREIGN PATENT DOCUMENTS

IN   5639CH2013 A   6/2015

OTHER PUBLICATIONS

International Search Report issued Jan. 27, 2016 in International (PCT) Application No. PCT/CA2015/000554.

*Primary Examiner* — Jay Patel
*Assistant Examiner* — Marnie Matt
(74) *Attorney, Agent, or Firm* — Bajwa IP Law Firm; Haris Zaheer Bajwa

(57) ABSTRACT

A three-dimensional image simulation device for managing a live event comprising an image capturing device for capturing live captured data corresponding to a presenter and generating, in real-time, hologram data based on the live captured data. An output interface for broadcasting the hologram data in real-time to at least one additional location containing an audience, wherein the hologram data is used to create a hologram of the presenter at the at least one additional location based on an apparent parallax effect in a simulated three-dimensional display device, the hologram creating a three-dimensional illusion for the audience regarding actual presence of the presenter at the at least one additional location. Furthermore, an input interface for receiving audience data from the at least one additional location regarding interaction between the hologram and the audience and a display device for displaying images based on audience data to the presenter.

9 Claims, 35 Drawing Sheets

(56) References Cited

U.S. PATENT DOCUMENTS

| | | | |
|---|---|---|---|
| 8,711,061 B2 | 4/2014 | Reichow et al. | |
| 2004/0183901 A1* | 9/2004 | Belliveau | H04N 13/0459 348/131 |
| 2006/0279815 A1* | 12/2006 | Rathus | G03H 1/0005 359/1 |
| 2011/0157297 A1* | 6/2011 | O'Connell | G03B 15/02 348/14.07 |
| 2011/0199373 A1 | 8/2011 | Liu et al. | |
| 2011/0242295 A1 | 10/2011 | Yue | |
| 2011/0249087 A1* | 10/2011 | Tsang | G03H 1/2294 348/40 |
| 2013/0300728 A1 | 11/2013 | Reichow et al. | |
| 2013/0329985 A1 | 12/2013 | Helin | |
| 2013/0335505 A1 | 12/2013 | O'Connell | |
| 2014/0229866 A1* | 8/2014 | Gottlieb | H04L 65/403 715/758 |
| 2014/0235362 A1 | 8/2014 | Fox et al. | |
| 2014/0340490 A1 | 11/2014 | Duffy et al. | |
| 2014/0368624 A1 | 12/2014 | Na et al. | |
| 2015/0304603 A1* | 10/2015 | Yoon | H04W 76/028 348/14.07 |

* cited by examiner

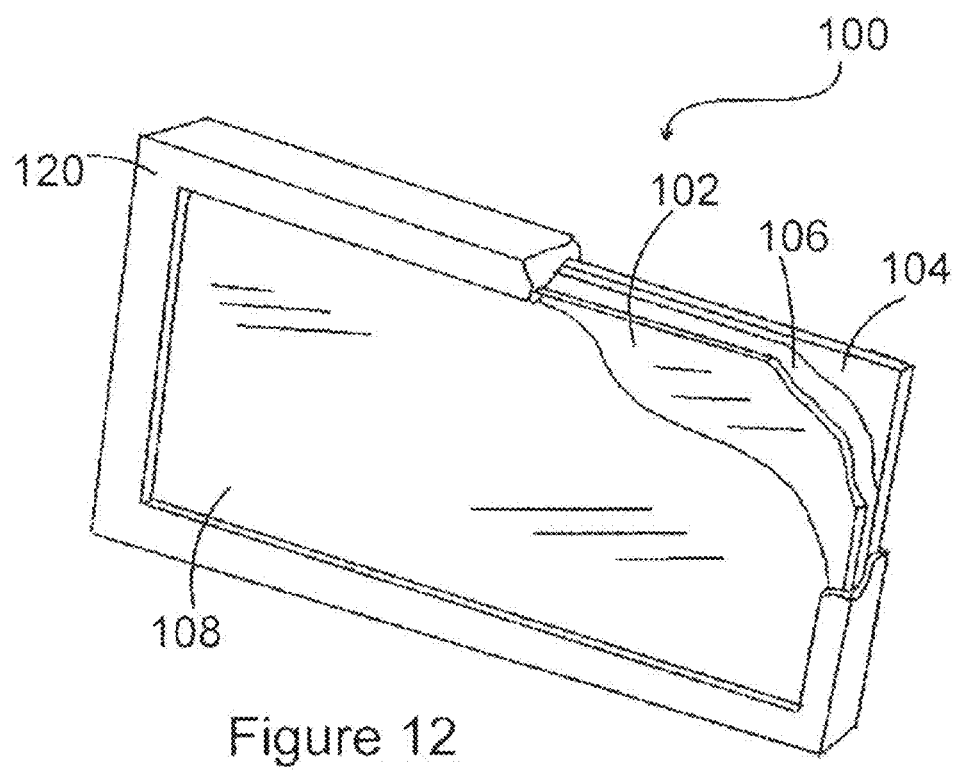
Figure 12
Figure 13
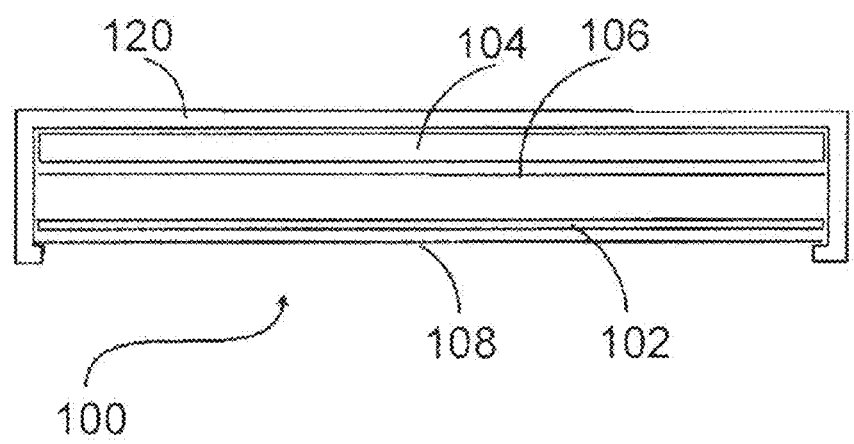

METHODS AND SYSTEMS FOR GENERATING AND USING SIMULATED 3D IMAGES

PRIORITY

This application claims the benefit of priority from U.S. Provisional Application No. 62/258,172, filed Nov. 10, 2015, entitled "Methods and Systems for Generating and Using Simulated 3D Images," which is hereby incorporated herein by reference in its entirety.

TECHNICAL FIELD

This invention relates to projection apparatus, and in particular the invention relates to a projection apparatus which is portable and scalable, and which is used in a manner so that a viewer will see a video presentation which comprises a simulated three dimensional (3D) image comprising a virtual image which is seen against a background wherein the background may contain a further image which varies in a programmed manner in keeping with the actions being portrayed by the virtual image.

This invention also relates to a low profile, simulated three dimensional (3D) display device having improved picture quality and appearance, and which is both portable and scalable. The display device is adapted to display a simulated 3D video presentation which comprises a simulated 3D image comprising a virtual image on a front display, which is seen against a background display, wherein the background display may contain a further image which varies in a programmed manner in keeping with the actions being portrayed by the virtual image. Preferably, the present invention relates to apparatus and devices which may be employed in theatrical, educational, medical, or other live event presentations, for example, and more particularly in advertising or other presentations which are intended to promote and/or extol the features and advantages of any product or service being offered for sale.

The invention also relates to methods and systems for generating and broadcasting, in real-time, simulated three dimensional (3D) images of a human being for the purpose of remotely hosting a live event.

The invention also relates to methods and systems for capturing user interaction data with the simulated three dimensional (3D) image, and generating customized and targeted advertisement data based on the captured and/or predetermined user data.

The invention also relates to methods and systems for adjusting, in real-time, the simulated three dimensional (3D) image in response to the detection of user movement of a user that may be interacting with the simulated three dimensional (3D) image. The invention also relates to methods and systems for providing a wearable and interactive experience by generating the three dimensional (3D) image and additional content in a portable and scalable format.

BACKGROUND

The present disclosure finds its genesis in a theatrical illusion which is widely known as "Pepper's ghost". In this illusion, a viewer is made to believe that he is seeing an article which does not, in fact, exist in the setting or circumstances being viewed. The techniques involved in presenting Pepper's ghost are described hereafter. However, for now, a brief description and history of Pepper's ghost is provided.

In order for the classical Pepper's ghost illusion to work properly, the viewer must see clearly into a main setting, but not see into a hidden room. Unknown to the viewer, the viewer is also viewing the main setting through an angled piece of glass which, because of its placement, may be both translucent and reflective. By changing the lighting in the hidden room, the viewer may view a reflection of the lit contents of the hidden room, on the glass panel. Thus, the illusion is controlled by its illumination, and will appear and disappear when the lighting of the object, person, or the like, is turned on or off, respectively. As a result, an object or person which is reflected in the "mirror" section of the glass (e.g. the reflective surface of the glass) may seem to appear or disappear, or change into another object. While this illusion is over 100 years old, the same effect has been employed since at least the 1960's in certain modern theme parks, where objects such as reflected animated props may create the appearance of translucent "ghosts" which appear to be moving through a particular setting and interacting with props in that physical particular setting. Moreover, the images appear to be three dimensional and demonstrate a parallax effect with respect to other items on the stage.

Typically, in recent applications, a polymeric film, drawn tight within a metal frame, is used to replace the glass panel, and a projection device is used to create the image to be displayed on the polymeric film. Construction of the film and associated frame, and the projectors to be used, are well known in the art, and outside of the scope of the present invention.

As an example, U.S. Pat. No. 8,172,400 (O'Connell et al.) describes a projection apparatus which requires a first projection device that is arranged to generate a virtual three dimensional object by projection of the image onto to a reflected/translucent polymer film. A second projection device projects a background image; and a light source projects light onto the virtual three dimensional image. A stage arrangement may also be provided, which is placed behind the screen, upon which a presenter or actor, or a prop, or both, may be located, in order that the presenter or prop, interact with the virtual image.

In more recent applications, such as those described in US Patent publication No. US 2013/0300728 (Reichow et al.), the polymeric film or glass panel showing the reflection is replaced by a transparent front display device, such as an transparent LCD display device. In this approach, the reflective surface with its projected image, is no longer required since the virtual image may be displayed directly on the transparent front display. A background display device is positioned visually behind the transparent front display, and a background image is shown or projected directly on the background display device. The images shown on the background display device may be coordinated with the images on the transparent front display in order to create an apparent parallax effect which provides images which are similar to images from the Pepper's Ghost technique.

Additional display panels may be provided between the front display and the background display, in order to provide additional image content. However, for simplicity, the use of a two panel approach will be discussed in the present document.

Current uses of this simulated 3D presentation technique may include, for example, the display of advertising materials in a simulated 3D environment, or the simultaneous presentation of a speech to numerous groups in many different locations, using a virtual image. Other applications have included providing a virtual performance by a performer, even though, in some cases, the performer is no longer alive.

However, unless a visual "ghost" effect is desired, it has typically been necessary to employ a black background surface behind the virtual image so as to avoid any background image showing through the virtual image. This is because if the viewer were to see the background image through the front image, it would destroy the "holographic" effect of the virtual image.

More recently however, the background image is adjusted so as to be coordinated with the transparent front image so that the two images are mated one to the other. As an example, a blacked-off "masked" area may be provided on the background display which masked image moves and/or is otherwise coordinated with the image on transparent front display so as to minimize or eliminate the background image from bleeding through the image on the front display.

In order to provide a simulated 3D effect using a front panel and a background panel (or any additional intermediate display panels), it is necessary to provide at least some distance between the transparent front display and the background display. This distance typically varies depending on the size of the display, and is used to create the parallax effect.

A common problem with this approach is that the light from the background panel is used to provide the lighting effect on the front panel. As such, with normal background panels and projection apparatuses, the combined 3D image is dark and/or dull, and is typically only useful in darkened display areas. While this is acceptable in some display areas, it is not practical for use in well-lit areas, such as in outdoor displays, or displays in a mall setting.

To address this issue, the prior art displays may be enclosed in a box so as to minimize the amount of ambient light that falls on the screen. However, these boxes require a relatively large profile, which increases the overall size of the screen, and thereby, limit their use in commercial applications. Also, because of the darkened box approach, typically only those standing directly in front of the box display may see the images on the screen. Thus, the ability to show the images to a larger group of people is limited.

A further problem with prior art display systems is the creation of an undesirable visual effect, call moire, wherein false patterns are observed in the final image, as a result of interaction between the visual display lines from the images on the front and background panels. These typically appear as a pattern of roughly parallel lines, or the like. This leads to unacceptable image quality, and is particularly prevalent in systems having lower image quality, or low resolution, display systems. Using higher resolution screens may therefore be expected to reduced the amount of moire observed in the combined image, however, this leads to an increased cost for the simulated 3D screen apparatus.

As such, it would be beneficial to provide a simulated 3D display device of the type described herein, wherein the screen apparatus is capable of being used in higher lighting situations. Furthermore, it would be beneficial to also provide a simulated 3D display device, having a low profile. Still further, it would be beneficial to also provide a simulated 3D display device which has been modified to reduce and/or ameliorate the moire effect, observed in other simulated 3D projection devices.

The present inventors have unexpectedly discovered that the at least some of these benefits may be provided in a novel, low profile simulated 3D display device, which may be viewed simultaneously by a plurality of viewers, in normal ambient lighting conditions.

SUMMARY

An object of the invention is to provide new and improved methods and systems for generating and using simulated 3D display images. The following presents a simplified summary of exemplary embodiments of the present disclosure in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter.

In an exemplary embodiment, a three-dimensional image simulation device, at a first location, for managing a live event, comprising an image capturing device for capturing live captured data corresponding to a presenter, a processor for generating, in real-time, hologram data based on the live captured data, an output interface for broadcasting the hologram data in real-time to at least one additional location containing an audience, wherein the hologram data is used to create a hologram of the presenter at the at least one additional location based on an apparent parallax effect in a simulated three-dimensional display device, the hologram creating a three-dimensional illusion for the audience regarding actual presence of the presenter at the at least one additional location, an input interface for receiving audience data from the at least one additional location regarding interaction between the hologram and the audience, and a display device for displaying the audience data to the presenter.

In another exemplary embodiment, a simulated three-dimensional display device, at a first location, for displaying a live hologram, comprising, an input interface for receiving, in real-time, data representing a live hologram of a presenter, wherein the data is based on live captured data corresponding to the presenter who is present at a second location, a processor for generating a live hologram of the presenter based on the received data, a display device for displaying the live hologram to an audience by creating an apparent parallax effect, the hologram creating a three-dimensional illusion for the audience regarding actual presence of the presenter at the first location, an image capturing device for capturing, in real-time, audience data regarding interaction between the hologram and the audience, and an output interface for transmitting the audience data from the first location to the second location, wherein the audience data includes at least one image that is presented to the presenter at the second location.

In another exemplary embodiment, a method for managing a live event from a first location, comprising capturing, at the first location, live captured data corresponding to a presenter and generating, in real-time, hologram data based on the live captured data. The method further comprising broadcasting the hologram data in real-time to at least one additional location containing an audience, wherein the hologram data is used to create a hologram of the presenter at the at least one additional location based on an apparent parallax effect in a simulated three-dimensional display device, the hologram creating a three-dimensional illusion for the audience regarding actual presence of the presenter at the at least one additional location, receiving audience data from the at least one additional location regarding interaction between the hologram and the audience, and displaying images based on the audience data to the presenter.

In another exemplary embodiment, a method for displaying a live hologram at a first location of a presenter that is present at a second location, comprising receiving, in real-time, data representing a live hologram of a presenter, wherein the data is based on live captured data corresponding to the presenter who is present at the second location, generating a live hologram of the presenter based on the received data, displaying the live hologram to an audience by creating an apparent parallax effect, the hologram creating a three-dimensional illusion for the audience regarding actual presence of the presenter at the first location, capturing, in real-time, audience data regarding interaction between the hologram and the audience, and transmitting the audience data from the first location to the second location, wherein the audience data is presented to the presenter at the second location.

In another exemplar embodiment, a simulated 3D display apparatus comprising a front display device having side edges, arranged to project a first image of a first program material towards a viewer, and a background display device having side edges, arranged to project a second image, as needed, of a second program material towards a viewer, wherein said front display device and said background display device are separated to provide an apparent parallax effect between said first image and said second image, and wherein said background display device is sized so as to extend beyond the side edges of the front projection device.

In a further embodiment, the background display device is curved or angled so as to extend towards the plane of the front projection device. In a most preferred embodiment, the edges of the background display device extend essentially to the plane of the front display device.

The front display device discussed in the embodiments and shown in the Figures can be any suitable display device which can include a prior art reflective film or glass onto which an image is projected from either the front of the rear. For example, the front display device can be a projection screen, such as a scrim screen, or a screen that is made out of mesh-like pvc, or glass-like material. More preferably however, the front display device is a transparent display device, and most preferably, the front display device is a flat panel, transparent LCD display device. The flat panel of the front display device creates a plane which extends beyond the edges of the front display panel, and thus provides an extended plane of the front display panel.

The background display device discussed in the embodiments and shown in the Figures can also be any suitable display device, which can include a screen onto which an image can be projected (either from the front or rear). For example, the background display device can be a projection screen, such as a scrim screen, or a screen that is made out of mesh-like pvc, or glass-like material. Most preferably, the background display device is a display device such as a television screen or monitor. These can include any suitable display devices, but preferably, flat panel display devices such as LCD, plasma, LED, OLED, and the like, are used.

The background display device can also be provided by a plurality of display devices, wherein each of the display devices is preferably a television or a monitor. This can include televisions or monitors that are rear projection devices, but more preferably, the rear screen is chosen from the group consisting of a planar television tube, a planar plasma television display, a planar LCD television display, a planar LED television display, and a planar OLED television display. Other display devices might also be used as the rear screen, and the skilled artisan will be aware that their use is not precluded from the present invention.

Where a plurality of display devices are used, the background display can comprise a plurality of devices which are arranged to provide a completed background display. For example, 4 devices can be arranged in a planar 2×2 grid. Other arrangements are possible, and these can include 3×3 grids, 4×4 grids, 2×3 grids, 3×2 grids, or any other suitable arrangement.

Other types of projector devices can also be utilized, as well as combination of different display devices.

In a first embodiment, the background panel is parallel to, and co-planar with the front display panel, but extends beyond the sides of the front panel display. Preferably, the background panel extends at least 5% beyond the edge of the front display device (based on the width of the front display device). More preferably, the background display device extends at least 10%, and more preferably, at least 20% beyond the side edges of the front display device.

Preferably, the background display device extends beyond the front display device on at least two sides, but extending the background display beyond the edges of the front display device, on all four sides is not excluded from the present invention. As such, in one embodiment, the front display device is a given size of display panel, and the background display panel is selected so as to larger than the front display panel, and thus extend beyond the edges of the front display panel.

With this approach, a viewer who views the image on the front display panel on an angle, will still view an image on the outer edges of the background panel.

In a more preferred embodiment, the background panel is curved or angled such that the outer edges of the background panel extend towards the extended plane of the front display panel.

The background display can be a curved panel display device, wherein at least the edges of the display device can be curved towards the extended plane of the front display panel. Most preferably, the background display is provided as a flexible display device which is placed so as to provide a continuously curved display panel behind said front display device.

The background display can also be comprised of a plurality of panels configured to provide a suitable display. As examples, the background display could be a flat panel display device which is parallel to the front panel, and also having additional background display panels at its edges which are angled towards the extended plane.

The background display device might also be two flat panel display devices, both angled with respect to the front display panel, wherein the outer edges of the background display devices extend towards the extended plane.

The background display devices have at least a portion that extends towards the extended plane of the front display device. As a result, the edges of the background display device extends towards the extended plane of the front display by a distance which is at least 25% of the maximum distance between the front and background display devices. More preferably, the background device display devices extend to at least 50%, and more preferably, at least 75% of the maximum distance of between the front and background display devices.

In some embodiments, the edges of the background display devices can extend so as to essentially intersect the extended plane of the front display panel, and thus, the background display devices extend 100% of the maximum distance between the front and background display devices.

The front and background display device are preferably vertically orientated with respect to the viewer, although this is not required. Moreover, the background display device is preferably vertically aligned, in at least one direction, with respect to the front display device. Thus, in one direction (e.g. up and down), the background display device is a constant distance from the front display panel, even though in another direction (left and right) the distance between the front and background display devices, is changing.

The background display device can also extend beyond, and be curved, towards the front display device, on all four sides. This could be accomplished by, for example, having a background display device with a central panel, which is surrounded by four display devices angled towards the extended plane of the front display device.

The size of the front and background panels can vary, as can the distance between them depending on their size.

Additional transparent display devices can be positioned between the front and background display devices. The edges of these additional devices can also extend beyond the edges of the front display device, but this is not required. Commonly the number of additional transparent display devices will be between 1 and 10, and most preferably, the number of additional transparent display devices will be between 1 and 3.

In another aspect, the present invention provides a low profile, simulated 3D display device comprising a transparent front display device, arranged to display a first image of a first program material which is to be observed by a viewer, and a background display device arranged to display a second image of a second program material which is to be observed by a viewer, wherein said front display device and said background display device are separated to provide an apparent parallax effect between said first image and said second image, and wherein said background display device is a high-brightness video display device.

Preferably, the high-brightness display device has a brightness of at least 1500 candelas per square meter, more preferably of more than 1750 candelas per square meter, and still more preferably, has a brightness of at least 2000 candelas per square meter ($cd/m^2$). For comparison, typical high-definition televisions currently range from 450 to about 1000 $cd/m^2$.

At this lighting level, the background display device is able to display not only its own image, it is able to light the image from the front display device, which typically, has no inherent emissive light qualities. Moreover, at this lighting level, the high-brightness video display device provides sufficient light to produce a bright overall screen image that can be easily viewed in normal ambient lighting conditions, such as the lighting conditions typically found in a commercial establishment, or a mall setting. Moreover, the high-brightness video display device can be selected so as to provide sufficient lighting such that simulated 3D display device of the present invention can be used outdoors, in natural sunlight.

The background display device can be any suitable display device, which can include a screen onto which an image can be projected (either from the front or rear). Most preferably, the background display device is a display device such as a television screen or monitor. These can include any suitable display devices, but preferably, flat panel display devices such as LCD, plasma, LED, OLED, and the like, may be used.

The background display device can also be comprised of a plurality of high-brightness display devices, wherein each of the display devices is preferably a television or a monitor. This can include televisions or monitors that are rear projection devices, but more preferably, the rear screen is chosen from the group consisting of a planar television tube, a planar plasma television display, a planar LCD television display, a planar LED television display, and a planar OLED television display. Other display devices might also be used as the rear screen, and the skilled artisan will be aware that their use is not precluded from the present invention.

Where a plurality of display devices are used, the background display can comprise a plurality of devices which are arranged to provide a completed background display. For example, 4 devices can be arranged in a planar 2×2 grid. Other arrangements are possible, and these can include 3×3 grids, 4×4 grids, 2×3 grids, 3×2 grids, or any other suitable arrangement.

The front display device is a transparent display device, and most preferably, the front display device is a flat panel, transparent LCD display device. In these types of devices, the panel itself has no light emissive properties, and the image from the first image of the first program material, is only lit from the light from the light from the background display device.

The simulated 3D display device of the present invention is scalable, so that overall size of the projected images can vary depending on their desired application. As such, the display device of the present invention is practical in small scale devices including computer monitors, smart phone displays, and the like, but can also be scaled upwards to include screens of up to 3 meters or more in height and/or width, for larger displays, such as those in theatres, display booths, or the like. More preferably, the screen size is established by the size of the display devices, and thus, the screen size is typically between 1 and 2 meters, in height and/or width. This would be suitable for use in commercial establishments, or in mall display boxes, but would also be suitable for home use, as a low profile, simulated 3D television device.

The distance between the front and background display panels can vary depending on the size of the panels. For applications wherein the front and/or background display panels have a height and/or width of 1 to 2 meters, the distance between the panels is preferably between 2.5 and 20 cm, and more preferably between 5 and 10 cm. The distance between the panels can be optimized so as to provide the optimal apparent parallax effect.

As such, a typical 1 to 2 meter screen size, requires a depth of only approximately 25 cm, and preferably, of less than 20 cm. More preferably, the depth of the simulated 3D display device of the present invention, is less than 15 cm. As a result, the display device has a low profile, and is suitable for positioning on a wall, or inside of a thin cabinet. As such, it is well suited for commercial applications, such as in advertising boxes, or the like commonly found in a commercial establishment, or in a mall, or the like.

Moreover, the low profile of the present device, allows for easy transport and set-up of the device.

By way of example, in a particular embodiment of the present invention, the front and background display devices are permanently mounted in a case so as to be portable as a single structure, as will be hereinafter described. For this embodiment, the case will preferably be limited to a box having a length, height and width, of between 1.5 and 2.25 m, and a depth of between 15 and 30 cm. For smaller devices, the box can have height and width values which are both less than 40 cm, and a depth of between 7.5 and 15 cm.

In another option, a hand-held device can be provided wherein the box will typically have height and width values which are both between 4 and 10 cm, and a depth of between 1 and 4 cm.

However, larger cases of up to, for example, 3 to 5 meters, in height and width, are also possible, and are not excluded from this invention. These larger cases preferably would have a depth of between 15 and 30 cm, and may be provided as cases which can be moved from one exhibition site to another as a single structure.

However, the general techniques for providing the simulated 3D visualizations, in keeping with the present invention, will also apply to structures which employ the same principle hardware and software, but which may be more or less permanently installed in such locations or devices such as a theatre, an outdoor display, or television studio. Scalability therefore allows the system to be used in a wide variety of situations, and as such, one feature of a certain aspect of the present invention is that the apparatus is scalable. That is, the apparatus may vary in size from perhaps that of a computer, to the size of a small trailer. For even larger applications, the apparatus of the present invention can be configured so as to be used on a stage such as might be found in a theatre, conference center, or the like.

While the device of the present invention typically comprises only two display devices, additional transparent display devices can be positioned between the front and background display devices. Commonly the number of additional transparent display devices will be between 1 and 10, and most preferably, when used, the number of additional transparent display devices will be between 1 and 3.

A problem with prior art approaches is the creation of a moire effect, as previously discussed. While the use of higher resolution display devices (e.g. 4K display screens) can reduce this effect, this approach is not always cost effective. Instead, in the practice of the present invention, the low profile simulated 3D display device of the present invention, also includes a moire artifact reduction screen. This screen is typically a film or panel made of a polycarbonate, such as Lexan™, and is preferably located between the front display panel, and the background display panel. These screens are essentially transparent panels or films, such as a light control film (LCF), which is an optical film that is configured to regulate the transmission of light. Various LCFs are known, and typically include a light transmissive film or panel having a plurality of parallel grooves.

When positioned between the front and background panels, the moire artifact reduction screen reduces or eliminates the observed moire effect, and thus improves the overall image quality.

In a preferred embodiment, the first program material and the second program material are edited and synchronized one with the other so that the images from the background display device appear to be interrelated to, or merge into, the program material on the front display device, and thus provide a simulated 3D viewing experience.

It will be noted that the images of the first program material and the images of the second program material can be independent. However, in keeping with the present invention, preferably the images of the first program material and the images of the second program material are synchronized. Typically, synchronization of the first program material and the second material is preferably under the control of a computer, or some other computerized device. Synchronization of the images moving from display device to display device, can be provided by this arrangement.

The apparatus of the present invention is preferably arranged so that images from the first program material and/or the second program material are altered or edited, in such a manner so that any chosen image from first program material displayed on the front display device, will create an image which will appear to be aligned with an area of the second program material presented on the background display device. In a preferred arrangement, the first program material will appear to be superimposed, or in front of, the edited second program material on the rear screen. In one particularly preferred arrangement, the second program material is altered so that no image is provided in the area behind the image provided in the first program material. As such, the first program material image is provided without any image from the second program material being superimposed on, or under, the first program image.

Still further, the editing and placement of the first program material image and the edited area of the second program material image are such that the chosen image of the first program material and the edited area of the second program material may be made to move in any direction, relative one to the other, from frame to frame of the virtual image and the second program material image. As such, the directions of movement from frame to frame of the virtual image, and the edited area of the second program material image can be in opposite directions, so as to provide an enhanced illusion of movement one with respect to the other.

Editing and placement of the second program material on the background display device might also be required to address the non-linear nature of the background display device, and/or the non-parallel or non-planar positioning of the second display device.

Other options to control the interrelated appearance of the combined visual images can be further controlled, and synchronized. For example, there is typically a transparency value which is associated with any color. In a projection based system, the color black is 100% transparent, in terms of the image projected from the display device. The color white is essentially opaque, with the other colors being in between. In contrast, however, for a transparent LCD monitor, a 100% white level is transparent, revealing the background display, and a 100% black level would be essentially opaque, which would conceal the background image.

In either approach however, transparency of colors can result in problematic imagery when multiple planes of visualization are employed. For example, imagery in the background display device will be revealed in any transparent area in the front display device with the result that the image gives the impression of being "ghostly".

However, these shortcomings can be overcome or ameliorated by controlling the opacity and luminance levels of the front display device, and/or by using techniques such as providing "traveling mattes" on the rear screen. To be more specific, adjusting the opacity and luminance values of the background display or the front display, with respect to each other, can improve the perceived image parallax and the foreground image fidelity, of the system. In that regard, it is typically preferred, but not essential, that the background opacity should be adjusted to between 20% and 40% of the foreground layer so as to achieve a well perceived three dimensional effect.

The use of traveling mattes may be achieved physically, but in most cases, is done by editing the image content using a computer application. Essentially, a traveling matte is an artificial black mask that is a "cut-out" of the foreground imagery, and which is applied to the corresponding background plane. This results in a significant improvement to the overall effect. Obviously, the masks which are applied to the background imagery are synchronized to, and in traveling time with, the foreground imagery, and are sized so as to approximate the size of the foreground image. Typically, the matte is between 80 and 120% of the size of the foreground image.

Overall, the creation of various content aspects in accordance with the present invention, including, for example, parallax, relative opacity, luminance, travelling mattes, and the like, acts to provide an improved and enhanced simulated 3D experience. In the present invention, this content creation is achieved through editing, synchronizing and/or interrelating the virtual image (or images) to the background image.

Moreover, the present invention provides a display apparatus for displaying simulated 3D images, which is preferably both scalable and portable. For example, in a particular embodiment of the present invention, the front and background display devices are permanently mounted in a case so as to be portable as a single structure, as will be hereinafter described. For this embodiment, the case will preferably be limited to a box having a length, height and width, of less than about 2.25 m, and more typically, less than 1.5 m. For smaller devices, the box can have length, height and width values which are all less than 40 cm.

In another option, a hand-held device can be provided wherein the box will typically have length, height and width values which are all greater than 5 cm, and more preferably, greater than 10 cm.

Larger cases of up to, for example, 3 to 5 meters, are also possible, and are not excluded from this invention. These larger cases may be provided as cases which can be moved from one exhibition site to another as a single structure.

However, the general techniques for providing the simulated 3D visualizations, in keeping with the present invention, will also apply to structures which employ the same principle hardware and software, but which may be more or less permanently installed in such locations or devices such as a theatre, an outdoor display, or television studio. Scalability therefore allows the system to be used in a wide variety of situations, and as such, one feature of a certain aspect of the present invention is that the apparatus is scalable. That is, the apparatus may vary in size from perhaps that of a computer, to the size of a small trailer. For even larger applications, the apparatus of the present invention can be configured so as to be used on a stage such as might be found in a theatre, conference center, or the like.

Another embodiment discloses a system for generating a three-dimensional image, including a processor that is adapted to execute stored instructions and a storage device that stores instructions. The storage device includes processor executable code that, when executed by the processor, is adapted to generate and broadcast, in real-time, simulated three dimensional (3D) images of a human being. These images can be captured live in a studio environment based on live actions of a presenter, and a simulated three dimensional (3D) image of the presenter may then be broadcast remotely to, for example, provide a presentation to an audience.

Another embodiment discloses a system for generating a three-dimensional image, including a processor that is adapted to execute stored instructions and a storage device that stores instructions. The storage device includes processor executable code that, when executed by the processor, is adapted to capture user interaction data with the simulated three dimensional (3D) image, and generating customized and targeted advertisement data based on the captured and/or predetermined user data.

Another embodiment discloses a system for generating a three-dimensional image, including a processor that is adapted to execute stored instructions and a storage device that stores instructions. The storage device includes processor executable code that, when executed by the processor, is adapted to adjust, in real-time, the simulated three dimensional (3D) image in response to detection of user movement of a user that may be interacting with the simulated three dimensional (3D) image.

Another disclosed embodiment relates to methods and systems for providing a wearable and interactive experience by generating the three dimensional (3D) image and additional content in a portable and scalable format where the user can view and interact with a 3D image that is generated by an accessory that can be worn on the head like a helmet and/or glasses.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for the purpose of illustration and description only and are not intended as a definition of the limits of the present disclosure. Embodiments of the present disclosure will now be described by way of example in association with the accompanying drawings in which:

FIG. 12 is a cut-away, perspective view of another embodiment of the present invention;

FIG. 13 is a cross-sectional, top view of the apparatus shown in FIG. 12;

DETAILED DESCRIPTION

Figure 1:
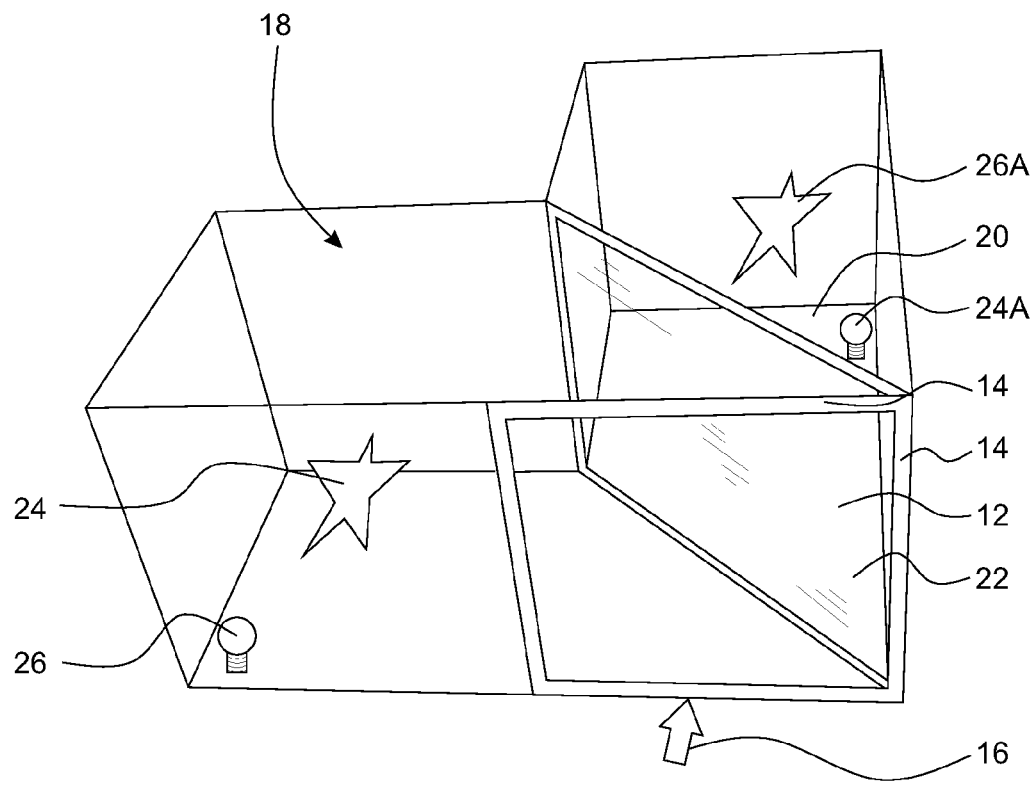
FIG. 1 is a sketch showing the general layout and functioning principles of a prior art Pepper's Ghost installation.

The novel features which are believed to be characteristic of the present invention, as to its structure, organization, use and method of operation, together with further objectives and advantages thereof, will be better understood from the following discussion.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. The figures discussed below provide details regarding exemplary systems that may be used to implement the disclosed functions.

Additional figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs) and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be understood that when used herein, the term "the three dimensional (3D) image" or "3D image" may be an actual 3D image or may be an illusion of a 3D image that is created based on generation and display of a two-dimensional (2D) image. The illusion may be created by creating a parallax effect between a front screen and a background screen. The display content between the front screen and back screen may be synchronized. When viewing the illusion of the 2D image with the parallax effect, a viewer may experience that a 3D image is being displayed between the two screens.

FIG. 1 is a sketch showing a classic arrangement by which the Pepper's ghost illusion was exhibited starting in the last half of the 19th century. A stage, typically a proscenium stage, is shown at 12 in FIG. 1, and has a proscenium 14. It will be seen that the left hand side of the stage is open; that is, there is no wall, wing drapery, or the like. However, a viewer looking at the stage 12 in the direction of arrow 16 sees nothing of the apparatus and setup at the left-hand side of the stage 18. Moreover, all of the structure at the left-hand side of the stage, commonly referred to as a Blue Room 18 (although it is usually black), is kept dark. That is, there is no illumination in the blue room 18, and the stage 20 is typically brightly lit. A glass panel 22 is set at an angle to the viewing direction 16. Whatever is behind the glass 22 is clearly seen by the viewer.

Under normal lightly conditions, there is no reflection seen on the front face of the glass 22 from the setting in the blue room 18.

Objects 24 and 26 are placed in the blue room 18. When illumination is turned on in blue room 18, a reflection of what is in the blue room 18 is seen in the glass 22, but appears to provide a virtual image 24A and 26A, which can be seen by the viewer. When the lighting in the blue room 18 is discontinued, the images 24A and 26A, appear to disappear.

The present system is a variation of the Pepper's Ghost illusion wherein a front image is provided on a transparent front display, and can be made to be interrelated to images appearing on a background display unit. This creates parallax in the system, which provides a simulated 3D effect.

Figure 2:
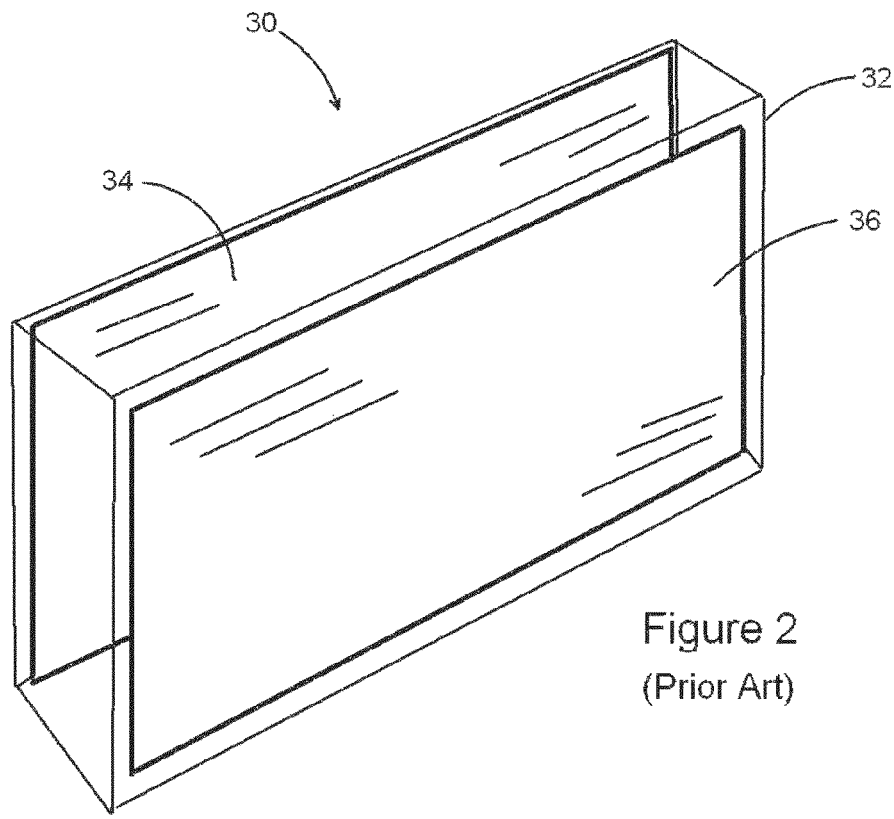
FIG. 2 is a perspective view of a prior art system with a transparent front display.
Figure 3:
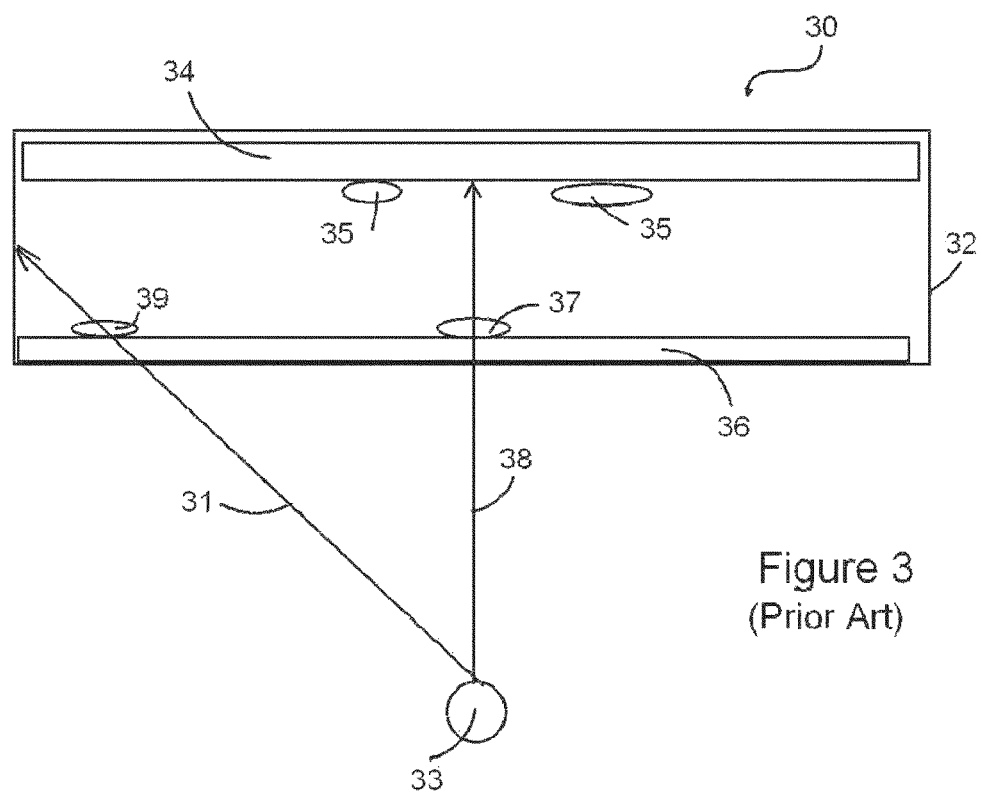
FIG. 3 is an overhead schematic view of the prior art system of FIG. 2.

Turning now to FIGS. 2 and 3, an illustration of a prior art display system apparatus 30 is shown. Apparatus 30 consists of a case 32, in which a background display screen (namely a flat panel LCD television) 34 is shown at the back of case 30. At the front of case 30 is a front transparent LCD display 36.

Case 32 can have any suitable width, height or depth, as required for the environment where apparatus 30 is used. By way of example, for a display item, case 32 could have a width of 2 meters, a height of 1.5 meters, and a depth of 1 meter. Obviously, the height, width and depth relationships can be modified as required or as needed.

As best seen in FIG. 3, when viewed in the direction shown by arrow 38, a viewer 33 will see the image, which is represented by reference numeral 37, shown on front display 36, against an image represented by reference numerals 35 on the background display 34, when the viewer 33 views the images from directly in front of case 32.

As such, the two program material images are interrelated. The programming and the nature of the computers employed to interrelate the images, and their synchronization, are beyond the scope of the present invention. Similarly, the brightness and luminosity of the images on the front display 36 and/or background display 34 can also be controlled, and thus, are also edited or synchronized so as to be interrelated, one to the other.

When viewing the image represented by reference numeral 39, however;—which is near the edge of front display 36, as shown by the arrow 31, the viewer 33 will see the sides of case 32 and/or will lose any effect that might be desired on a background display located visually behind image 39.

Figure 4:
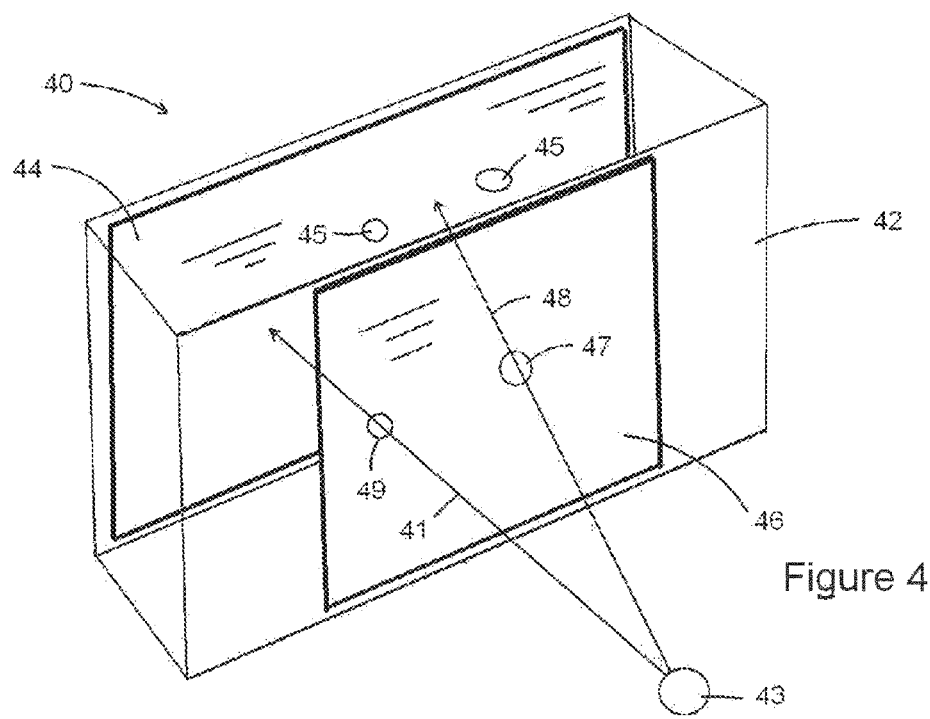
FIG. 4 is perspective view of a first embodiment of a transparent front display system of the present invention.
Figure 5:
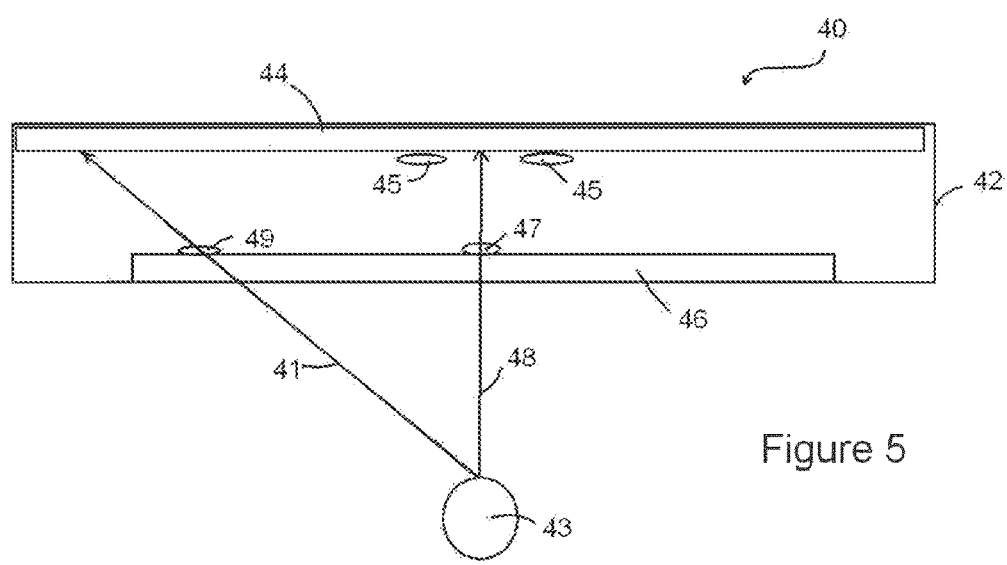
FIG. 5 is an overhead schematic view of the system of FIG. 4.

The present invention seeks to address this situation. In FIGS. 4 and 5, an illustration of the display system apparatus 40 according to the present invention is shown. In this approach, apparatus 40 comprises a case 42, in which a background display screen 44, is shown near the back of case 42. As in FIGS. 2 and 3, at the front of case 40 is a front transparent LCD display 46. In this embodiment, background screen 44 is 30% larger, when measured side-to-side, than transparent front display 46. When viewed in the direction shown by arrow 48, the viewer 43 will see the image 47 shown on front display 46, against the backdrop of the image 45 shown on background display 44, when the viewer 43 views the images from directly in front of case 42.

When viewing image 49 near the edge of front display 46, as shown by arrow 41, the viewer 43 still sees the image 49 against the backdrop of background display 44. As such, the viewer does not lose the effect of having the background display behind image 49.

It will be noted that in an exemplary embodiment, background display 44 and front display 46 have essentially the same height, and only their width is different. For most applications, this approach is acceptable, however, clearly, background display 44 can be modified so as to have a larger height than front display 46.

Figure 6:
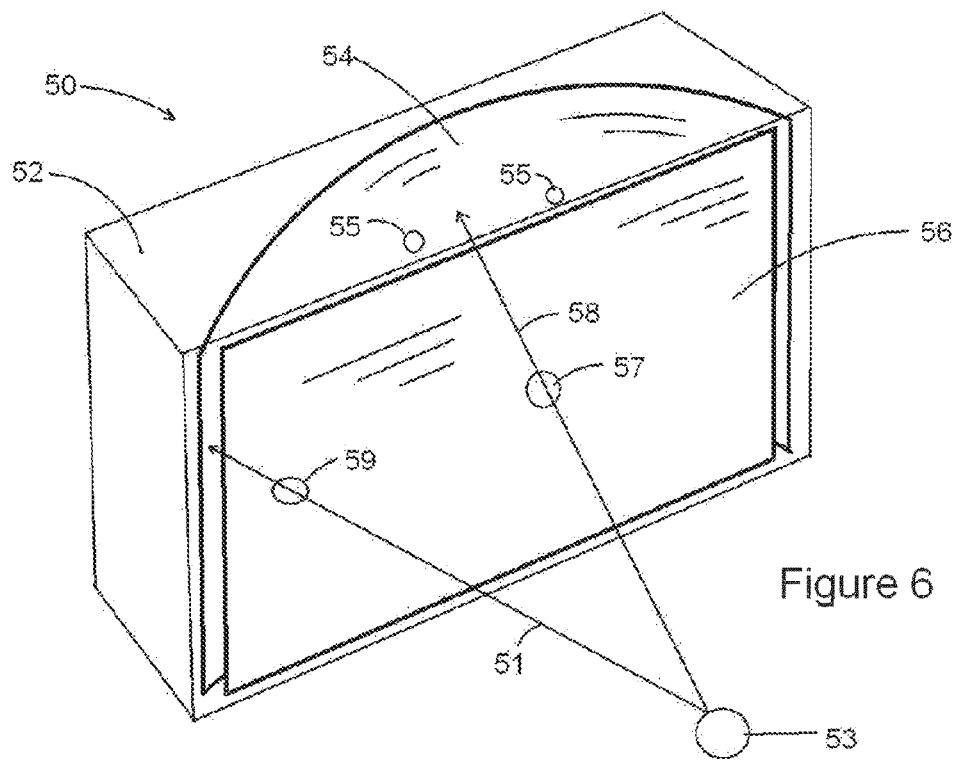
FIG. 6 is perspective view of a second embodiment of a transparent front display system of the present invention.
Figure 7:
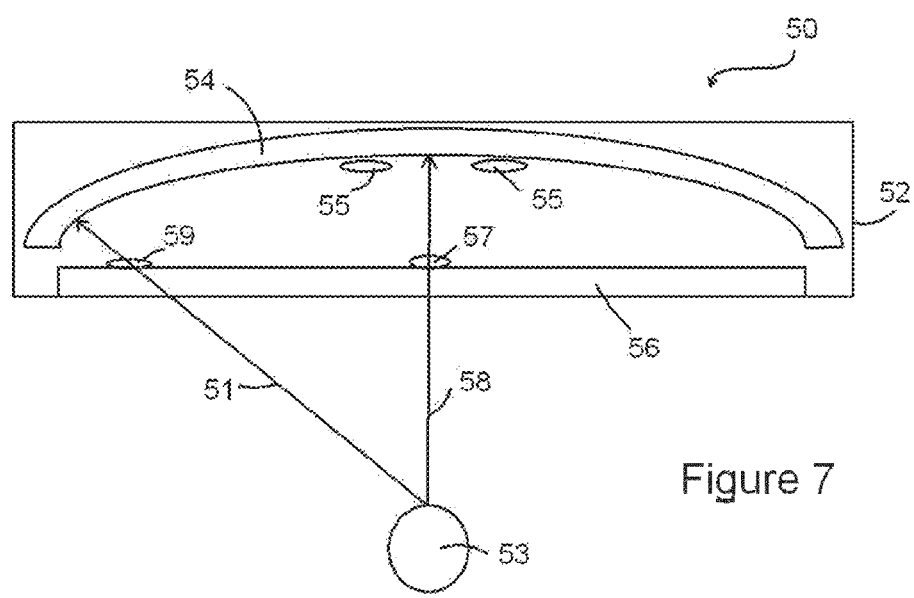
FIG. 7 is an overhead schematic view of the system of FIG. 6.

In FIGS. 6 and 7, a further embodiment of the display system apparatus 50 of the present invention is illustrated. In this approach, apparatus 50 comprises a case 52, in which a background screen 54, which is a flexible LCD screen, having a continuously curving arrangement, is shown near the back of case 50. As in FIGS. 2 and 3, at the front of case 50 is a front transparent LCD display 56. When viewed in the direction shown by arrow 58, the viewer 53 will see the image 57 shown on front display 56, against the backdrop of the image 55 shown on background display 54, when the viewer 53 views the images from directly in front of case 52.

When viewing image 59 near the edge of front display 56, as shown by arrow 51, the viewer 53 still sees the image 59 against the backdrop of background display 54. As such, the viewer does not lose the effect of having the background display behind image 59.

Again, front display 56 and background display 54 are shown having a the same height. Since background display 54 curves behind, and past, front display 56, it is clear that background display 54 is wider than front display 56. This arrangement can be varied, as necessary.

It will also be noted that while background display 54 is has a constant distance, along a vertical axis on front display 56, the distance from the background display 56 to the front display changes as one moves in a horizontal direction across the front display 56. While this is a preferred arrangement, other configurations are not excluded.

Also, in this embodiment, front display 56 has a width of 2 meters, and a height of 1.5 meters. At its maximum distance, background display 54 is 1 meter behind front display 56 at the centre of background display 54, but curves so as to be only 10 cm behind the extended plane of front display 54 at the edges of background display 54. Again, this distances can vary depending on the specific application.

Also, it should be noted that the images projected onto the background device 54 can be modified so as to account for the curved image on the flexible and/or curved background display 54. This type of modification or image adjustment is within the capability of the skilled artisan.

Figure 8:
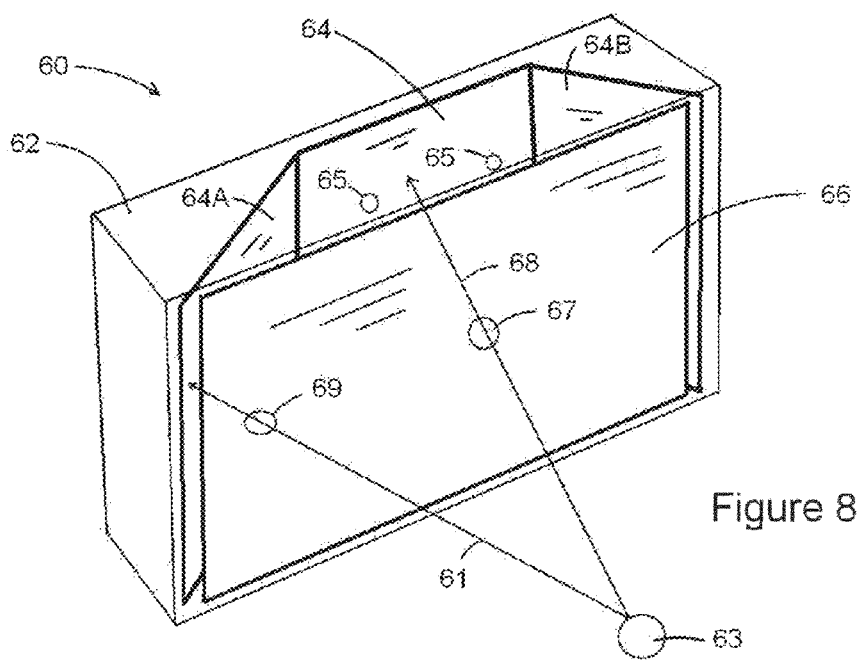
FIG. 8 is perspective view of a third embodiment of a transparent front display system of the present invention.
Figure 9:
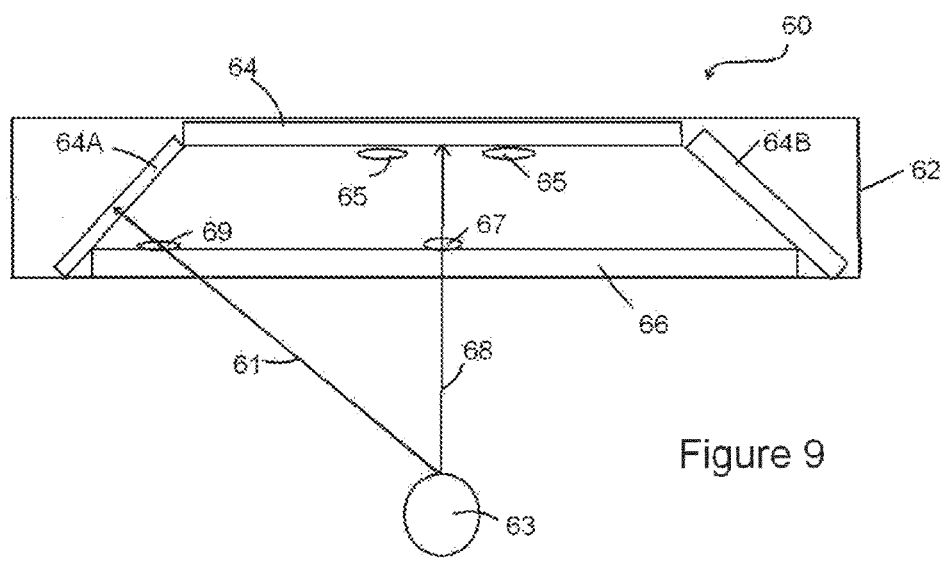
FIG. 9 is an overhead schematic view of the system of FIG. 8.

In FIGS. 8 and 9, a third embodiment of the display system apparatus 60 of the present invention is illustrated. In this approach, apparatus 60 comprises a case 62, in which a background screen 64, is shown near the back of case 60. Connected to the edges of background screen 64 are two additional display panels 64A and 64B which are angled from background screen 64 towards a front transparent display 66 at the front of case 60. It will be noted that additional display panels 64A and 64B extend to the extended plane of the front of the front transparent display 66, and thus, it is not possible to view any possible separation effect, as previously described.

When viewed in the direction shown by arrow 68, the viewer 63 will see the image 67 shown on front display 66, against the backdrop of the image 65 shown on background display 64, when the viewer 63 views the images from directly in front of case 62.

When viewing image 69 near the edge of front display 66, as shown by arrow 61, the viewer 63 still sees the image 69 against the backdrop of background display 64A. As such, the viewer does not lose the effect of having the background display behind image 69.

Again, the images shown on background display 64 can be modified to account for the parallel alignment of panel 64, and the angled alignment of panels 64A and 64B.

Figure 10:
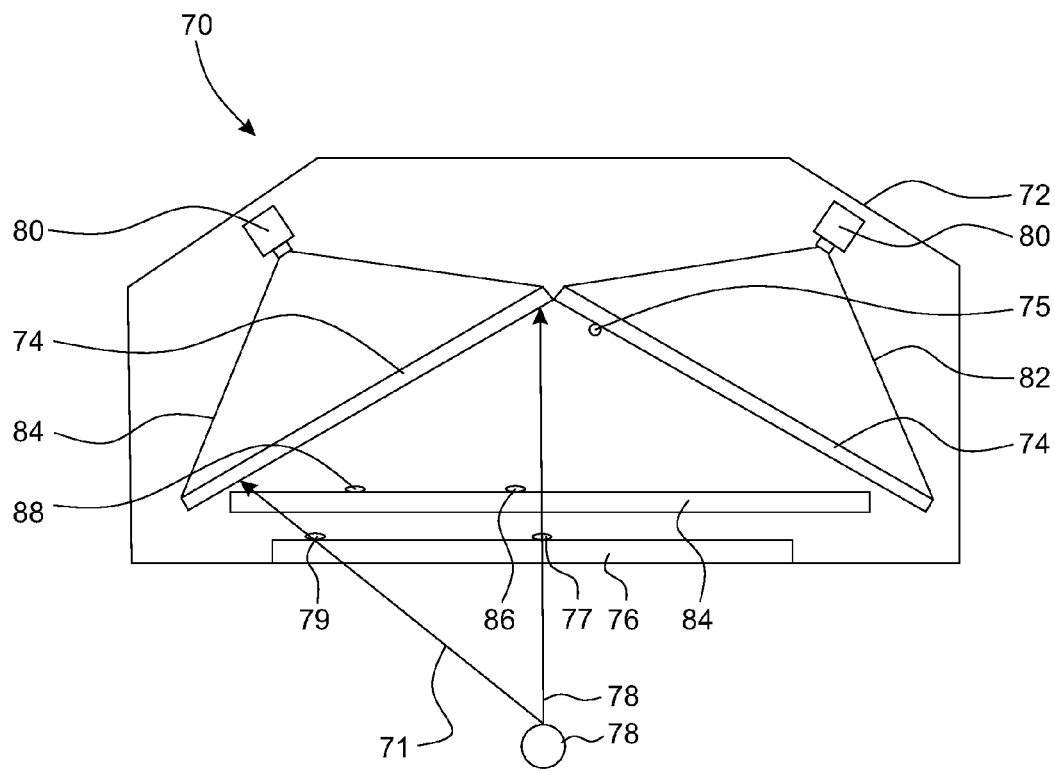
FIG. 10 is an overhead schematic view of a further embodiment of the transparent front display system of the present invention.

In FIG. 10, a further embodiment of the display system apparatus 70 is shown. In this approach, apparatus 70 comprises a case 72, in which two background display panels 74 are shown. The two panels 74 are angled one to the other. Panels 74 are rear projection panels, and the images shown on panels 74 are provided by projectors 80, which provide a light image depicted by reference numerals 82. At the front of case 72 is a front transparent LCD display 76. Between front display 76, and background display panels 74 is a further, intermediate transparent LCD display 84, which intermediate display 84 is wider than front display 76, but not as wide as the combined width of angled background panels 74.

When viewed in the direction shown by arrow 78, the viewer 73 will see the image 77 shown on front display 76, against the backdrop of the image 75 shown on background display 74, and image 86 shown on intermediate display 84, when the viewer 73 views the images from directly in front of case 72.

When viewing image 79 near the edge of front display 76, as shown by arrow 71, the viewer 73 still sees the image 79 against the backdrop of background display 74, and in relation to the image 88 shown on intermediate display 84. As such, the viewer does not lose the effect of having a background display behind image 79 and/or on intermediate display 84.

Further, intermediate display 84 can display image content that is interrelated to the images shown on front panel 76, background panels 74, and/or some combination of these panels.

Figure 11:
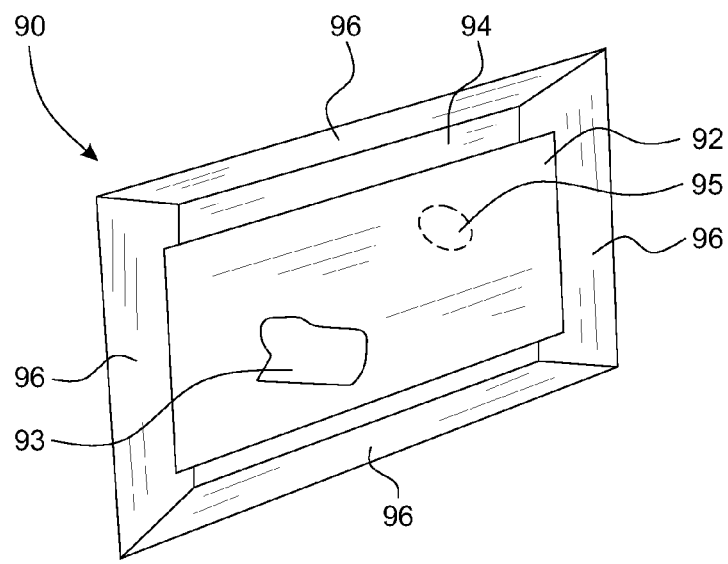
FIG. 11 is perspective view of a still further embodiment of a transparent front display system of the present invention.

In FIG. 11, a further apparatus 90 of the present invention is shown comprising a front display 92 in front of a planar background display 94. In this embodiment, no case is used. At the four sides of background display 94 are additional display units 96, which are connected to background display 94, and are angled towards front display 92. Using this approach, a viewer (not shown) would observe image 93 shown on front display 92, against a background image 95, shown on background display 94. At all four edges of the front panel 92, the viewer would be able to observe background images displayed on background display 94, or additional display units 96.

Referring to FIGS. 12 and 13, a display device 100 of the present invention is shown having a front display panel 102, a background display panel 104, and a moire reduction screen 106 positioned between front display panel 102 and background display panel 104. An optional transparent protective panel 108 is preferably positioned directly in front of front display panel 102, so as to avoid or minimize damage to panel 102.

Display device 100 is housed in a cabinet 120, which cabinet can be made of any suitable material for housing display device 100. As such, cabinet 120 can be made of plastic, metal, wood, or the like.

Front display panel 102 is a transparent LCD display, which has no inherent emissive light qualities. In panel 102, as a transparent display, the colour black will create complete 100% image opacity, while the colour white will creates complete 100% image transparency. As such, varying degrees of video image gray scale between 100% black and 100% white provides transparency and perceived level of visual depth between the foreground image plane and rear background image plane.

The display resolution is 1920×1080, and has a matched polarization system which is paired with the rear video display. In this embodiment, the display colour/gray scale visual data bit depth is 8 bits or greater per RGB channel.

Panel 102 has a width of 1.5 meters, and a height of 1 m, and a thickness of 2 cm.

Background panel 104 also has a width of 1.5 meters, and a height of 1 m, with a thickness of 5 cm. Panel 104 is a high-brightness video display having a display brightness of 2000 candelas per square meter. The display has a display resolution of 1920×1080, and has a matched polarization system which is paired with the transparent front display 102. In this embodiment, the display colour/gray scale visual data bit depth is 8 bits or greater per RGB channel.

The distance between front display panel 102 and background display panel 104 is 8.5 cm, giving a overall thickness of display device 100, of 14 cm.

It should be noted that front panel 102 and background panel 104 can be displays having any suitable resolution. This includes the 1920×1080 mentioned above, but might also be any acceptable resolution, including for example, 3840×2160, UHD, 4K, 8K, and the like Moire reduction screen 106 is a 2 mm screen made of Lexan, and is positioned 3 mm in front of background display panel 104.

Display device 100, and optional protective panel 108 are positioned within cabinet 120. Cabinet 120 can also include a secure mounting chassis (not shown) which holds the system power, and display system video signal processing controls. The display device 100 is connected to a playback engine (not shown), which provides the synchronized foreground and background audio and video content needed to create the 3D viewing experience. The software used to control the images produced, can be proprietary, or standard video display software, which optionally could be customized.

Signals to the front display panel 102 and the background display panel 104, can be transmitted to display device 100 separately using any suitable video transfer equipment. These signals can be provided from an external source, or provided by an on-board system which can preferably be remotely programmed, by for example, WiFi, or Bluetooth™ technologies. Preferably, however, the signal transmitted to display device 100 is provided using any acceptable video display codec, such as, for example, a High Efficiency Video Coding (HVEC) codec, which is capable of incorporating and processing the separate video signals to be sent to the front and background display panels. As a result, the video signal can be a single file that is converted to control and provide signals to both the front panel and the background panel.

There has therefore been described a display apparatus which comprises a front display device having side edges, arranged to project a first image of a first program material towards a viewer, and a background display device having side edges, arranged to project a second image of a second program material towards a viewer, wherein said front display device and said background display device are separated to provide an apparent parallax effect between said first image and said second image, and wherein said background display device is sized so as to extend beyond the side edges of the front projection device.

There has therefore been described a low profile, simulated 3D display device comprising a front display device comprising a transparent front display device, arranged to display a first image of a first program material which is to be observed by a viewer, and a background display device arranged to display a second image of a second program material which is to be observed by a viewer, wherein said front display device and said background display device are separated to provide an apparent parallax effect between said first image and said second image, and wherein said background display device is a high-brightness video display device.

Other modifications and alterations may be used in the design and manufacture of the apparatus of the present invention without departing from the spirit and scope of the accompanying claims.

Figure 14:
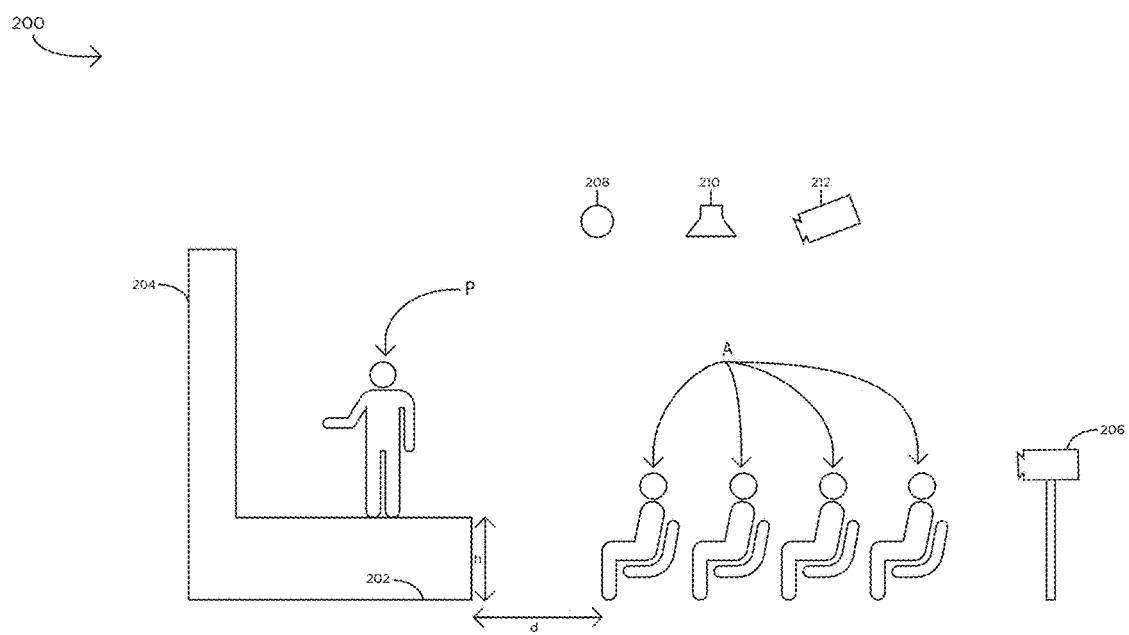
FIG. 14 is a schematic of an environment that can be configured to host live events by broadcasting a three dimensional (3D) image of a presenter using the apparatus shown in one of FIGS. 4 through 13.

For example, FIG. 14 shows an exemplary environment where the display systems described in FIGS. 4 through 11 may be used to host live events by broadcasting a three dimensional (3D) image of a presenter. Such an implementation may be referred to as, for example, holo-porting. FIG. 14 depicts an auditorium 200 that may be used to host live events such as concerts, motivational speeches, training events, political campaign rallies, and/or any other type of event that requires a presenter "P." Stage 202 is at certain height "h" and distance "d" from the audience "A." Auditorium 200 may also include a background 204 that may show graphics and/or videos relating to the live event being hosted. One or more camera(s) 206, microphone(s) 208, audio speaker(s) 210, and/or lights 212 may also be included in the auditorium to facilitate the live event. As will be understood, the components and locations of the components shown in FIG. 14 are exemplary and may be implemented in various different configurations based on the size, location, and type of auditorium and/or based on lighting requirements. For example, hosting a concert would require additional sound equipment and/or audio equipment, while a training event may require additional lighting. Additional or fewer components may be used in auditorium 200.

In current implementations, presenter P may have to be physically present in auditorium 200 to host a live event that requires interaction with audience A. As will be explained in greater detail below, the disclosed system and method enables presenter P to host a live event without having to be physically present in the auditorium 200, by using the display apparatus shown in FIGS. 4 through 11.

Figure 15:
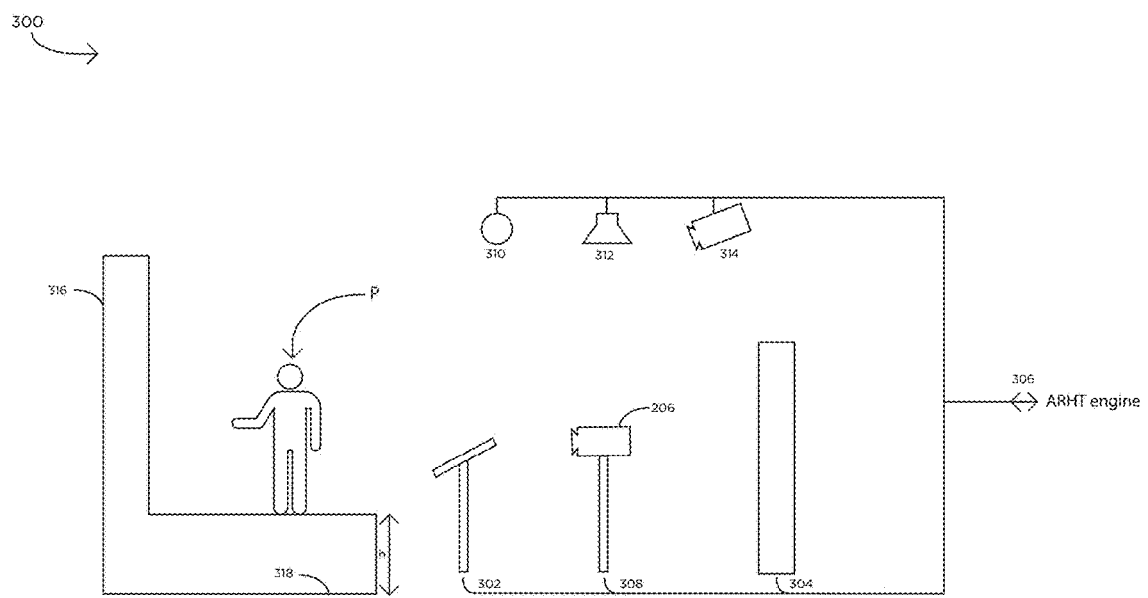
FIG. 15 is a schematic of an environment that can be configured to capture and broadcast a three dimensional (3D) image of a presenter for the purposes of a live event.

As part of hosting a live event, presenter P will need to be present in an environment where a three dimensional (3D) image of the presenter can be captured and broadcast live using the techniques disclosed herein. FIG. 15 shows such an exemplary environment. For example, FIG. 15 shows an exemplary studio 300 that will be used to capture, generate, and broadcast in real-time, a realistic three dimensional (3D) image (also referred to as "hologram") of presenter P to a second location that may be at a remote location compared to the presenter. For example, presenter P may be in Florida and may host a live event occurring in Australia. Studio 300 may also include a presenter screen 302 to be used by presenter P, an audience screen 304, a specially programmed and configured computer 306 depicted as "ARHT Engine," one or more camera(s) 308 that capture the presenter's action, one or more microphone(s) 310, speaker(s) 312, and/or light(s) 314, and/or an elevated platform 318 that mimics the dimensions of the actual stage at the audience location. Camera 308 may include any type of imaging device that is configured to capture RGB images and depth maps of scenes. For example, the camera may include an RGB camera that is configured to capture a color image of a scene by acquiring three different color signals, i.e., red, green, and blue. In addition, in some embodiments, the camera may include a random dot pattern projector and one or more infrared (IR) cameras that are configured to capture a depth map of the scene.

In addition, studio 300 may include a green screen and/or background screen 316 that may be used by presenter P to interact with material related to the live event. For example, background screen 316 may show training material that presenter P may interact with while giving the presentation to an audience.

As discussed above with respect to FIG. 14, the components and locations of the components shown in FIG. 15 are exemplary and may be implemented in various different configurations based on the size, location, and type of auditorium and/or based on the lighting requirements. Additional or fewer components may be used in studio 300.

Audience screen 304 displays a live broadcast of the audience members that are attending the live presentation at the remote location. For example, presenter P may be able to look at the audience via screen 304 during capturing of his presentation in the studio. Screen 304 may make the presenter feel as if the audience members are actually in front of him and will allow him to directly communicate and interact with the audience members in real-time. Further, elevated platform 318 may be at the same height as the height of the actual stage where the live event is being hosted, and may be configured to be at the same distance from camera 308 as the audience members are from the stage to create a realistic appearance for the audience that the presenter is physically present at the same location as the audience. For example, using the configuration of elevated platform 318 and audience screen 304, presenter P can answer a question from an audience member in a remote location by directly looking at screen 304. The configuration may ensure that when the presenter is answering a question and/or interacting with an audience member while looking at screen 304 in studio 300, the particular audience member may get the impression that the three dimensional (3D) image or hologram of the presenter that is being broadcast is looking at the same eye level as the audience member. Such a configuration may create an experience for the audience member that makes him/her feel as if the presentation is not being given by a simple computer-rendered image, but by the presenter P who can interact with the audience as if he/she was physically present at the same location as the audience member.

In addition, presenter screen 302 may allow presenter P to see a live broadcast of his/her three dimensional (3D) image or hologram from the viewing perspective the audience. This may allow presenter P to make real-time adjustments to his presentation to account for any aspects he/she does not like of the three dimensional (3D) image or hologram that is being shown in the remote location. Further, presenter P may use presenter screen to adjust the configuration of camera 308, the microphone 310, the speaker 312, and/or lighting 314. Further, presenter P may use this setup to host a live event in multiple different locations at the same time. For example, presenter P may select an icon on presenter screen 302 that may allow him to change the audience video being broadcast on screen 304. At one point, audience screen 304 may show a video of the audience members in, for example, Sydney, Australia, and at another time the screen may show a video of audience members in Toronto, Canada. This may allow presenter P to give the same presentation and interact with audience members in different locations while being present in studio 300.

As is shown in FIG. 15, camera 308 may be connected to ARHT Engine 306 that may comprise a specially-programmed computer that is used to capture presenter P, generate a three dimensional (3D) image or hologram of the presenter, and/or broadcast it in real-time to the remote location. Using components and techniques discussed below, ARHT Engine 306 may capture the live feed from video camera 308 depicting the presenter's action and/or any content that is being displayed on background screen 316. ARHT Engine 306 may then process the captured data by using image processor(s) and/or additional computational resources and may broadcast this over a network to one or more location(s) where the live event is being presented to audience members using the display devices shown in FIGS. 4-13. While processing the video of presenter P and background content shown on background screen 316, ARHT Engine 306 may ensure that the images are synchronized such that when they are presented on the display system at the remote location, the audience views a presentation as if both the presenter and the background video were being presented live at the remote location. The transmission of video of presenter P and background images may create a parallax effect at the display device in the remote location where the live event is being hosted.

ARHT Engine 306 may also receive a video feed from the remote locations and may present an image of the audience on audience screen 304 and a three dimensional (3D) image or hologram of the presenter on presenter screen 302 after processing that data. ARHT Engine 306 may also facilitate the process of allowing presenter P to switch between various live events by selecting an icon on presenter screen 302. When presenter P selects an option to switch to a live event in a different remote location, ARHT Engine 306 may switch the video feed for audience screen 304 to show the audience from the different remote location. In addition, ARHT Engine 306 may switch the display of presenter screen 302 from the video feed showing the audience's view of the three dimensional (3D) image or hologram of the presenter from the first remote location to the second remote location.

Figure 16:
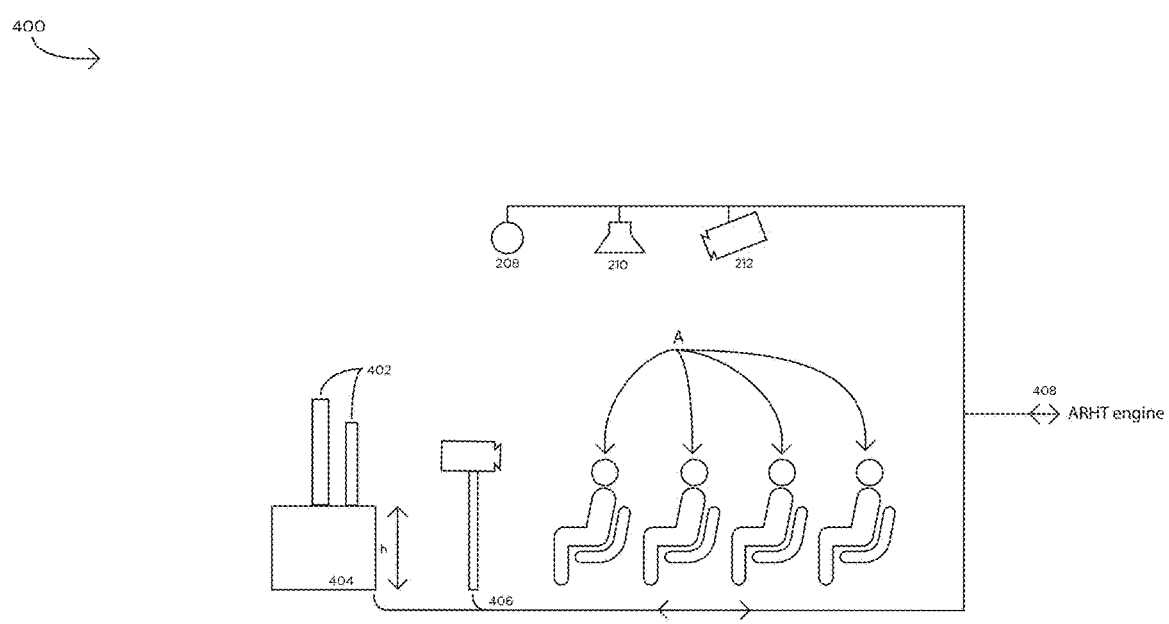
FIG. 16 is a schematic of an environment that can be configured to capture and broadcast a three dimensional (3D) image of a presenter for the purposes of a live event.

FIG. 16 shows an environment of an exemplary auditorium 400 that may be used to host a live event such that the presenter is not physically present at the location of the auditorium. For example, as shown in FIG. 16, environment 400 has similar components and a similar configuration as shown in FIG. 13 for auditorium 200. In addition, auditorium 400 includes a display system 402 that may include two screens. Display system 402 may be any one of the systems disclosed in, for example, FIGS. 4-13 and may be used to display a three dimensional (3D) image or hologram of the presenter who is physically present in a different location. As is shown in FIG. 16, ARHT Engine 408 may receive the broadcasted video and may project/display it on the two screens of display device 402 to create a parallax effect. In addition, ARHT Engine 408 receives video data from camera 406 to broadcast a video of the audience A on audience screen 304. Further, camera 406 may be set at the same height level "h" as stage 404 to ensure that the presenter at the remote location can view the audience reaction and interact with the audience to create an effect that the presenter is physically present at the remote location.

ARHT Engine 408 in auditorium 400 may process the incoming video data and synchronize the display of the (3D) image or hologram of the presenter with the background image while displaying the images on the two screens in display device 402. Further, ARHT Engine 408 may receive video data from camera 406 and process and broadcast it to the studio for the presenter. In addition, the presenter may be able to use ARHT Engine 408 to send commands to adjust any one of microphone 208, speaker 210, light 212, height/zoom/configuration of camera 406, and/or the configuration of stage 404 if the stage is equipped with means to adjust the height and/or location of display device 402.

As will be understood, ARHT engine 306 in studio 300 may communicate with ARHT Engine 408 in the studio via a communication network. The communication network may be a wide area network (WAN), local area network (LAN), the Internet, a fiber optics network, and/or any other communication means.

As will be understood, the reference numerals used to depict ARHT Engine are not an indication that there is a distinction between the components or type of ARHT Engine and/or whether two ARHT Engines will be needed to coordinate the live event. For example, a single ARHT Engine may control all the functions in the studio and the auditorium while remotely communicating to additional computing resources. Similarly, multiple ARHT Engines with different or similar configurations may be used to control the functions.

In addition, as will be explained in greater detail below, ARHT Engine may be a computing device that may include a processor that is adapted to execute stored instructions, as well as a memory device that stores instructions that are executable by the processor. The processor can be a single core processor, a multi-core processor, a computing cluster, or any number of other configurations. The memory device can include random access memory (RAM), read only memory (ROM), flash memory, or any other suitable memory systems. These stored instructions implement a method that includes generating a 3D image of a scene. ARHT Engine may also include a bus that connects the processor to an input/output (I/O) device interface that may be adapted to connect the computing device ARHT Engine to one or more I/O devices. The I/O devices may include, for example, a keyboard, mouse, touchpad, touchscreen, trackball, joy stick, pointing stick, or stylus, among others. The I/O devices may be built-in components of ARHT Engine, or may be devices that are externally connected.

The processor in ARHT Engine may also be linked through the bus to a display interface that may be adapted to connect ARHT Engine to a display device, such as the ones depicted in FIGS. 4-13. The display device may correspond to the display devices shown in FIGS. 4-13 and may include one or more display screen(s), a computer monitor, television, stereoscopic 3D display, camera, projector, virtual reality display, or mobile device.

ARHT Engine may also include a network interface controller (NIC) that may be adapted to connect the ARHT Engine 306 a network via the bus. The network may be a wide area network (WAN), local area network (LAN), or the Internet, or a fiber optics network, among others. Through the network, ARHT Engine may access content such as video and audio clips and/or may broadcast the captured video from studio 300 to display device 402 located at auditorium 400. ARHT Engine may also include a camera interface that may be adapted to connect the ARHT Engine to cameras 308 and/or 406 to capture the live feed of presenter P.

ARHT Engine may also include and/or be connected to a storage device that can include a hard drive, an optical drive, a thumbdrive, an array of drives, cloud storage, or any combinations thereof. In various embodiments, graphical images and/or video data obtained from cameras 308 and 406 may be stored within the storage device.

Figure 17:
FIG. 17 is a block diagram showing the components/environments required for conducting a live event using a three dimensional (3D) image of a presenter and the apparatuses shown in one of FIGS. 4 through 11.

FIG. 17 is a block diagram showing exemplary components/environments required for conducting a live event using a three dimensional (3D) image of a presenter that is not physically present at the same location as the audience. For example, computing equipment in studio 300 may be in bidirectional communication with ARHT Engine 500 via a communication network. Similarly, computing equipment located at the same location as the auditorium 400 may also be in bidirectional communication with ARHT Engine 500. ARHT Engine 500 may facilitate processing of captured video data and background data at the studio 300 and broadcast that data to display system device 402 for audience members A such that the audience may see a three dimensional (3D) image of the presenter. Similarly, ARHT Engine 500 may receive content showing the audience A and may process it and broadcast it to studio 300 for the presenter to see.

While the described examples relate to a live presentation, it will be understood that the embodiments disclosed herein can be used for any type of live communication. For example, ARHT Engine 500 may be used to facilitate video conferences, medical procedures, meetings, training events, marketing, political campaigns, and/or any other type of communication between people at two different locations.

Figure 18:
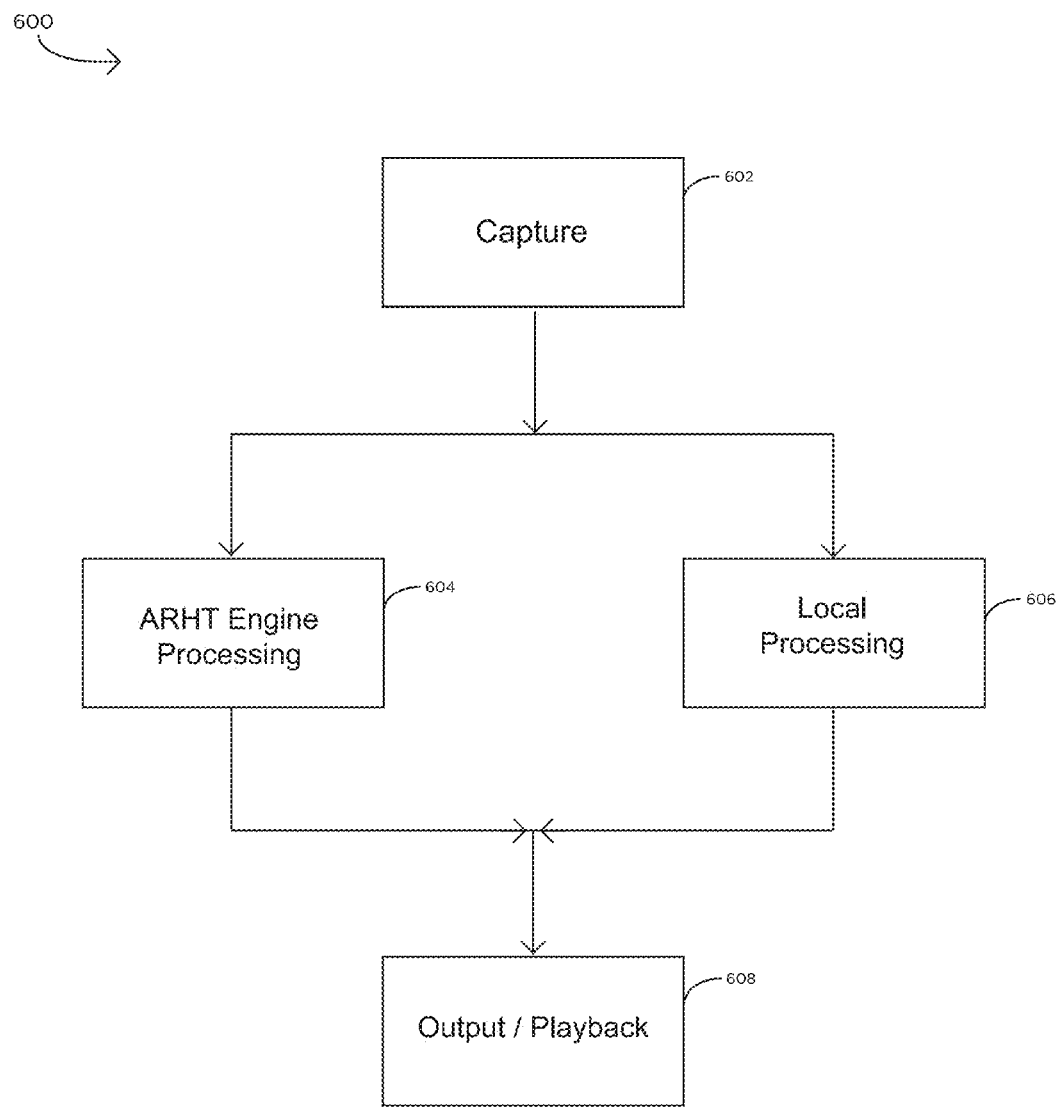
FIG. 18 is a process flow diagram showing a method for conducting a live event in accordance with the embodiments disclosed herein.

FIG. 18 is a process flow diagram showing a method 600 for conducting a live event using the ARHT Engine and display devices disclosed above. The process starts at step 602 where content capturing the presenter's actions and voice is recorded. In addition, capturing step 602 may also include capturing a background image from the background screen in the studio. The process then moves to steps 604 and/or 606 where the captured content is processed. The captured content may be processed by ARHT Engine processing 604. In addition, if additional processing is required, local computing resources may be used to perform additional processing. The processing may include generating a three dimensional (3D) image of the presenter and generating background content if such content was not captured from the background screen at the studio in capturing step 602. In addition, processing steps 604 and 606 may include encrypting the processed content to prepare it for broadcast via secure means. For example, the captured content may be encrypted by generating an encryption key, rendering the encryption key into a form which can be displayed as text, displaying the rendered encryption key so that it can be written down by a user at the studio, and encrypting the information using the encryption key. Different types of encryption may also be used to encrypt the content prior to broadcast. For example, a pseudo-random number generator may be used and/or symmetric or public key encryption may be used. The encrypted content may then be broadcast and may be decrypted prior to being displayed to the audience.

Once the content is broadcast, the process moves to step 608. At step 608, the video content may be received at the location of the live event and may be outputted and displayed on the display device for the audience. The output may include providing a background image and a three dimensional (3D) image of the presenter on a display device as shown in FIGS. 4-13.

Figure 19:
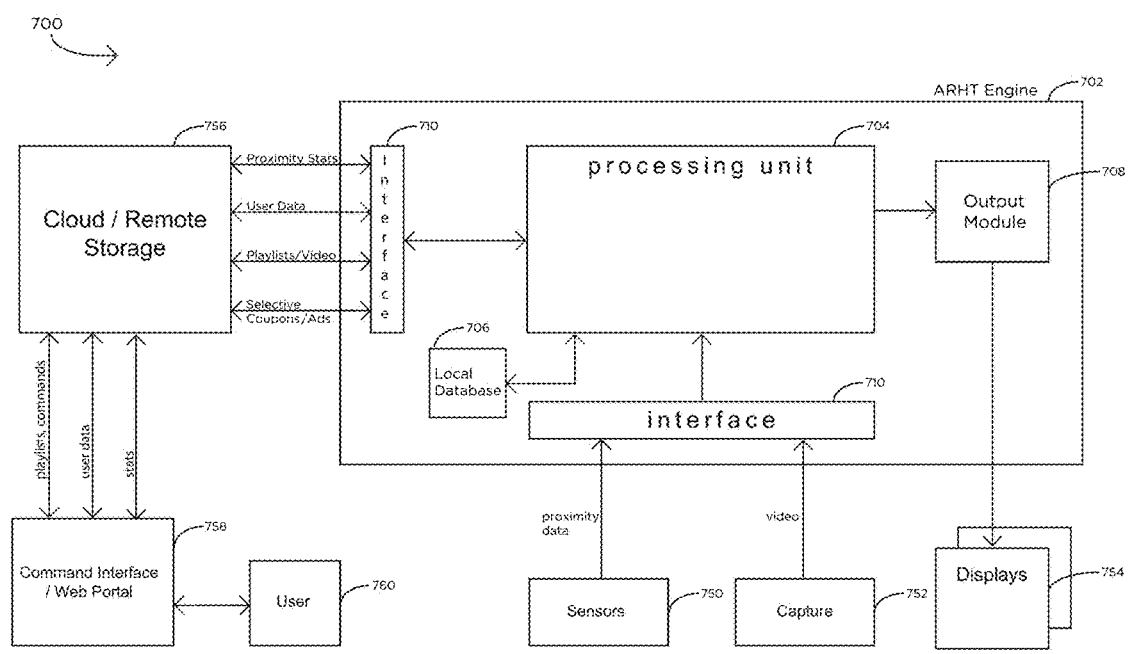
FIG. 19 is a block diagram of a computing environment that may be used to generate, broadcast, present, and capture content in accordance with the disclosed embodiments.

FIG. 19 shows a block diagram of a computing environment 700 that may be used to generate, broadcast, present, and capture content in accordance with the disclosed embodiments. ARHT Engine 702 includes a processing unit 704, a local database/storage device 706, output module 708, and interfaces 710.

Processing unit 704 may include a processor that is adapted to execute stored instructions. The processor can be a single core processor, multi-core processor, computing cluster, or any number of other configurations. Local database 706 may include a memory device that can include random access memory (RAM), read only memory (ROM), flash memory, or any other suitable memory systems. Local database 706 may store instructions that may be executed by processing unit 704 and may also include additional content such as playlists, proximity data, advertisements, coupons, graphics, statistics recorded based on user interactions, and/or any other type of data may be used to generate display content. Output module 708 may receive data from processing unit via one or more buses and may output this data to displays 754 directly and/or via one or more interfaces 710. Displays 754 may correspond to one or more display devices shown in, for example, FIGS. 4-13 and may be used to display three dimensional (3D) images and/or background images.

ARHT Engine 702 may also be communicatively coupled to one or more sensor(s) 750 and video capture component 752 via interface 710. When a user is within a detection zone of display 754, sensors 750 may detect the user's presence and may begin generating proximity data based on the user's presence and interaction with display 754. For example, if display 754 is displaying an advertisement of a particular product, sensor 750 may detect that the user is spending time viewing the advertisement by detecting the presence of the user beyond a predetermined threshold of time. In addition, sensor 750 may also generate proximity data based on detection of the user's actions. For example, if the user scans a QR code on the advertisement being displayed on displays 754, sensor 750 may generate proximity data based on this interaction. All this proximity data may be provided to processing unit 704 via interface 710. Processing unit 704 may then process this proximity data to determine various statistics about the displayed content. Processing unit 704 may also be able to use the proximity data provided by sensor 750 to generate customized content and provide it to output module 708 to display it to the user on displays 754.

For example, the proximity data may include a skeletal map of the user and processing unit 704 may use this skeletal map to determine the gender, age, race, and/or other characteristics about the user. Further, iBeacon information from the user's phone may be used to search for the user's profile that may be stored in local database 706. An iBeacon deployment consists of one or more radio beacon devices that transmit their own unique identification number to the local area. Software on a receiving device may then look up the iBeacon and perform various functions, such as notifying the user. Receiving devices can also connect to the iBeacons to retrieve values from iBeacon's generic attribute profile service. iBeacons do not push notifications to receiving devices (other than their own identity). Mobile software can use signals received from iBeacons to trigger their own push notifications. For example, as will be disclosed in detail below with respect to FIG. 27, iBeacon communications may include a mobile device of a user viewing displays 754 connecting with local database 706 and/or remote storage 756 for the system to identify the user's profile such that it could be updated based on the interaction and/or content may be targeted to the user based on the profile. When used herein, an iBeacon may correspond to any type of radio beacon that uses low power Bluetooth transmitters and the Bluetooth protocol to communicate between two devices.

This may be the case where the computing environment 700 is placed at a concert arena and displays 754 are displaying content related to the sale of a ticket. The user may then interact with QR codes on the displays 754 and/or may use an application on his/her personal phone to purchase a ticket in response to the advertisement that is being displayed on displays 754. As part of purchasing this ticket, the user may log into his/her account with the company that was advertising the ticket. This process may cause processing unit 704 to recognize the identity of the user based on the stored profile of the user and processing unit 704 may generate additional content that is targeted to this particular user.

Similarly, sensor 750 may provide proximity data that may be used to adjust the display of displays 754 in real-time. For example, displays 754 may be displaying an advertisement in a continuous loop on the displays. Upon detection by sensor 750 that a user is viewing the advertisement, processing unit 704 may change the display on display 754 by providing a "welcome" screen to the user and may play additional predetermined clips based on the nature of the interaction. For example, if the user continues to be engaged, displays 754 may display different clips encouraging the user to purchase tickets or seek additional information by scanning the QR code. If sensor 750 detects that the user is losing interest and/or is walking away, processing unit 704 may adjust the display to display content that may be customized for the user (e.g., sport news, song that is currently trending, etc.). Similarly, content may be displayed on displays 754 that may encourage the user to connect with the advertiser via social media.

Local database 706 may also store a unique identifier that may identify repeat customers, users that have interacted with computing environment 700 before, and/or have profiles with the stores where the computing environment is being displayed. In addition, local database 706 may include a unique identifier that may be associated with the iBeacon information of the user that may assist ARHT Engine 702 in recognizing the user that is viewing displays 754. The purpose of the proximity data is to collect as much information as possible about a user interaction with content being displayed on displays 754. This collected information may be used to determine the performance and engagement level of the advertising and/or advertising clips being displayed on displays 754. In addition, the collected information may also be used to recognize the user and/or characteristics of the user and to adjust, in real-time, the content being displayed on displays to keep the user engaged and interested.

In addition, ARHT Engine 702 may also use the proximity data to periodically generate reports about customer engagement and/or performance of various advertisements at various times. These reports may be displayed to a system administrator and may be used to design future advertisement campaigns. In addition, proximity data may also be used to bill the advertiser such that the advertiser may be responsible for paying for advertisements that received a level of interest by user's beyond a predetermined threshold (e.g., user interacted for more than three seconds, user connected via social media in response to the call for action, user scanned QR code, and/or user purchased item in response to advertisement).

ARHT Engine 702 may also be connected to capture component 752 that may provide video content to ARHT Engine 702. For example, capture 752 may represent the video data that may be broadcast from studio 300 such that processing unit 704 may then process and display this content on displays 754 in auditorium 400 for a live audience. Capture 752 may indicate video data being received from an auditorium showing the reaction of an audience during a live performance as disclosed above. Capture 752 may also indicate the capturing of video data representing the user that is interacting with displays 754 in order to, in real-time, generate and display a regular image and/or a three dimensional image of the user on displays 754 to make it appear as if the user is part of the content being displayed. Seeing his/her own image on displays 754 may increase the likelihood of the user continuing to interact with content being displayed on displays 754. In addition to skeletal data, data received from capture component 752 may be used to implement facial recognition techniques such that processing unit 704 may use this data to determine the gender, age, race, and/or other characteristics about the user.

In addition to storing content in local database 706, ARHT Engine 702 may also be communicatively coupled to cloud/remote storage device 756. Remote storage device 756 may be a hard drive, an optical drive, a thumbdrive, an array of drives, cloud storage, or any combinations thereof. ARHT Engine 702 may exchange proximity data, user data, playlists, advertisement data, and/or coupon data with remote storage 756. For example, in order to preserve space, local database 706 may not be included in ARHT Engine 702 and ARHT Engine 702 may communicate with remote storage 756 in real-time to retrieve playlists or advertisement content to be displayed on displays 754. In addition, ARHT Engine 702 may provide playlists and/or coupon data that identifies the level of interest in particular playlists and/or coupons or advertisements. This data may be used by remote storage 756 to generate and provide updated playlists and advertisements to be displayed for future users. Similarly, if ARHT Engine 702 recognizes a user's identity during an interaction with displays 754 and ARHT Engine 702 cannot detect suitable advertisement or content to be displayed, ARHT Engine 702 may retrieve such targeted content from remote storage 756 and display the same on displays 754.

Further, content stored in local database 706 may be periodically refreshed by communicating with remote storage 756. For example, advertising campaigns relating to the holiday season may be provided to local database 706 without a user having to physically go to the location of ARHT Engine 702 to update the content stored in local database 706.

Proximity data may also be provided to remote storage 756 to preserve memory capacity in local database 706. In addition, remote storage may also be used to backup and mirror the data stored in local database 706 such that in the event of a memory failure in local database 706, the local database may be restored based on the mirrored data in remote storage 756.

Computing environment 700 may also include a command interface/web portal 758 that may be used by a user 760 to configure remote storage 756 and/or ARHT Engine 702. For example, web portal 758 may represent a computer that may be used by user 760 to input new playlists, advertisements, coupons, and/or additional data into remote storage 756 and/or local database 706. Similarly, user 760 may use web portal 758 to access proximity data and/or other statistics advertisement performance, coupon statistics, and/or interaction information to determine the performance of advertisements and/or to generate bills for advertisers.

As will be understood, the components and locations of the components shown in FIG. 19 are exemplary and ARHT Engine 702 may be implemented in various different configurations. For example, sensors 750 may be included within ARHT Engine 702. Further, ARHT Engine 702 may be implemented without a local database 706 and/or without any remote storage 756. Similarly, there may be additional components and/or connections that may be included within ARHT Engine 702.

Figure 20:
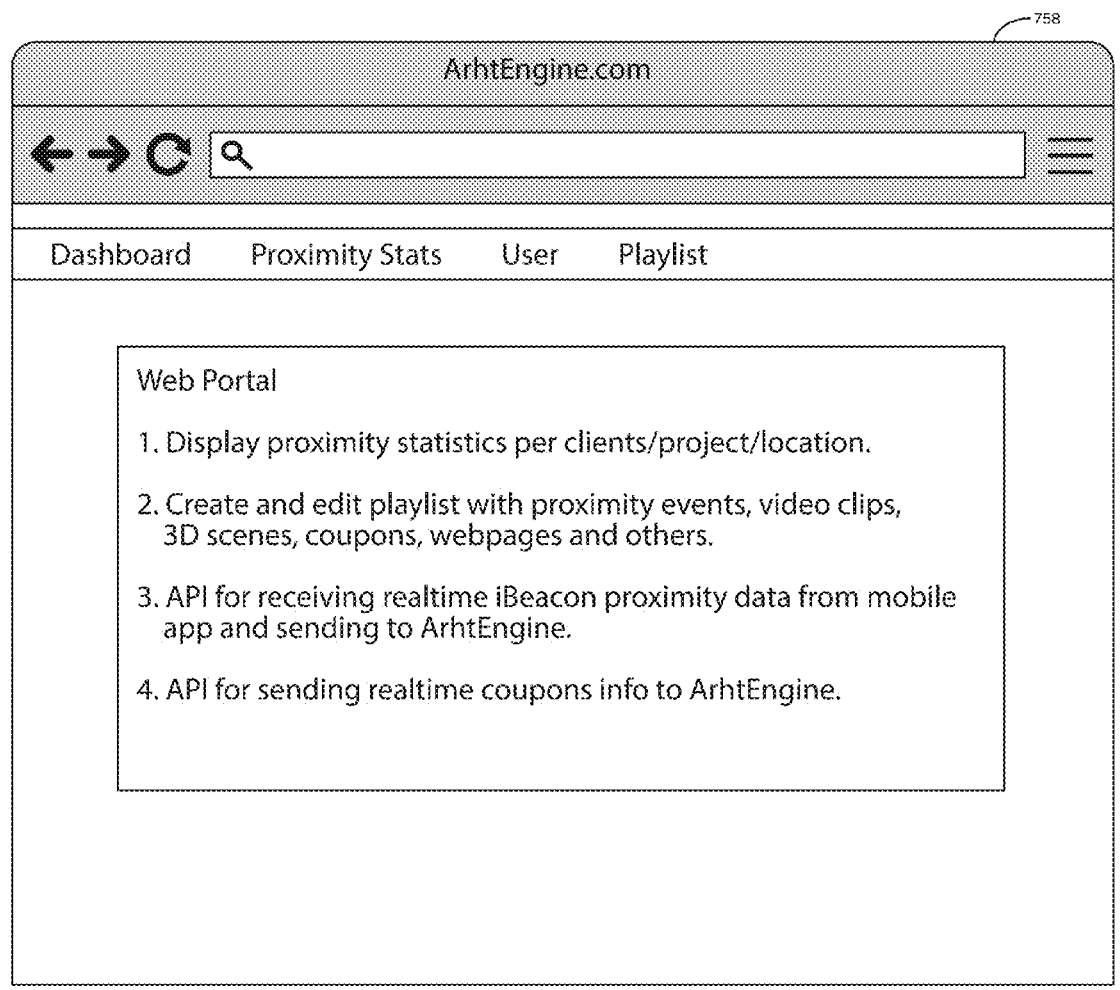
FIG. 20 is a screenshot of a portal that may be used by a user to configure a computing environment used to generate, broadcast, present, and capture content.

FIG. 20 is a screenshot showing an exemplary web portal screen 758 that may be used to configure ARHT Engine 702 and/or to view or download data that is generated by ARHT Engine 702 based on interactions with displays 754. For example, web portal 758 may be used to retrieve proximity reports; create and edit playlists, video clips, 3D scenes, and/or coupons; receive iBeacon proximity data; and/or to send real-time coupon information to ARHT Engine 702. Additional options may also be included in web portal 758. For example, there may be an option for an administrator to control holo-porting and/or the broadcast of a live event as explained above with respect to FIGS. 14-18.

Figure 21:
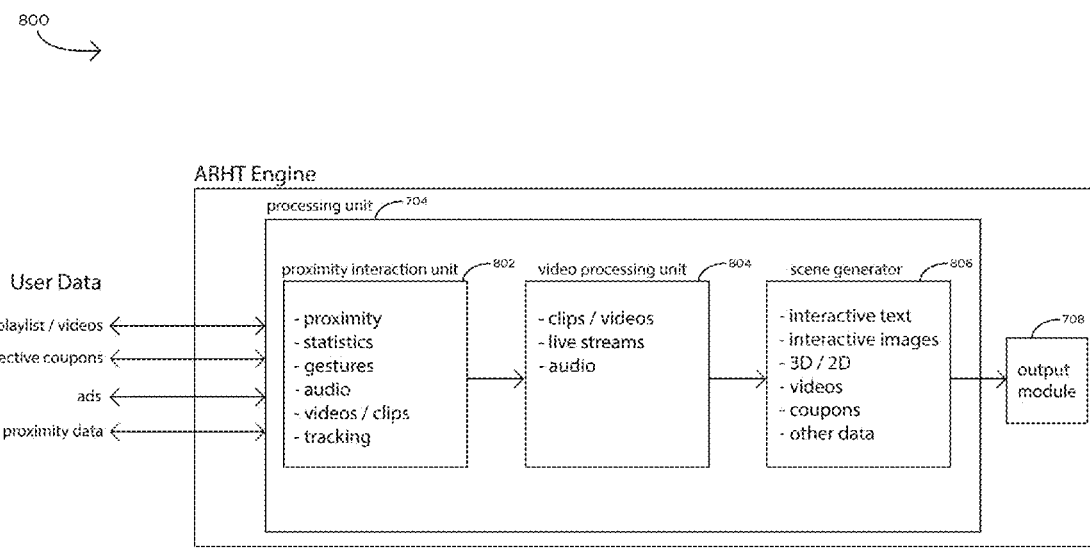
FIG. 21 is a block diagram of a processing engine 702 shown in the computing environment depicted in FIG. 19.

FIG. 21 is a block diagram of a processing unit 704 in ARHT Engine 702. As shown in FIG. 21, processing unit 704 may include a proximity interaction unit 802, a video processing unit 804 (e.g., a graphical processing device), a scene generator 806, and the previously discussed output module 708. Proximity interaction unit 802 may relate to processing and generating all the information relating to the interaction of a user with displays 754 of ARHT Engine. For example, the proximity interaction unit 802 receives proximity data and uses it to detect characteristics of a user, recognize the user, retrieve profiles about the user, generate statistics about interactions of the user, detect gestures of the user, and track user movement including head tracking. Using proximity data provided by sensors, proximity interaction unit 802 may be able to detect the gender of the user. Further, proximity interaction unit 802 may be able to detect the position of the head of the user, and as the user moves in front of the display, the proximity interaction unit may adjust the data representing video clips and audio clips being displayed such that the user may experience that he can see the content in 3D from different angles in displays 754, as if the content is following him/her. As will be explained in detail below with respect to FIGS. 39 and 40, head tracking is achieved by matching a position of the virtual camera that renders virtual 3D scene with a position of the viewers head. Including head tracking techniques within ARHT Engine 702 may ensure a better viewing experience as the content being displayed will adjust based on the viewing angle of the user.

In addition, proximity and interaction unit 802 may also be able to use proximity data to detect that multiple users are present in front of display 754 and may use this information to generate content that may be customized based on the characteristics of the group. For example, using skeletal maps included in proximity data, proximity interaction unit 802 may detect that a group including a family with small children is viewing content. In response to this detection, ARHT Engine 702 may generate advertisements relating to an upcoming concert of Disney Characters. In contrast, proximity interaction unit 802 may detect that a group including five men is viewing content, in response to which ARHT Engine 702 may generate advertisements relating to an upcoming action movie.

Proximity interaction unit 802 may also be used to determine the user that will be targeted by ARHT Engine if two users are viewing displays 752. For example, proximity interaction unit 802 may detect that one user has already purchased a ticket and/or has already scanned a QR code from an advertisement that was displayed based on iBeacon information and/or the user's stored profile or unique identifier. In response to such detection, proximity interaction unit 802 may begin displaying content that is targeted to the second user and may begin tracking the movement of the second user and may adjust the display content based on head tracking of the second user.

Video processing unit 804 may process live video, clips, audio, coupons, advertisements, and/or generate content for both the foreground and background screens of displays 754. Generating content for both screens may include synchronizing the content of the two screens to provide a simulated 3D viewing experience. In addition, video processing unit 804 may adjust the content by selecting content and/or advertisements based on the data received from the proximity and interaction unit 804.

Scene generator 806 may include interactive text, interactive images, 3D or 3D images, videos, coupons, and/or other data that may be used to ensure proper rendering of content on display screens 754. Scene generator 806 may in essence stitch the scene together and process all the video and audio data and provide it to output module 708 in a ready to display format.

While proximity and interaction unit 802, video processing unit 804, and scene generator 806 are shown as separate components in processing unit 704, it may be understood that all of these components may be implemented in a single component and/or all of these functionalities may be provided by one of the units. For example, proximity and interaction unit 802 may also perform the functionality of video processing unit 804 and scene generator 806.

Figure 22:
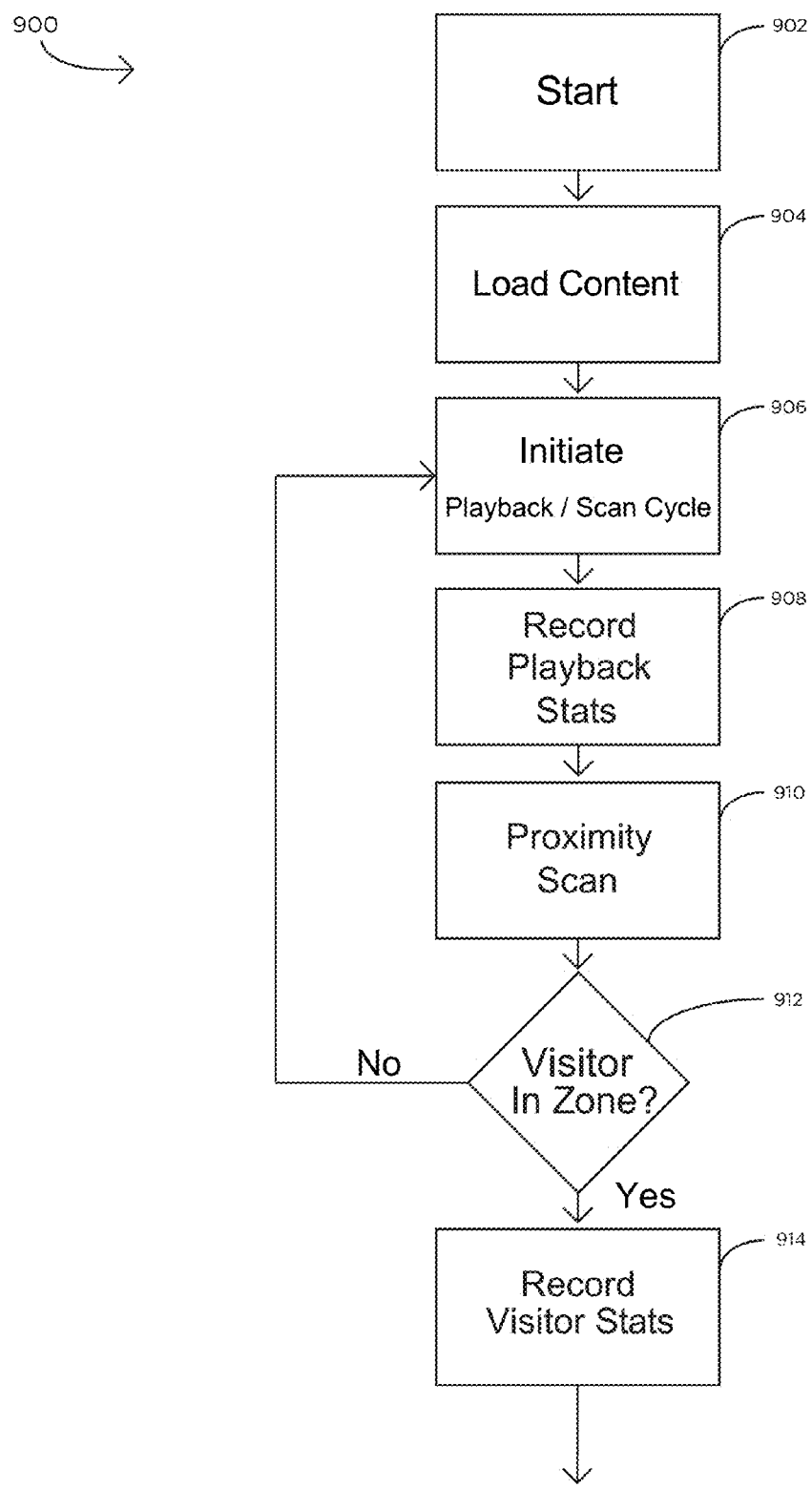
FIG. 22 is a process flow diagram showing a method for performing a scan cycle in accordance with the disclosed embodiments.

FIG. 22 is a process flow diagram showing a method 900 for performing a scan cycle in accordance with the disclosed embodiments. The method may be performed when processing unit 704 executes instructions stored in memory of the local database. The method starts at step 902 and proceeds in to step 904 where content may be loaded on to the local database of ARHT Engine. Content may be loaded in real-time from remote storage, from a live broadcast from a studio where a presenter is hosting a live event, and/or may be loaded by selecting content from the local database. The content may be video data, background images, foreground images, three dimensional images, depth maps, audio data, advertising data, coupons, and/or any other type of data.

Method 900 may proceed to step 906 where the loaded content is played on one or more screens of display devices and ARHT Engine may simultaneously begin a scan cycle to control the playback of the content. For example, during scan cycle ARHT Engine may ensure that the background and foreground images are synchronized to create a 3D visual experience. The content may be displayed on one or more of display devices depicted in FIGS. 4-13.

In step 908, ARHT Engine may record playback statistics about the content being displayed. Step 908 may continue to be performed during performance of method 900 and until no more data is being displayed. The statistics may for example record the time and type of content being displayed, the frequency with which the content is displayed, and/or the resources required to play the content. The statistics may also include information about the live performance that is being performed by performer and the reaction and level of interaction of the audience in a remote location as explained with respect to FIGS. 14-17.

In step 910, ARHT Engine may perform a proximity scan using, for example, sensors and/or computing resources of processing unit 704. The proximity scan may detect whether one or more users are within a predetermined proximity zone of the display screens. The proximity scan includes generation and/or reception of skeletal data and/or additional data about a user that may be present within the proximity zone. In step 912, ARHT Engine may determine whether the proximity scan resulted in identifying that a visitor and/or user may be in the proximity zone. For example, the local database may include a threshold distance value and processing unit may include a comparator such that the comparator may compare distance information received via the proximity scan with the threshold distance value stored in the local database. If the comparator determines that the distance information indicates a distance that is less than or equal to the threshold distance value then ARHT Engine may confirm that a user is present within the proximity zone and the method may proceed to step 914. If the comparator indicates that the distance is greater than the threshold distance value, the method may return to step 906 where playback of content may continue.

In step 914, ARHT Engine may begin generating and recording visitor statistics. Visitor statistics may include, for example, information about the visitor's interaction, the time the visitor is spending interacting with the display screens, any actions or gestures performed by the user (e.g., scanning of QR code or responding to a call for action by downloading an application or connecting to social media), skeletal data corresponding to the user, the user's iBeacon information, and/or unique identifier. This information may be generated based on proximity data received from sensors and may be stored in local database or may be provided to remote storage. Similar to step 908, step 914 may be continuously performed until the visitor leaves the proximity zone.

Figure 23:
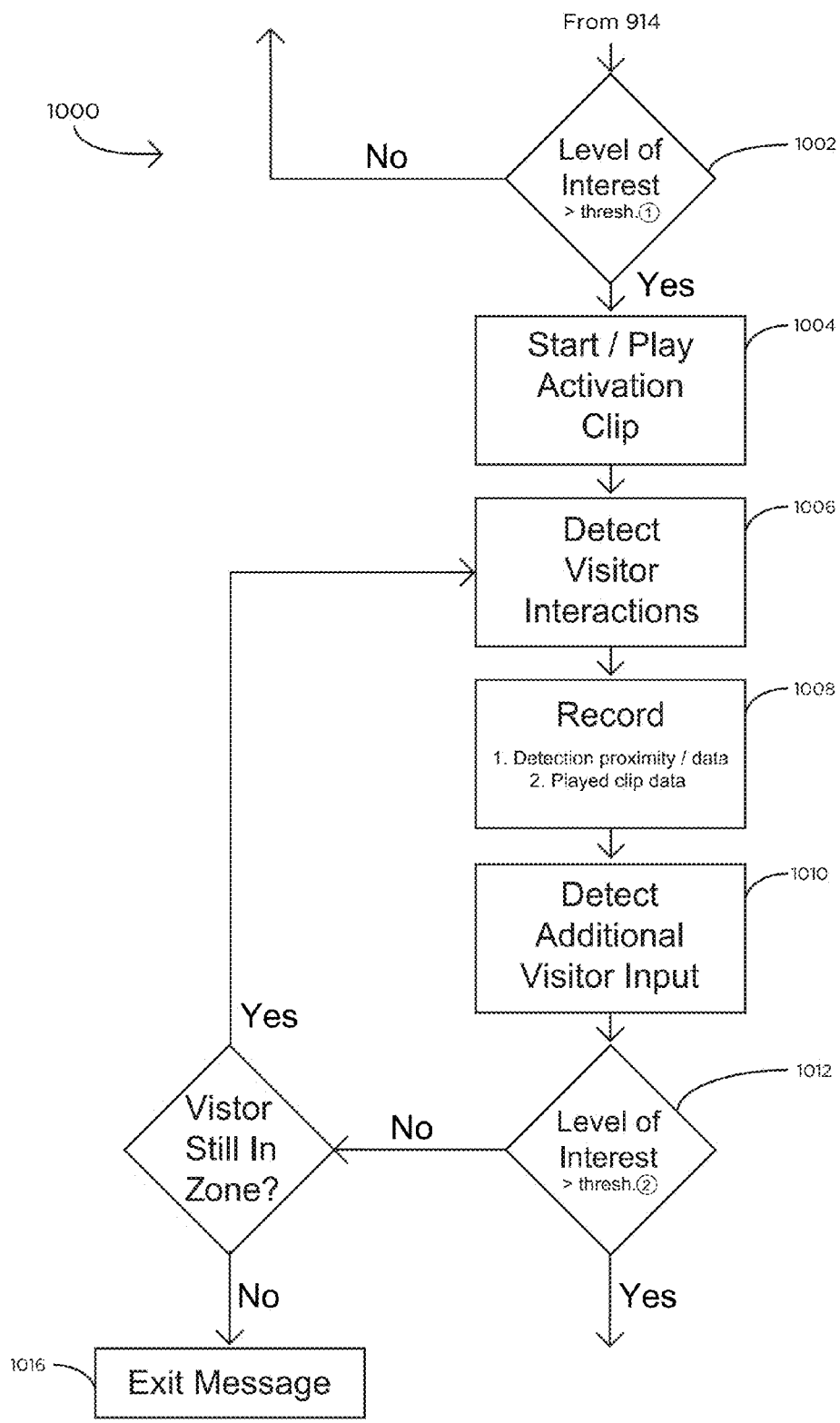
FIG. 23 is a process flow diagram showing a method for performing an activation cycle in accordance with the disclosed embodiments.

Method 900 may continue to method 1000 that is shown in FIG. 23 as a method for performing an activation cycle. Step 1002 may include determining the level of interest (LOI) of visitor that was detected to be within the proximity zone in method 900. LOI may be based on a predetermined threshold and may be determined by using a comparator that may compare the predetermined threshold with information about the visitor interaction that may be generated based on collected proximity data. For example, LOI may include a threshold identifying a time period in seconds that a user is required to spend in the proximity zone before ARHT Engine determines that the visitor has met and/or exceeded the LOI. Additional examples of LOI thresholds include, criteria identifying an action or gesture by a user (e.g., downloading an application, scanning a QR code, and/or connecting with the advertiser via social networking).

If step 1002 determines that the user's LOI does not exceed the predetermined threshold value, the method may return to step 906 to continue playback and may include restarting the playback clip for additional visitors. This may occur when, for example, the visitor leaves the proximity zone before reaching the threshold hold time value.

If the user's LOI exceeds the predetermined threshold value, the process may continue to step 1004 where different content may be selected by ARHT Engine and a new clip may be activated. The new clip may be selected based on detection of one or more characteristics of the visitor and may be targeted specifically to the user. The characteristics of the user may include, for example, approximation of the visitor's gender, race, age, weight, height, clothes, iBeacon information, type of smartphone, types of applications on the visitor's smartphone, profile information stored in local database, social media profile of the user, a user profile of the user stored in the local database, and/or a unique identifier associated with the user. The content may be selected from local database and/or may be retrieved or pushed from remote storage in real-time. The new clip may include, for example, an advertisement targeted to the user, a coupon related to the clothes that the user may be wearing, a song from a favourite artist of the user, and/or ticket information about a concert or event that may be determined to be of interest to the visitor.

After activation of the clip in step 1004, the method may proceed to steps 1006, 1008, and 1010 where additional information about the user's interactions and statistics about the content being played may be recorded as explained with respect to steps 908 and 914. For example, ARHT Engine may detect that the visitor continues to interact with the content and may use this information to generate additional proximity data about the interaction. The recorded statistics may also include generating information identifying the clips/advertisements that are being displayed, timestamps associated with playback, gesture information about the user, and/or any additional information that may be useful to learn more about the interaction.

Next, the method may proceed to step 1012 where another determination similar to the LOI determination of step 1002 may be performed. The LOI threshold values at step 1012 may be of a more advanced complexity from that LOI threshold values at step 1002. For example, the second LOI threshold values may include recognizing that the user has indicated interest to purchase an item being displayed and/or the user has continued to interact with the display system for one minute. Additional types of LOI threshold values may also be selected based on criteria provided by an advertiser whose advertisements are being targeted to the visitor.

If visitor is determined to not meet the second LOI threshold, the process may proceed to step 1014 where it may be determined if the user is still in the proximity zone. If the user is determined to not be in the proximity zone, the method may proceed to step 1016 where ARHT Engine may display an exit message on display screens. The exit message may be, for example, a thank you message to the user and/or may be a message encouraging the user to come back into the proximity zone.

If it is determined at step 1014 that the visitor is still in the proximity zone but has not met the second LOI threshold, the method may return to step 1004 where additional content may be selected to encourage the visitor to increase his/her interest.

Figure 24:
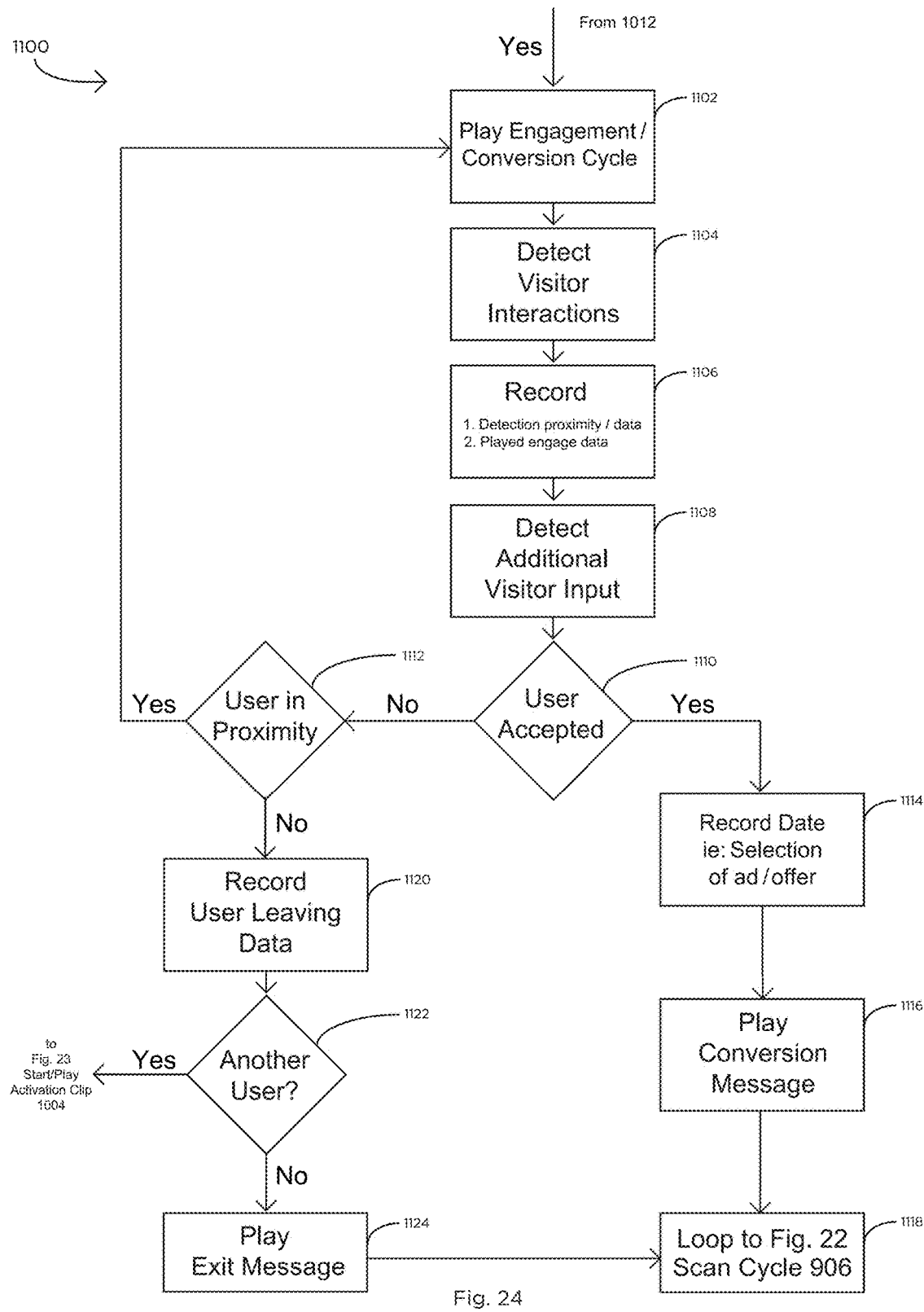
FIG. 24 is a process flow diagram showing a method for performing an engagement and/or conversion cycle in accordance with the disclosed embodiments.

Returning now to step 1012, if it is determined that the visitor's LOI has exceeded the second threshold, the process may move to step 1102 of method 1100 that is shown in FIG. 24 and that corresponds to an engagement and/or conversion cycle. In step 1102, ARHT Engine may play content relating to the engagement and/or conversion cycle. Engagement and/or conversion cycle may relate to displaying data encouraging a user to complete a purchase and/or complete a call for action. As a comparison, the initial content displayed upon detection of the visitor in the proximity zone may be a welcome message encouraging the user to step closer to the display screens, the content being displayed after the first LOI threshold is exceeded may relate to targeted advertisement encouraging the user to show interest in scanning a QR code and/or to gesture to find out more information about the advertised product, and the content being displayed in the engagement and conversion cycle after detection of second LOI threshold may be, for example, based on the visitor trying to complete a transaction by purchasing a ticket and may correspond to content relating to a "check out" screen where a user may be able to complete the transaction.

Upon activation of the engagement and conversion cycle in step 1102, method 1100 may proceed to steps 1104, 1106, and 1108, where additional information about the user interaction and displayed content may be generated and stored similar to steps 1006, 1008, and 1010. Next, in step 1110, it may be determined whether the user/visitor has performed an action that indicates that the user has now completed the call for action and/or transaction as part of the engagement cycle. For example, process 1100 may move to step 1114 if it is determined that the visitor has completed the engagement cycle by purchasing a ticket. In step 1114, information about the transaction may be recorded (e.g., the type of ad or offer the user showed a high level of interest and/or the ticket that the user bought) and the process may move to step 1116 where a conversion message may be displayed. This conversion message may thank the user for the purchase, provide the user with additional options for purposes of up selling, and/or seek feedback from the user about the transaction. Next, the method may move to step 1118, which indicates that process may return to step 906.

Returning now to step 1110, if it is determined that the user has decided not to complete the transaction, the process may move to step 1112 where it may be determined whether the user is still in the proximity zone. If the user is determined to still be in the proximity zone, the method may move back to step 1102 where additional content relating to the engagement cycle may be selected for display to encourage the user to complete the transaction. For example, the additional content may include offering a deeper discount and/or an additional coupon to the user.

If it is determined that the user is not in the proximity zone in step 1112, the method may move to step 1120 where user leaving data is recorded. Next, the method moves to step 1122 where it may be determined whether another user is in the proximity zone. If another user is determined to be in the proximity zone the method may move to step 1004 and/or step 906 depending on the LOI that has been detected from the second user. If, however, a second user is not detected at step 1122, the method may move to step 1124 where an exit message may be played, and after playing the exit message the method may loop back to step 906.

As will be understood, FIGS. 22, 23, and 24 display exemplary processes corresponding to the scan, activation, and engagement cycles of ARHT Engine. These processes may be performed without using all the steps that are illustrated in these Figures. For example, the processes may be performed using only one LOI threshold value such that the method may move from scan cycle to conversion cycle if the first LOI threshold value is met. Another example is that the process may be performed without recording information relating to the user interaction and/or without playing an exit message or any message encouraging the user to continue a transaction. In addition, the steps may be performed in any order and the sequences shown in FIGS. 22, 23, and 24 do not indicate a strict sequence that is required in performing these methods.

Figure 25:
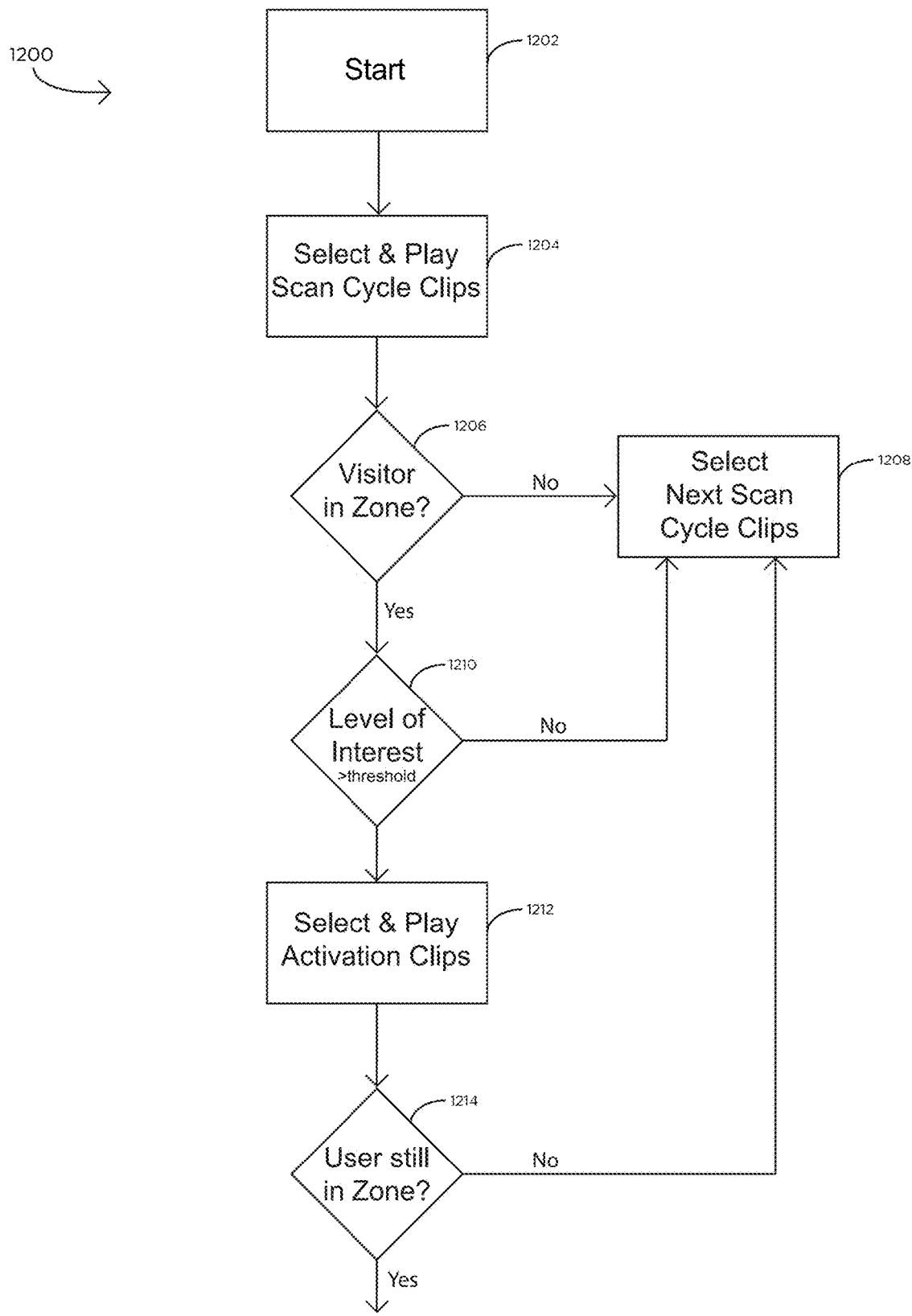
FIG. 25 is a process flow diagram showing a method for performing a scan and activation cycle in accordance with the disclosed embodiments.
Figure 26:
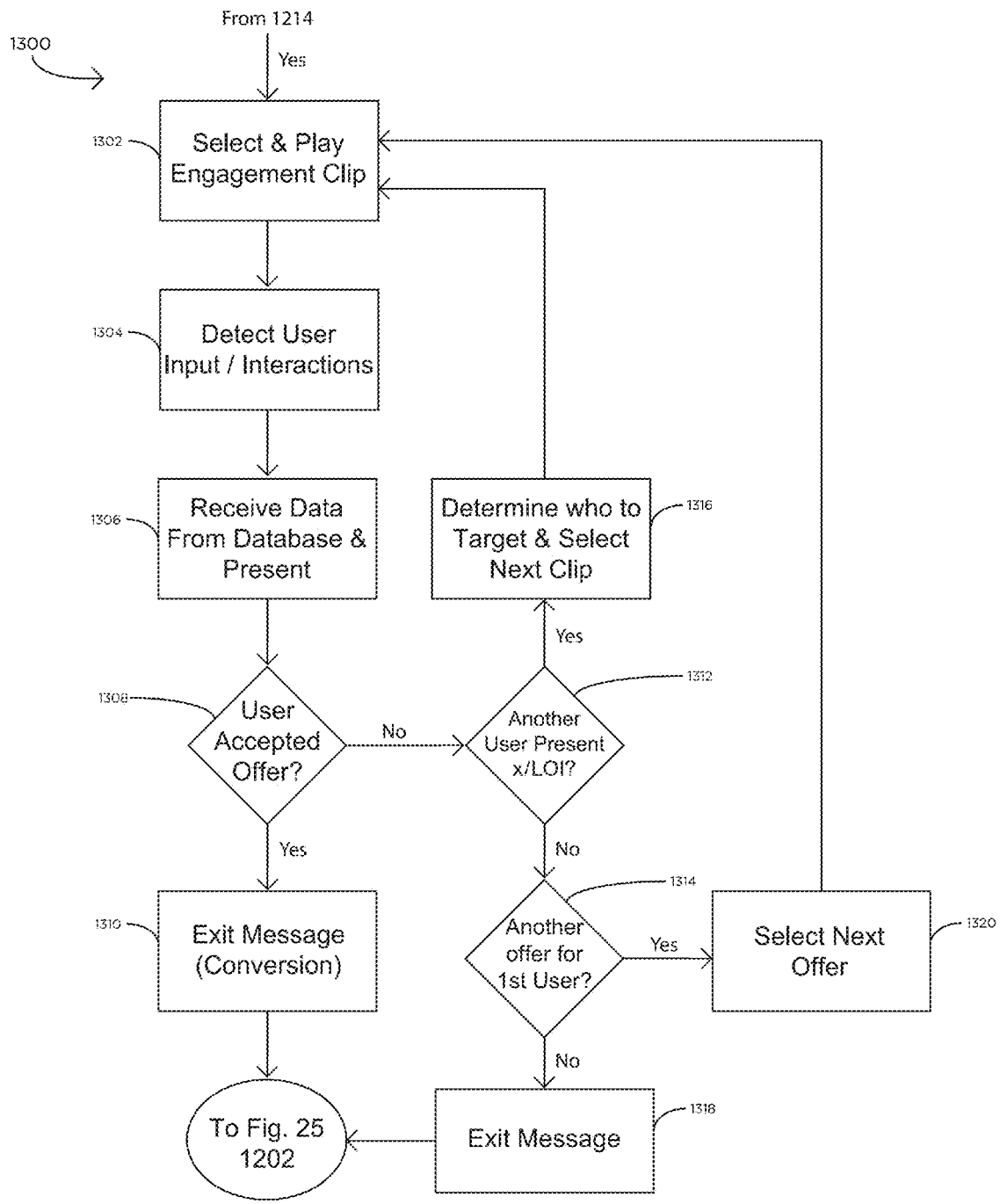
FIG. 26 is a process flow diagram showing a method for performing an engagement and/or conversion cycle in accordance with the disclosed embodiments.

For example, FIGS. 25 and 26 show another embodiment of performing a scan, activation, and engagement cycle without using two LOI thresholds. Processes 1200 and 1300 include steps that are similar to steps described above with respect to FIGS. 22, 23, and 24 except for step 1312 which relates to the scenario where multiple users may be present in the proximity zone. If ARHT Engine detects that multiple users are present in the proximity zone, ARHT Engine may either decide to display content based on the characteristics of the viewing group (e.g., advertising circus tickets if a family is detected to be in the proximity zone) and/or ARHT Engine may make a determination on which user to target (step 1316). For example, ARHT Engine may determine that one of the users is interacting more and may therefore decide to target content based on the characteristic of that user. The remaining steps of processes 1200 and 1300 may be understood based on the steps described in FIGS. 25 and 26 and the descriptions of similar steps in FIGS. 22, 23, and 24.

Figure 27:
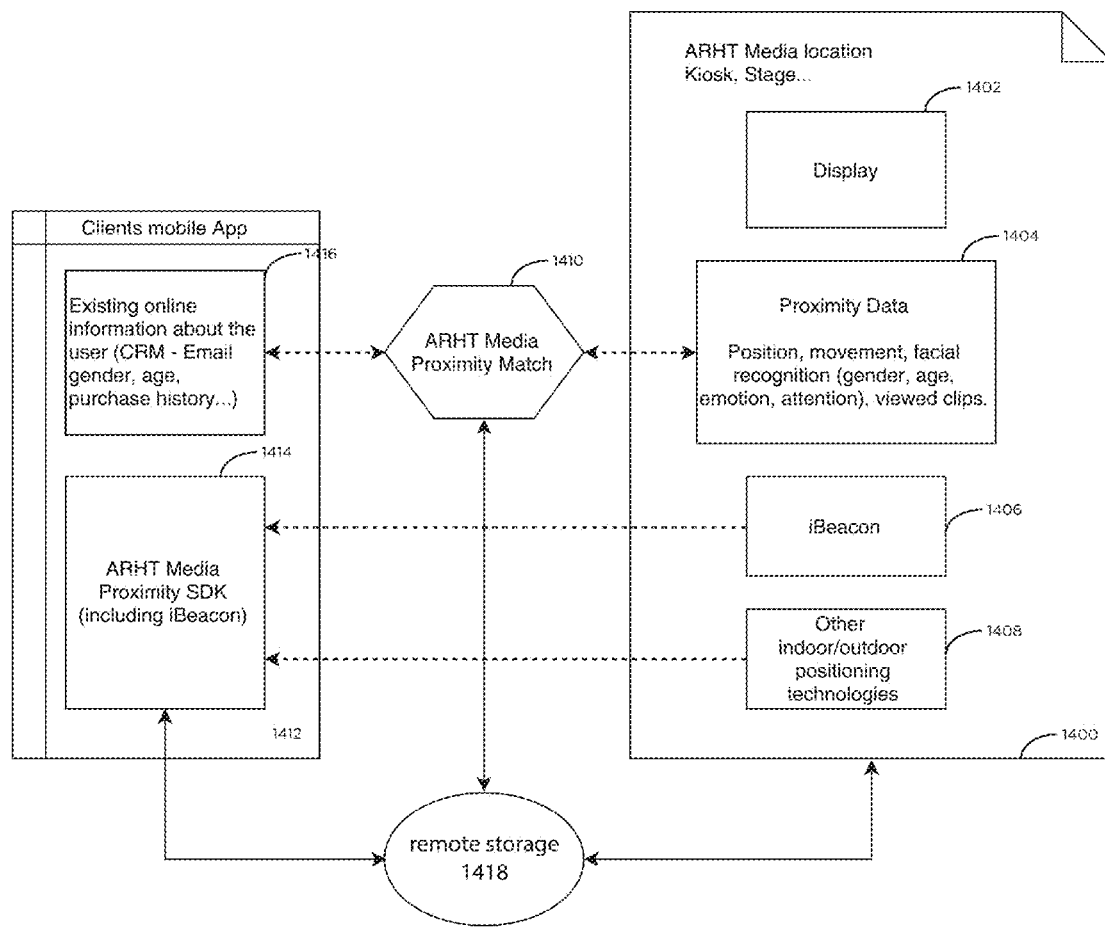
FIG. 27 is a block diagram showing the implementation of beaconing and identifier technology in accordance with the disclosed embodiments.

FIG. 27 shows a block diagram describing various components that may be used to match a mobile device or tablet user to an audience member or visitor within the proximity of a display device 1402. For example, in one embodiment, a visitor may be in proximity to an ARHT media location 1400, such as an auditorium 400 or an advertising kiosk. ARHT media location may refer to either the environment containing the systems described in FIGS. 4-13, or it may refer more specifically to the ARHT engine 702. The ARHT media location 1400 includes a display system 1402 that may include two screens. Display system 1402 may be any one of the systems disclosed in, for example, FIGS. 4-13 and may be used to present a three-dimensional (3D) image. Proximity data 1404 may be gathered for visitors in proximity to the ARHT media location 1400, including, for example, visitor position, movement, facial recognition information (such as gender, age, emotion, level of attention), and number of viewed clips. The ARHT media location may further contain one or more iBeacons 1406 that may broadcast their unique identifier to nearby mobile devices. Multiple iBeacons may be used in order to accurately triangulate the position of a mobile device in proximity to the ARHT media location 1400. Additionally, the ARHT media location may incorporate other components for or data from indoor and/or outdoor positioning technologies, such as GPS, Wi-Fi-based positioning systems, Bluetooth, or any other system used for positioning.

A visitor in proximity to ARHT media location 1400 may possess a mobile device, which may be running one or more mobile applications 1412. Such a mobile application may incorporate the ARHT Media Proximity SDK 1414, which provides iBeacon support. Additionally, the mobile application 1412 may contain existing customer relationship management ("CRM") data about the user 1416. CRM data 1416 may include the user's email, gender, age, purchase history, or any other information gathered by the mobile application 1412, whether entered manually by the user or obtained automatically.

Mobile application 1412 may be communicatively coupled to remote storage 1418. Remote storage 1418 may be cloud storage, a hard drive, a thumbdrive, an array of drives, or any combinations thereof. Mobile application 1412 may be configured to send position and movement information to the remote storage 1418. Such position and movement data may include iBeacon position information, cellular signal data, Wi-Fi signal data, inertial data, any other positional or movement data, or any combinations thereof. Further, mobile application 1412 may be configured to send CRM data 1416 to the remote storage 1418.

The ARHT engine may also be communicatively coupled to remote storage 1418. ARHT media location 1400 may receive position and movement information data corresponding to a visitor in proximity to the ARHT media location from remote storage 1418. Similarly, the ARHT engine may receive CRM data 1416 corresponding to a visitor in proximity to the ARHT media location from remote storage 1418.

The ARHT engine may further combine data received from remote storage 1418, which may include position, movement, and CRM data corresponding to a visitor in proximity to the ARHT media location, to calculate a proximity match 1410. The proximity match 1410 corresponds to a unique visitor within the proximity of the ARHT media location.

Determination of a proximity match 1410 may be described by way of example. For instance, there may be three unique visitors, each carrying a mobile device containing one or more mobile applications 1412, within the proximity of an ARHT media location 1410. The ARHT engine may gather proximity data 1404 corresponding to each of the three visitors. However, the ARHT engine, relying on proximity data 1404, may be unable to determine which visitor corresponds to which mobile device without additional information. Accordingly, using position and movement data retrieved from remote storage 1418, the ARHT engine can match the retrieved position and movement data to the proximity data 1404 corresponding to an individual user. In the case that more than one set of position and movement data retrieved from remote storage 1418 matches a single set of proximity data 1404, the ARHT engine can further compare, for example, gender information processed using facial recognition techniques to CRM data 1416 received from remote storage 1418. Thus, by combining the received data from remote storage 1418 with proximity data 1404, the ARHT engine may generate a proximity match 1410 between a unique visitor and a mobile device.

As will be understood, the components and locations of the components shown in FIG. 27 are exemplary and a proximity match 1410 may be generated using various different configurations of ARHT media location 1400 and mobile application 1412. Similarly, there may be additional components and/or connections that may be included with ARHT media location 1400 or mobile application 1412.

Figure 28:
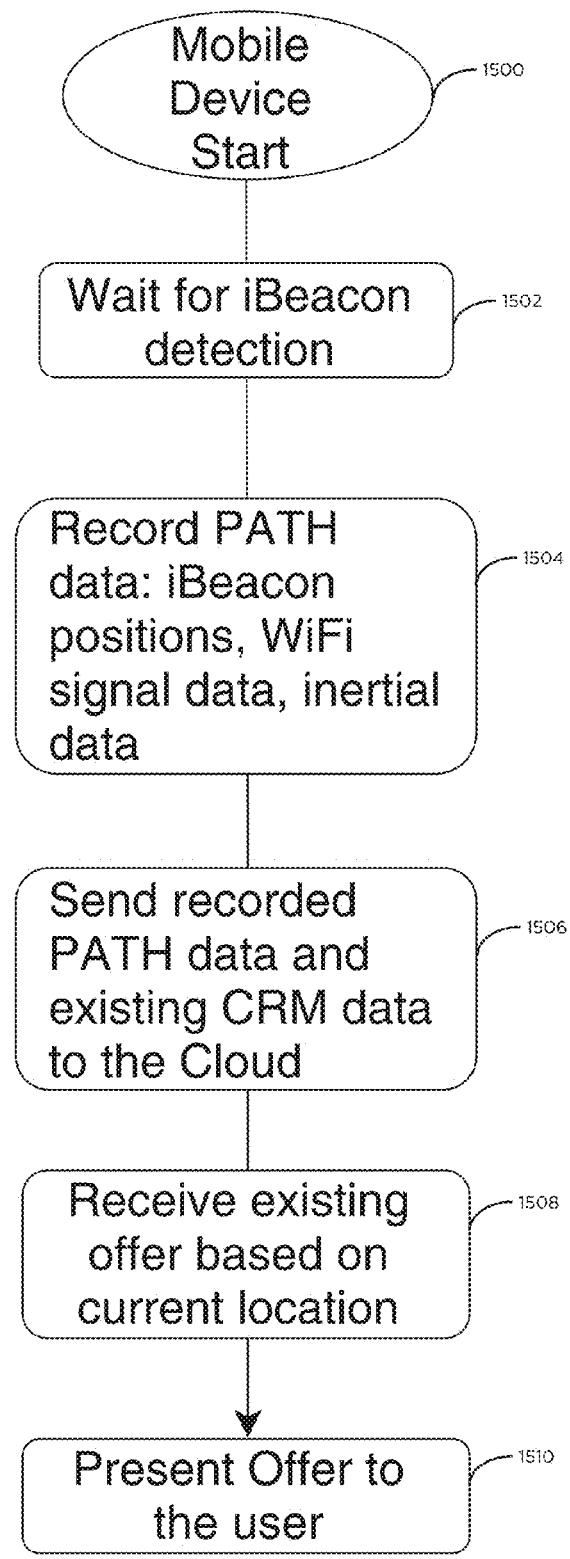
FIG. 28 is a process flow diagram showing a method for implementing beaconing technology in conjunction with targeted advertising on a user's device.

FIG. 28 is a process flow diagram process showing a method for implementing beaconing technology in conjunction with targeted advertising on a user's device in accordance with the disclosed embodiments. The method may be performed when a visitor is within proximity of an ARHT media location 1400 and is carrying a mobile device containing one or more mobile applications 1412. The method starts at step 1500 and proceeds to step 1502, wherein the one or more mobile applications waits for iBeacon detection, such as a signal broadcast from an iBeacon 1406. Once an iBeacon has been detected, the method proceeds to step 1504, wherein position and movement data, including iBeacon positions, Wi-Fi signal data, inertial data, and any other position and movement data and/or combinations thereof, is recorded. In step 1506, the recorded position and movement data, along with CRM data, such as CRM data 1416, is sent to remote storage, such as remote storage 1418. Continuing to step 1508, the mobile application receives an existing offer based on the location of the visitor. Finally, in step 1510, the received existing offer is presented to the user. Offers may consist of advertisements, promotional information, images, videos, sound clips, or any other form of data suitable for display on a mobile device, or any combinations thereof.

Figure 29:
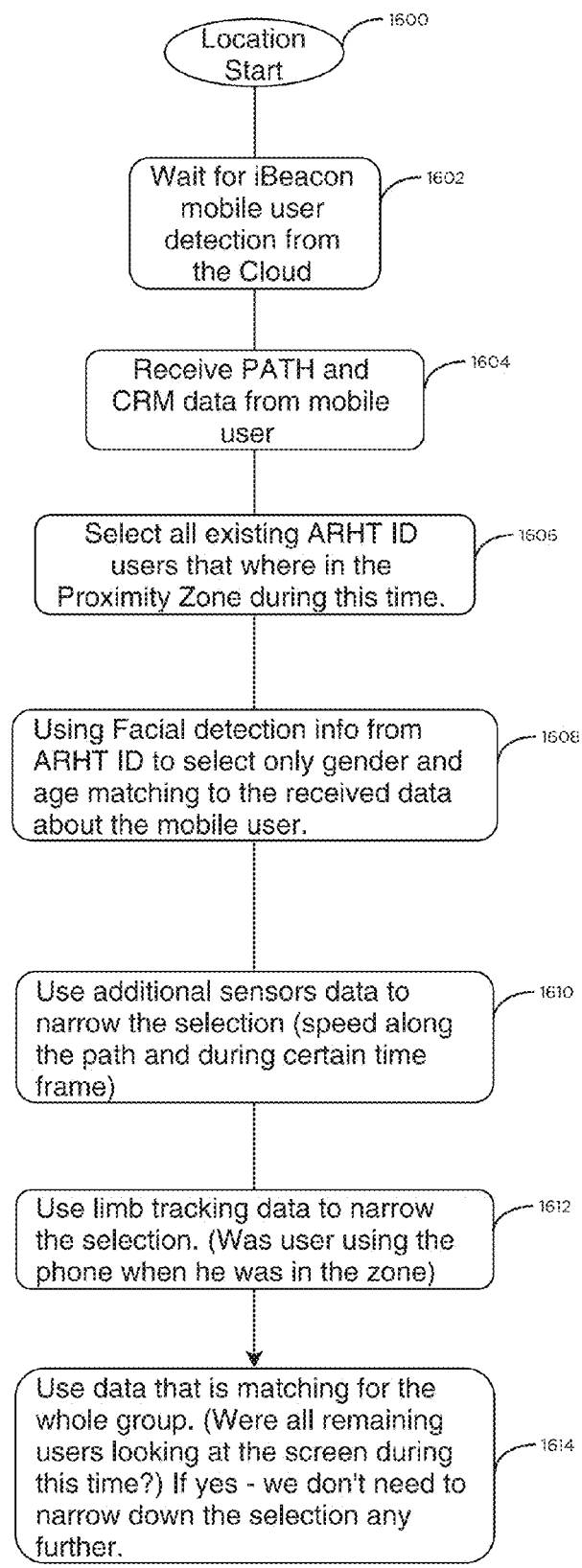
FIG. 29 is a process flow diagram showing a method for implementing beaconing technology in conjunction with generating and providing targeted advertising to a user's device.

FIG. 29 is a process flow diagram showing a method for implementing beaconing technology in conjunction with generating and providing targeted advertising to a user's device in accordance with the disclosed embodiments. The method may be performed when a visitor is within proximity of an ARHT media location 1400 and is carrying a mobile device containing one or more mobile applications 1412. The method starts at step 1600 and proceeds to step 1602, wherein the ARHT engine waits to receive iBeacon mobile user detection from remote storage 1418. Once a mobile user has been detected, the method proceeds to 1604, wherein the ARHT engine receives position and movement data, as well as CRM data, such as CRM data 1416, corresponding to the detected mobile user from remote storage 1418. Next, the ARHT engine selects all existing visitors that are contemporaneously in proximity to the ARHT media location in a step 1606. From the visitors selected in 1606, in step 1608, the ARHT engine uses facial detection information from the proximity data 1404 to determine which of the existing visitors match the age and gender of the detected mobile user, based on the CRM data received. Moving to step 1610, the ARHT engine may use additional sensors, such as sensors 750, to match visitor movement data such as speed or acceleration along a particular path to the movement data of the detected mobile user, in order to further narrow the selection. Subsequently, in step 1612, the ARHT engine may further narrow the selection of matched visitors by using limb tracking data. For example, the ARHT engine may narrow the remaining visitors to those who were using a mobile device while in proximity to the ARHT media location. Finally, the method moves to step 1614, wherein the ARHT engine analyzes any remaining data that may differentiate the narrowed group of visitors. If the remaining data matches the remaining visitors, then the method ends, and one or more proximity matches 1410 have been determined. FIGS. 30-38 are graphical representations of proximity data that is captured based on user interaction with the apparatuses shown in one of FIGS. 4 through 12.

Figure 30:
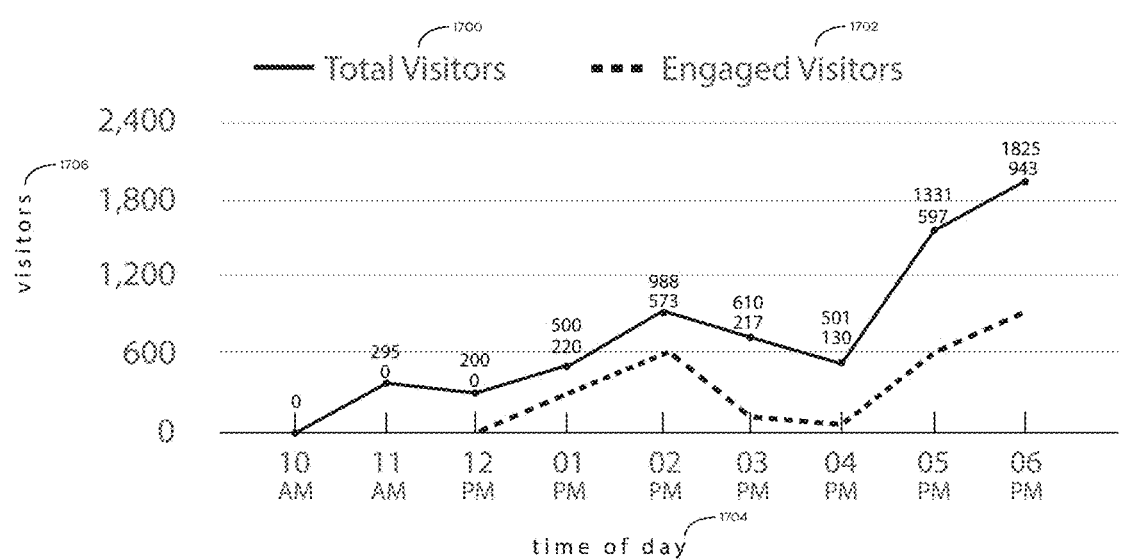
FIGS. 30-38 are depictions of proximity data that is captured based on user interaction with the apparatuses shown in one of FIGS. 4 through 12.

FIG. 30 represents the number of visitors 1706 in proximity to an ARHT media location 1400 at specific times of day 1704. The solid line represents the total visitors 1700, while the dashed line represents engaged visitors 1902 that engaged the AHRT media location by, for example, approaching and watching the display system 1402. As can be seen in FIG. 30, the statistics show that at or around 6:00 pm there were a total of 1825 visitor. FIG. 30 also shows at or around 6 pm there were 943 engaged visitors. ARHT Engine may determine the number of engaged visitors based on whether the visitor's interactions were greater than or equal to the level of interest thresholds. Looking at FIG. 30, the administrator of the system may be able to sell advertisements at different rates based on the time when the number of engaged visitors is the highest, e.g., at 6:00 pm.

Figure 31:
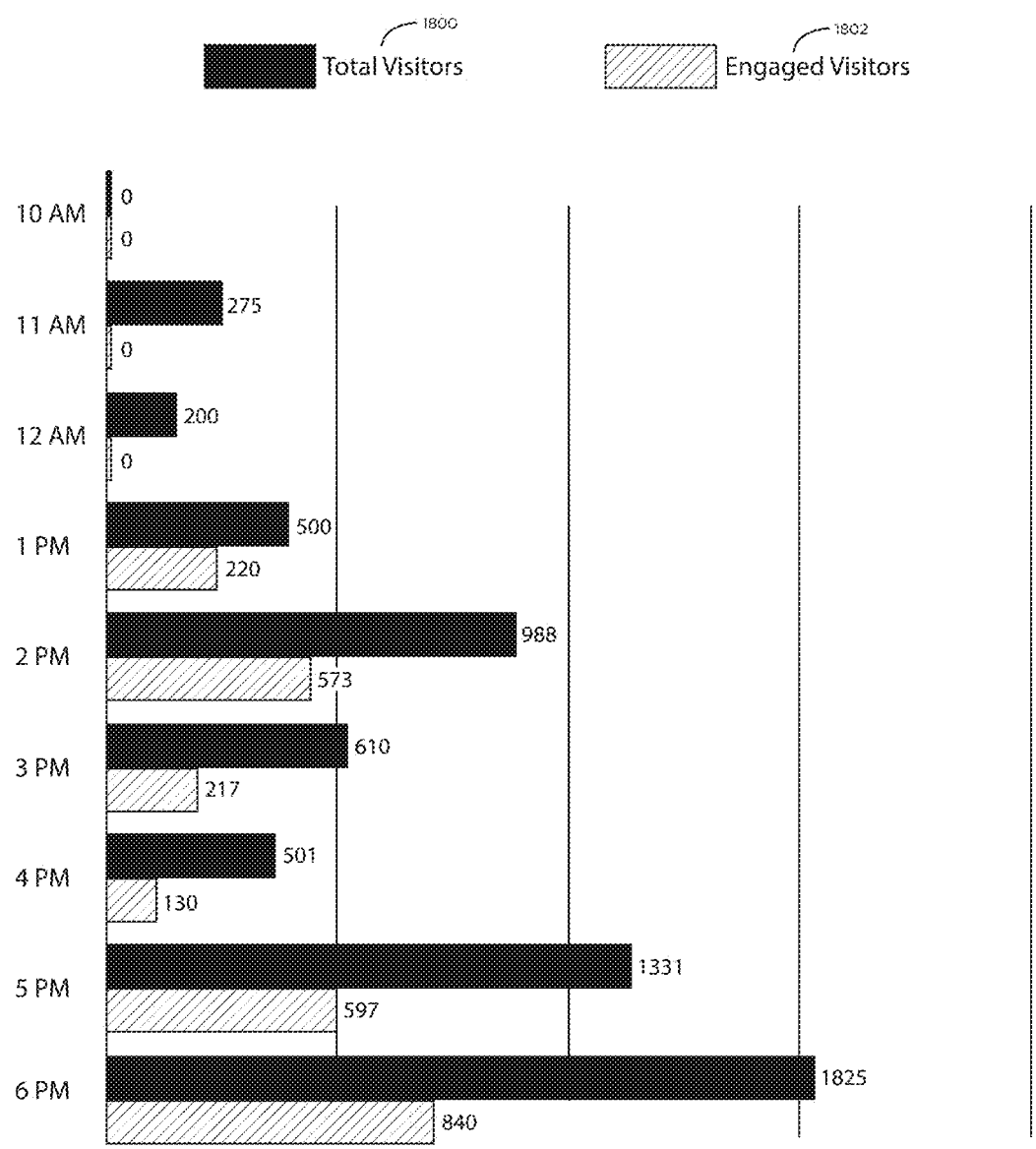

FIG. 31 represents the same data as FIG. 30, in a histogram format. For example, FIG. 31 shows that at or around 5 pm there were a total of 1331 visitors and 597 visitors were categorized as engaged by, for example, ARHT Engine. The engagement may be determined based on the level of interest shown by visitors.

Figure 32:
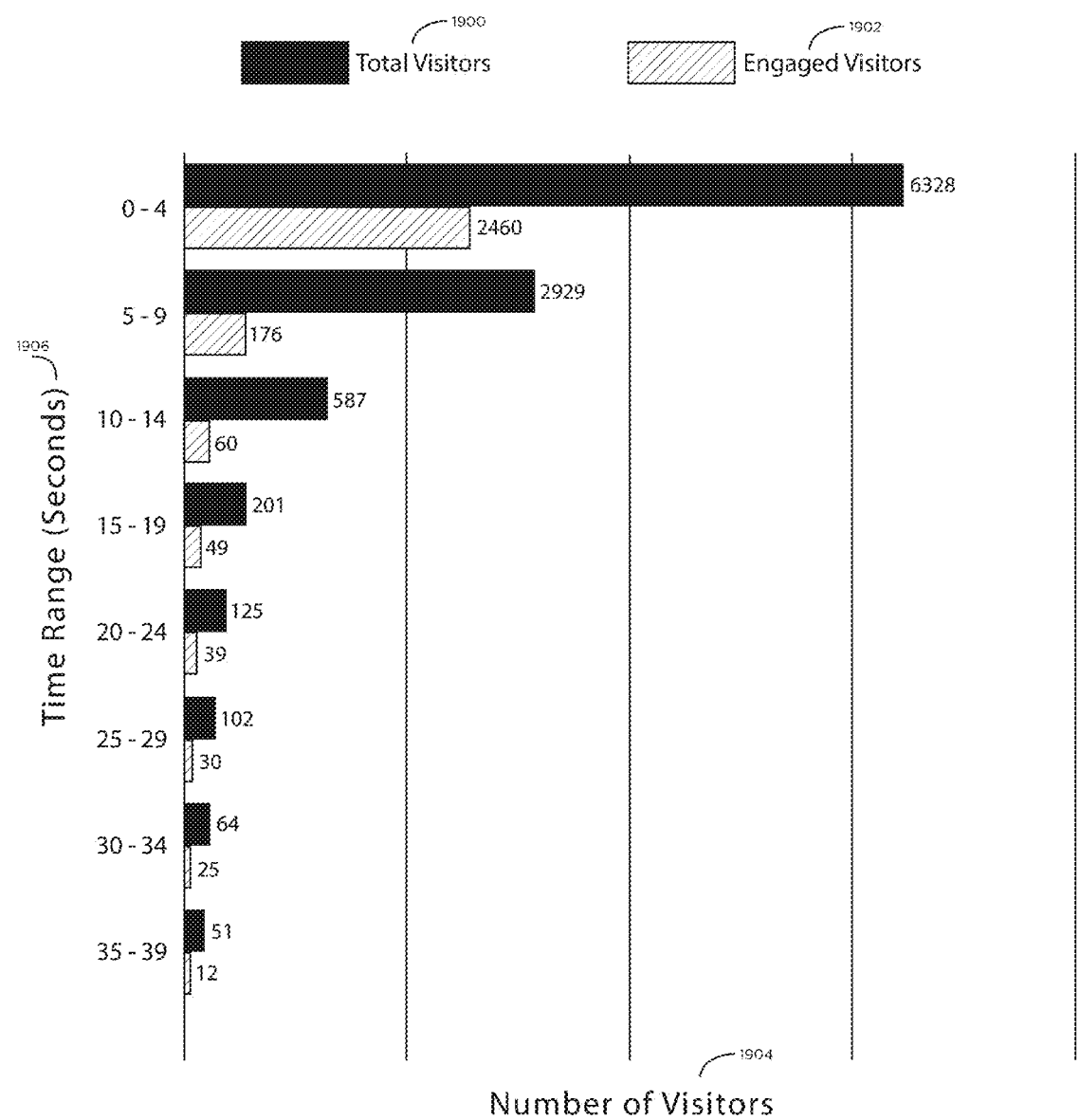

FIG. 32 represents the time range 1906 that visitors in proximity to an ARHT media location 1400 spent in the proximity zone. The number of visitors 1904 is depicted with respect to total visitors 1900 and engaged visitors 1902. For example, FIG. 32 shows that a total of 6328 visitors spent 0-4 seconds in the proximity zone while a total of 2460 engaged visitors spent 0-4 seconds in the proximity zone.

Figure 33:
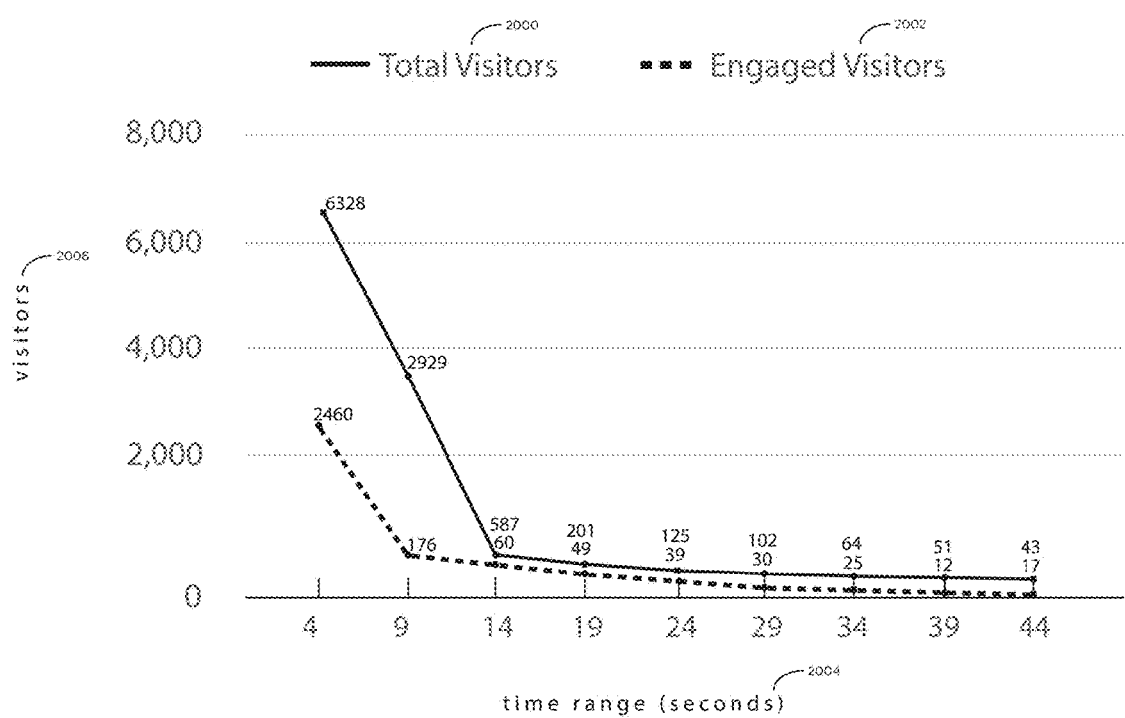

FIG. 33 represents the same data as FIG. 32, in a line graph format. For example, FIG. 33 shows that a total of 2929 visitors spent 9 seconds in the proximity zone and also shows that 176 engaged visitors spent 9 seconds in the proximity zone.

Figure 34:
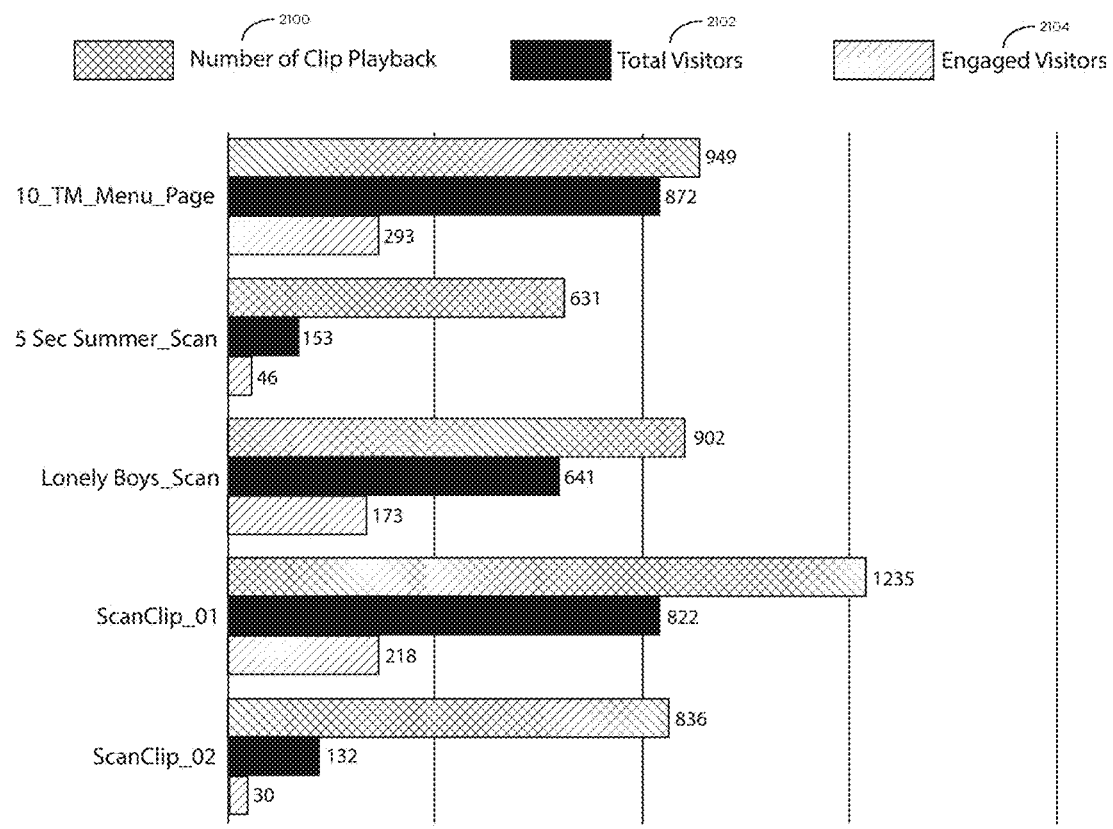

FIG. 34 represents visitor engagement data for scan clips displayed, for example, in a scan cycle as described in FIG. 22. The graph indicates the number of times a clip was played 2100, compared to the total visitors 2102 and engaged visitors 2104. For example, FIG. 34 shows that the clip entitled "Lonely Boys_Scan" was played a total of 902 times. FIG. 34 also shows that this clip was playing when there were 641 visitors in the proximity zone. Further, FIG. 34 shows that 173 visitors were engaged when this clip was being played.

Figure 35:
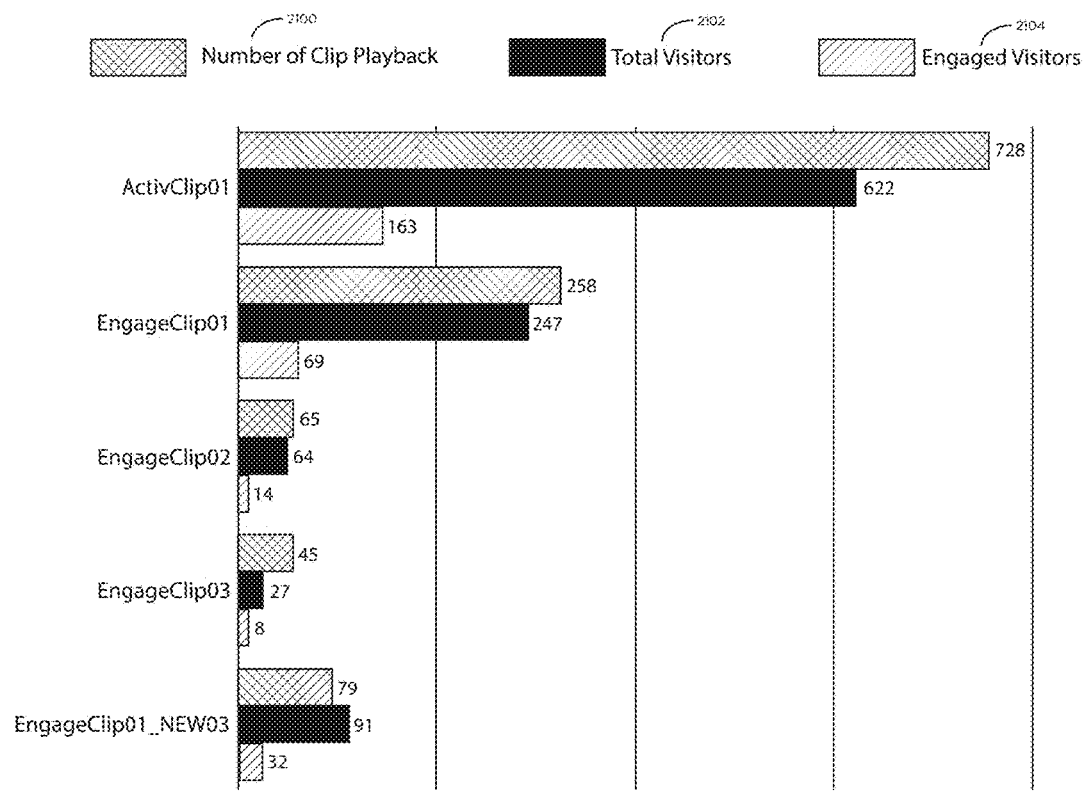

FIG. 35 represents visitor engagement data for activation clips displayed, for example, in an activation cycle as described in FIG. 23. For example, FIG. 34 shows that the clip entitled "EngageClip01" was played a total of 258 times. FIG. 35 also shows that this clip was playing when there were 247 visitors in the proximity zone. Further, FIG. 35 shows that 69 visitors were engaged when this clip was being played.

Figure 36:
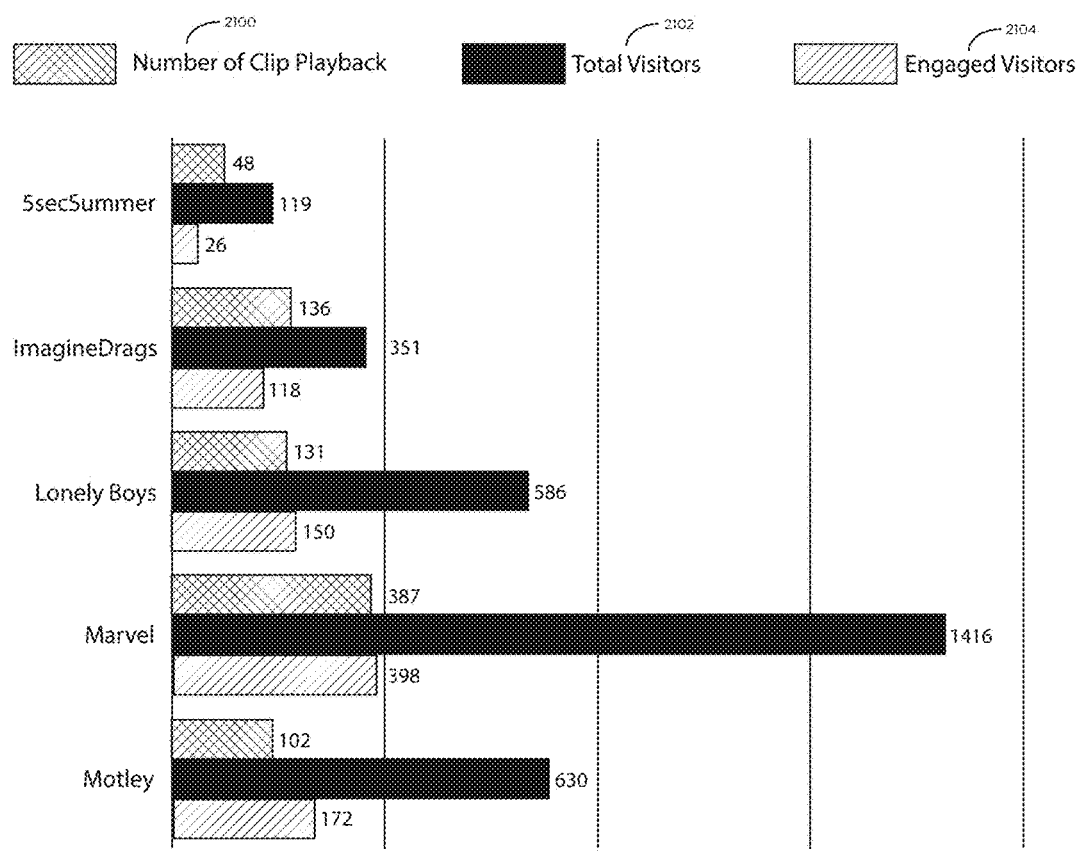

FIG. 36 represents visitor engagement data for influence and conversion clips displayed, for example, in an engagement and conversion cycle as described in FIG. 24. For example, FIG. 36 shows that the clip entitled "Lonely Boys" was played a total of 131 times. FIG. 36 also shows that this clip was playing when there were 586 visitors in the proximity zone. Further, FIG. 36 shows that 150 visitors were engaged when this clip was being played.

Figure 37:
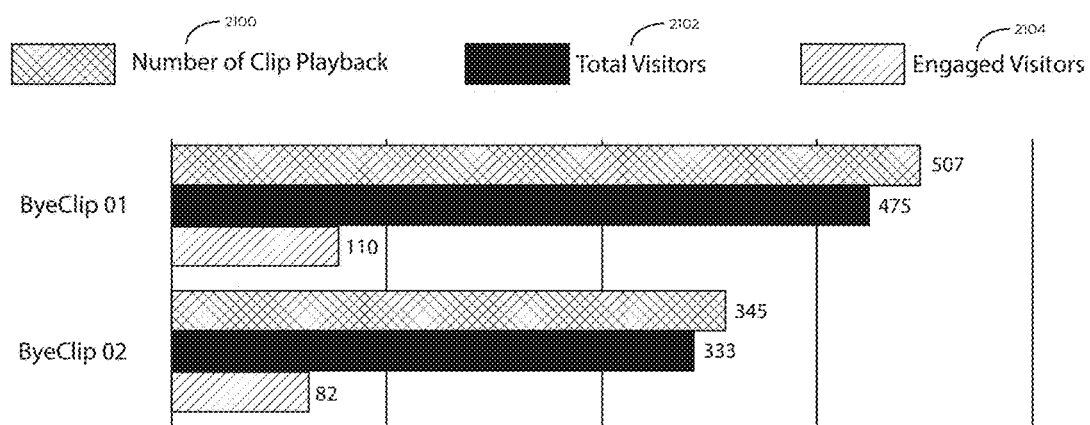

FIG. 37 represents visitor engagement data for exit clips displayed, for example, in step 1016 of FIG. 23 (activation cycle) or step 1124 of FIG. 24 (engagement and conversion cycle). FIG. 37 shows that the clip entitled "ByeClip01" was played a total of 507 times. FIG. 37 also shows that this clip was playing when there were 475 visitors in the proximity zone. Further, FIG. 37 shows that 110 visitors were engaged when this clip was being played.

Figure 38:
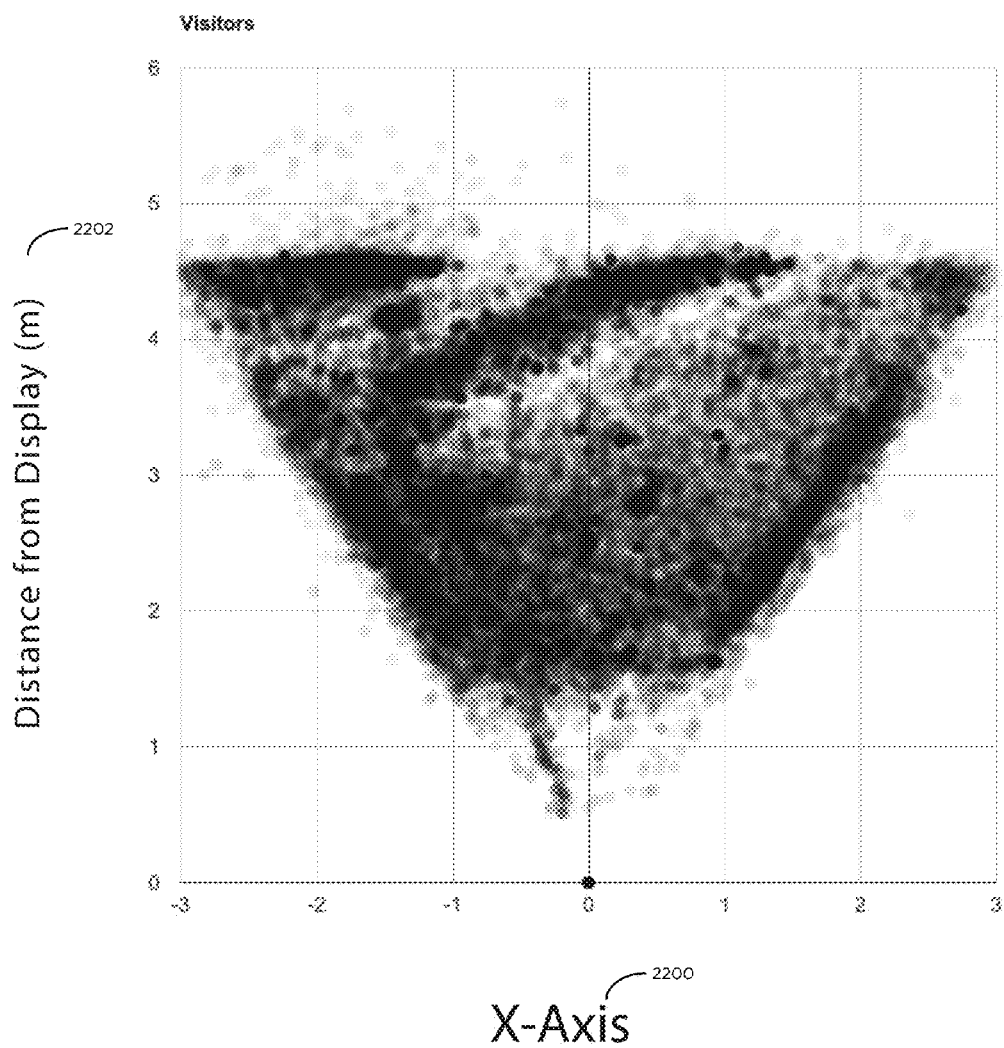

FIG. 38 is a graphical representation of proximity data collected by an ARHT engine 702. The graph depicts an overhead view of an ARHT media location 1400, with a display device 1402 at the origin (0,0) of the graph. The x-axis 2200 depicts the horizontal displacement of visitors from the display device, whereas the y-axis depicts the distance from the display 2202 in meters. The dots represent position information related to where the visitors were standing relative to the ARHT media location 1400.

Proximity statistics and/or reports shown in FIGS. 30-38 may be used by the administrator of the ARHT system and/or for an advertiser for purposes of targeted advertisements. For example, proximity statistics may show the time that the most number of visitors typically engage with or enter the proximity zone. This may be, for example, the time people are leaving work if ARHT system is displayed near a train station and/or a time that a concert of a famous artist is scheduled and the ARHT system is displayed in the venue of the concert. Further, proximity statistics and/or reports may also show the clips that visitors found most engaging. These statistics may be used to create structured advertising rates, such that advertisers may be charged a premium rate if they want to advertise at the time (e.g., 6 pm) when most visitors are estimated to be present in the proximity zone. Similarly, advertisers may be charged a lower rate when fewer visitors are estimated to be present in the proximity zone. Further, advertisers may be charged at a premium rate when they want to advertise while the clip that is estimated to be most engaging is playing. Further, advertisers may be charged at a lower rate when their advertisements are displayed while a clip that is estimated to be least engaging is playing. Proximity statistics and/or reports shown in FIGS. 30-38 may also be used to charge advertisers an additional rate in addition to the base rate when ARHT engine determines that visitors were engaged and/or visitors were present in the proximity zone when the advertisement was displayed. Further, depending upon the agreed upon terms, advertisers may only be charged on instances when there were visitors in the proximity zone and/or when visitors were engaged.

Further, ARHT Engine may use the proximity statistics and/or reports shown in FIGS. 30-38 and advertisements rules to dynamically generate advertisement invoices on a periodic basis (e.g., monthly, quarterly) and may communicate these to the advertisers directly via communication capabilities. In addition, ARHT Engine may print the bills with the reports with mailing instructions and/or may communicate the bills to a system administrator and/or billing department that may then verify he bills prior to communicating them to the advertiser.

The advertisement invoices may include the proximity statistics and/or reports so that the advertiser may be able to verify the billing charges shown in the invoices. The advertisement rules stored in ARHT Engine may be based on default rules set in the storage of ARHT Engine and/or may be selected based on the agreement between the administrator and the advertiser. For example, the advertising rules may be based on one or more of the following factors:

Number of visitors in proximity zone
  Number of engaged visitors
  Time duration spent in the proximity zone by visitors Time duration spent in the proximity zone by engaged visitors Popularity of clip being played during the display of advertisement An exemplary equation representing the method of determining billing charges using proximity statistics and advertising rules is included below:

$$\text{Billing Charge} = W_1(BR) + W_2(PR_{based\ on\ advertising\ rule})$$

Here "$W_1$" and "$W_2$" represent weight factors while "BR" represents a base rate and "PR" represents a premium rate. The weight factors may be any number depending on the agreement with the advertiser. For example, the weigh factor may be selected from 0-10. In addition, the BR and PR may be negotiated between the advertiser and the administrator of the ARHT system. Further, PR may be based on one or more of the advertising rules. For example, some advertisers may only pay a premium rate based on number of engaged visitors while other advertisers may pay a premium rate for number of visitors in proximity zone and number of engaged visitors. Further, multiple premium rates may be charged depending on the number of advertising rules that are selected by the advertiser.

ARHT Engine may be configured to dynamically select advertising rules when playing the advertisements of a particular advertiser and may change the advertising rules as the advertisements are being changed. For example, the advertisements may be assigned advertisement identifiers and may be associated in a database with advertiser identifiers that may be unique identifiers and/or account numbers identifying the advertiser. For example, the following table shows an exemplary database structure that may be stored in, local database 706 and/or remote storage 756. ARHT Engine 702 may access the following table while selecting advertisements and/or while generating bills for a particular advertiser. It may be understood that additional or fewer fields may also be included in the database table.

TABLE 1

| Advertiser Identifier | Advertisement Identifier | Account Number | Adverting Rules | Billing Charge |
|---|---|---|---|---|
| TH45778 | Artist1, Clip3 | 58795287 | [$W_1$, $R_1$, BR, PR] | Equation 1 |
| AQ78656 | Prodcut2 | 58556786 | [$W_1$, $W_2$, $R_2$, BR] | Equation 2 |

Table 1 shows that the advertisers may be assigned an advertiser identifier that may be used by ARHT Engine to determine the identity of the advertiser. This may also assist ARHT Engine in determining which advertisement to select for display. For example, upon identifying that the advertiser is "Tim Horton's" based on the advertiser identifier, ARHT Engine may select "Clip3" for display depending on information related to the visitor that is in the proximity zone. Further, when generating a bill for Tim Horton's, ARHT Engine may use the account number, advertising rules, and billing charge fields to calculate advertising charges. For example, advertising rules may include the value of the weight factors, value of the base rate, value of the premium rate (if applicable) and rules $R_1$, $R_2$, or $R_3$ etc. Rules $R_1$, $R_2$, or may indicate whether a premium rate applies and/or the number of advertising factors that may be met (e.g. time duration, type of clip) before the premium ate applies. Table 1 may also include a field for "Billing Charge" that may include the precise equation used to calculate a charge by applying the Advertising Rules including in table 1. Equation 1 may be, for example, Billing Charge=$W_1$(BR)+$W_2$ ($PR_{based\ on\ advertising\ rule}$).

Further, ARHT Engine 702 may also be configured to receive an indication of payment by the advertisers. For example, ARHT Engine 702 may receive a confirmation from the system administrator and/or from the financial institution or advertiser that an outstanding invoice has been paid. If ARHT Engine 702 does not receive such an indication, ARHT Engine 702 may be configure to suspend displaying advertisements associated with an advertiser identifier after a grace period of certain number of days and may generate and communicate a notification indicating that the advertisements have been suspended. Upon receipt of confirmation of the payment, ARHT Engine 702 may resume displaying of the advertisements. All of the processes related to billing may be performed by ARHT Engine 702 dynamically and without user intervention.

Thus, ARHT Engine 702 may be used to dynamically and accurately generate and communicate advertising invoices. This may provide the advantage of conserving administrative resources required in generation, communication, and collection of advertising invoices.

Reports including the statistics shown in FIGS. 30-38 may be generated periodically by ARHT Engine and/or may be displayed on demand whenever an administrator of the system logs into the system by providing his/her log in credentials. Different reports may be made available to the system administrators based on the rights they have been assigned. For example, someone with restricted rights may be only able to access or download these reports but a user with administrative rights may be able to modify the criteria (e.g., track statistics per minute or per three hours instead of one hour) that is used to generate these reports. In addition, these proximity statistics may be transmitted to remote storage or a user that is located remotely from the ARHT Engine that is capturing and generating these statistics. The remote storage may include a database management system that may be used to provide access rights to users. For example, the system may have an access control subsystem that may include a plurality of user entries representing users seeking access to data items, where each of the user entries has at least one organizational access attribute. The data stored in the underlying database has a plurality of data items. Each of the data items may be a data file, a data field within a data file, or a view of a data items. Selected ones of the data items have at least one organizational access attribute. This organizational attribute is used by the access control subsystem. The access control subsystem receives a database query from a user requesting access to one or more of the data items. The access control subsystem reads the user's organizational access attributes, and reads the data item's organizational access attributes. The access control subsystem then presents data items to the user to which the user has access authorization.

The database access system may utilize a division of the data "owners" either (1) hierarchically, that is vertically, with horizontal divisions in branches, or (2) horizontally, that is, separate virtual databases. The database itself may be divided into files, the files are divided into records within the files, and individual records are divided into fields. In either mode of division, (hierarchically or horizontally) the schema and metadata data needed would be sophisticated, and user access is based upon user's relationship to one or more owners in the hierarchy. (For example, owners could be independent lessees of database capacity or divisions in a multi-divisional enterprise).

The database may also be based on a multi-organization support system that may include attributes called "organization" and "organization team" visibility where an entire division may be given equal rights. In the multi-organization support system, the records that a user sees with "organization" and "organization team" visibility are restricted based upon the organization(s) that the user has been given visibility into, while the ones the end user sees with "position" and "position team" visibility are restricted based upon the user's current position. While there may be some overlap between "organization" attributes and "position" attributes, they may confer different rights. For example, "organization" attributes may only confer "read" authorization, while "position" attributes may confer "read," "write", and "delete" authorization. The "organization" and "organization team" visibility is used in a series of "My Organization's" views that show all of the data that the user's organization has been granted visibility to. In this way, multiple organizations can share the same database but see a partitioned set of data that is pertinent to them. It is also to be understood, that there may be inheritance of access up and down and across a hierarchy.

One access attribute specifies the visibility attributes of the higher level organization, for example a division. This means that the number of distinct organizational partitions will be relatively small compared to the overall number of divisions in the hierarchy. Also, organizational partitions should be relatively high in the hierarchy. Therefore, most of the lower level entities in a large enterprise, for example a domestic marketing division of a large international enterprise may reference the US division as their visibility organization. This would enable all people who work for any of those lower level product or marketing organizations to see the same partition of data.

The relationship between divisions and positions is normally a 1-to-many relationship, although the system and method of our invention can support a many-to-many relationship. That is, a position belongs to exactly one division. If a user needs to have access to data in multiple organizations, then the user would be required to have positions in the appropriate organizations, or, in an alternative embodiment of our invention, to have personal or positional access to the data separate and apart from but in addition to his or her organizational access to the data. This could be done by having positions specifically for granting visibility to users outside of the organization.

Single organization ownership is added to an entity by adding a foreign key to the owning organization and configuring the business component appropriately. Organization teams are added to an entity by adding an intersection table between that entity and organization and a foreign key to the primary owning organization, and configuring the business component appropriately.

During login, while the system is collecting information about the positions a user is associated with, the system looks at the user's division or divisions and collects the set of organizations those divisions have visibility into. If a user has n positions, that is, n positional attributes, the user will have between 1 and n organizations for visibility.

The organization and organization team visibility's are used for "My Organization's" views to show the user all of the records for the entity where the user's "current" organization is either the owner, or on the organization team. The user's "current" organization will be the visibility organization assigned to the division of the user's "current" position. When a user changes current position, the "current" organization will be changed automatically.

Figure 39:
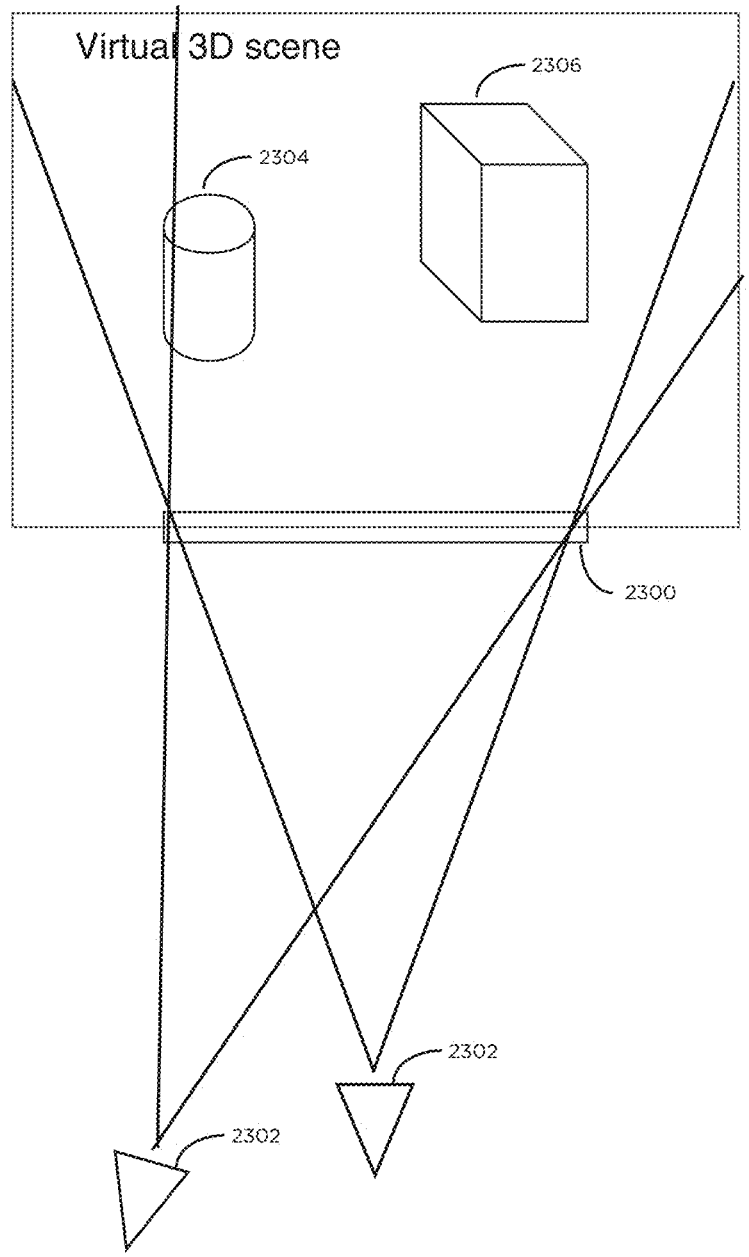
FIG. 39 is a block diagram showing the implementation of head tracking techniques in the apparatuses shown in one of FIGS. 4 through 12.

FIG. 39 is a block diagram showing the implementation of head tracking techniques in, for example, the apparatuses shown in one of FIGS. 4 through 12. The diagram depicts the use of head tracking to create a pseudo three dimensional (3D) effect on a display 2300. The display 2300 may include two screens, and may be any one of the systems disclosed in, for example, FIGS. 4-13 and may be used to present a three dimensional (3D) image.

Figure 40:
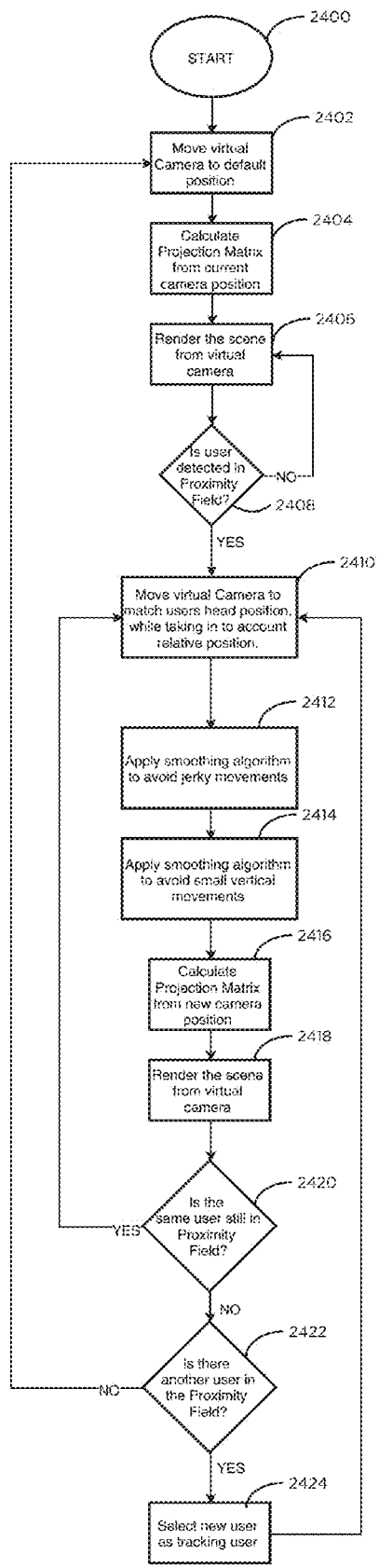
FIG. 40 is a process flow diagram process showing a method for implementing head tracking techniques in accordance with the disclosed embodiments.

Virtual cameras 2302 represent the actual position of a viewer of the display 2300. For example, in one embodiment, a viewer may interact with an ARHT media location 1400 by approaching the display 2300. As the viewer moves in the proximity of the display, an ARHT engine 702 may calculate the visitor's position based on proximity data and/or position and movement information data received from the visitor's mobile device, as described in FIGS. 27-29. Based on this location, an ARHT engine 702 may use the position of the virtual camera 2302 to calculate a projection matrix, which will then be used in rendering a virtual three dimensional (3D) scene from the perspective of the virtual camera 2302, which will then be shown on display 2300. For example, as the visitor moves in relation to the screen, different areas of the virtual 3D scene may become visible, as is illustrated by the differing fields of view emanating from virtual cameras 2302, resulting in different perspective views of cylindrical object 2304 and cubic object 2306 shown on display 2300. FIG. 40 is a process flow diagram showing a method for implementing head tracking techniques in accordance with the disclosed embodiments. The method starts at step 2400, and continues to step 2402, wherein the virtual camera, such as virtual camera 2302, is moved to a default position. For example, the virtual camera may be moved to a position that is directly in the center of the display 2300, at a fixed default distance away from the display. Next, a projection matrix is calculated from the current camera position (the default position) in step 2404. Using the calculated projection matrix, in step 2406 the virtual three dimensional (3D) scene is rendered. At step 2408, it is determined whether a visitor is within the proximity of an ARHT media location. If not, the method loops back to step 2406, wherein the virtual 3D scene is re-rendered, using the same virtual camera position and corresponding projection matrix as was previously used. If a visitor is within the proximity field, the method moves to step 2410.

In step 2410, the virtual camera position is moved to match the visitor's head position, taking in to account the visitor's position relative to the display 2300. At step 2412, a smoothing algorithm is applied to avoid abrupt movement artifacts in the positional data. The smoothing algorithm may be implemented as a moving average, additive smoothing, a Kalman filter, or any other suitable smoothing algorithm. Moving to step 2414, a smoothing algorithm is applied to avoid small vertical movements in the positional data. Next, at step 2416, a projection matrix is calculated from the virtual camera position corresponding to the visitor's head position, after processing by the smoothing algorithms in steps 2412 and 2414. At step 2418, using the calculated projection matrix, the virtual three dimensional scene is rendered.

Moving to step 2420, it is determined whether the same visitor that was detected in step 2408 remains in proximity to the ARHT media location. If the same visitor is still in proximity, the method loops back to step 2410, wherein the virtual camera position is moved to match the visitor's head position. Further, steps 2412 through 2420 are repeated, and step 2420 once again checks to determine whether the same visitor remains in proximity.

If the same visitor that was detected in step 2408 is no longer in the proximity field, the method moves to step 2422, wherein it is determined whether there is another visitor in proximity of the ARHT media location. If so, the method advances to step 2424, where the newly detected visitor is selected as the tracking visitor for purposes of the FIG. 40 method. After the new visitor is selected, the method returns to step 2410, wherein the virtual camera position is moved to match the new visitor's head position. Further, steps 2412 through 2420 are repeated, and step 2420 once again checks to determine whether the new visitor remains in proximity. If no new visitors are detected in step 2422, the method loops back to step 2402, wherein the virtual camera is moved to the default position.

As will be understood, the head tracking techniques described in FIGS. 39 and 40 may be applied in rendering a three dimensional image for display on a single display, using stereoscopic techniques as known in the art. For example, a 3D image can be generated using an image and a depth map of a scene, captured by an imaging device, such as the video capture component 752 and sensors 750 described in FIG. 15. The image may be an RGB image, and may be considered to be the midpoint between a right side view of the scene and a left side view of the scene. The depth map may include distances between the imaging device and objects within the scene.

The image and the depth map may be captured by an imaging device that is built into a computing device, such as ARHT engine 702, or by an imaging device that is communicably coupled to the computing device, such as through remote storage 756. The imaging device may be any type of camera or device that is configured to capture the image and the depth map of a scene.

To generate the three dimensional image, a right side image of the scene must first be generated using the image and the depth map. This may be accomplished by calculating the appropriate location of each pixel within the image as viewed from the right side. Each pixel within the image may be moved to the right or the left based on the depth location of the pixel. A left side image of the scene must also be generated using the image and the depth map. This may be accomplished by calculating the appropriate location of each pixel within the image as viewed from the left side. Each pixel within the image may be moved to the right or the left based on the depth location of the pixel.

The following code fragment may be used to generate the right side image and the left side image of the scene:

```
void convertTo3D(bitmap source, bitmap dest, float pixelsToMovePerMeter, float centerplane)
{
  for each pixel in source {
    float thisPixelDepth=GetDepthForPixel(pixel.row, pixel.column)
    float thisPixelDeltaFromCenterPlane=(centerplane-thisPixelDepth)/100//in meters
    int pixelsToShiftToRight=thisPixelDeltaFromCenterPlane*pixelsToMovePerMeter
    ReadPixelFromSourceImage( . . . )
    WritePixelToDestImage(move the pixel pixelsToShiftToRight)
  }
}
```

The above code fragment may be applied to the image twice to generate both the right side image and the left side image. For the generation of the right side image, the parameter pixelsToMovePerMeter is negative, since pixels are to be moved in the reverse direction for the right side image as opposed to the left side image.

The right side image and the left side image generated by the above code fragment are combined to generate a 3D image. The right side image and the left side image may be combined according to the characteristics of the 3D display technology on which the 3D image is to be displayed. For example, for a 3D television, the two images may be shown side by side with shrunken widths. Thus, a number of different 3D images may be generated, depending on the types of 3D display technologies that are to be used.

The 3D images that may be generated according to the method may be viewed using any type of 3D display technology. For example, the 3D images may be displayed on a computer monitor, television, stereoscopic 3D display, camera, projector, virtual reality display, mobile device, or any other form of display. Further, in some embodiments, 3D glasses may be used to view the 3D images on the 3D display technology.

Figure 41:
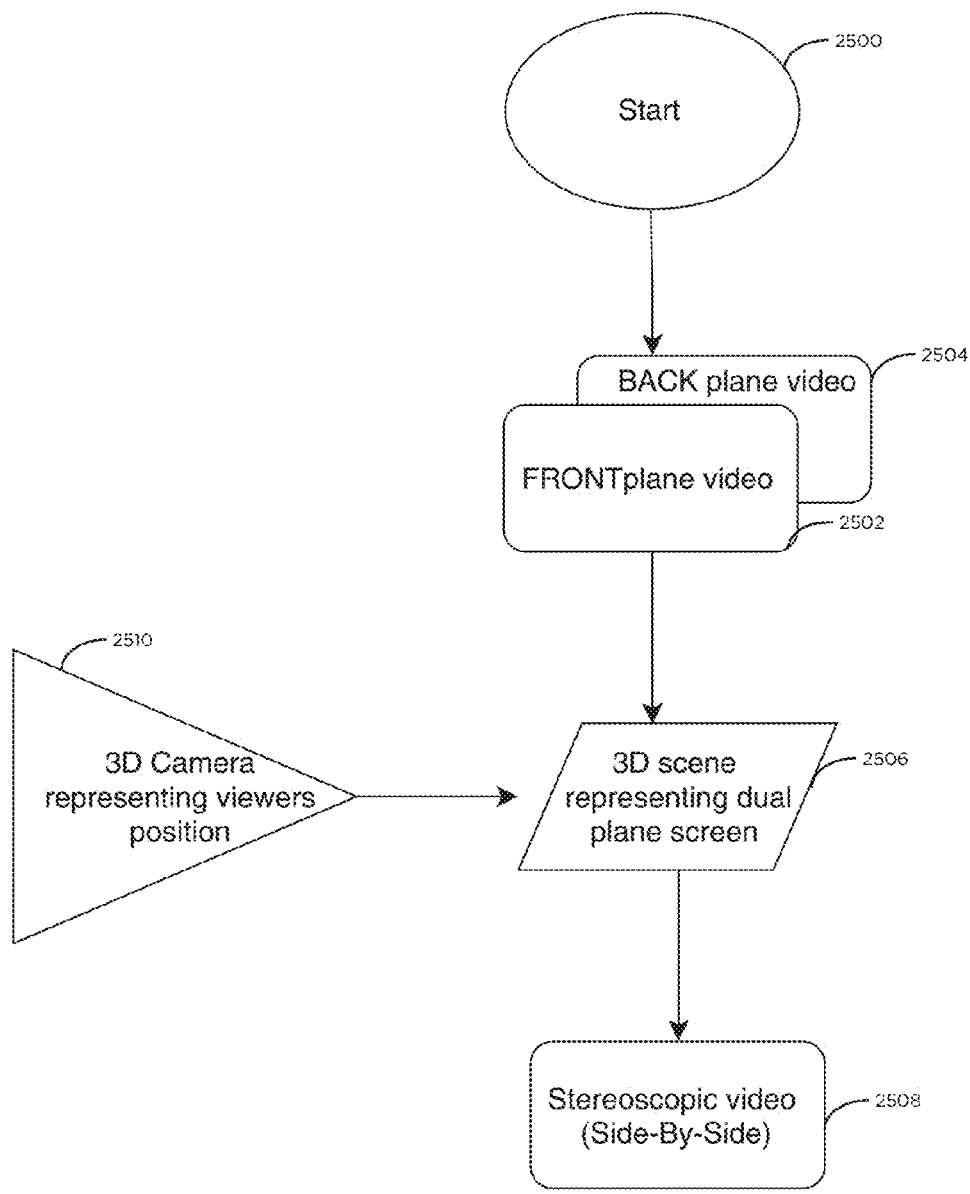
FIG. 41 is a process flow diagram showing a method for generating and adjusting a three dimensional (3D) image in accordance with the embodiments disclosed herein.

FIG. 41 is a process flow diagram showing a method for generating and adjusting a three dimensional (3D) image in accordance with the embodiments disclosed herein. The method begins at step 2500, and advances to steps 2502 and 2504, which represent the front plane video and back plane video, which may correspond to the video displayed on the front and background displays disclosed in, for example, FIGS. 4-13. In step 2506, a 3D scene representing the dual plane screen is rendered as viewed from the position represented by 3D camera 2510. The 3D scene 2506 may be rendered in accordance with the method described in FIG. 40. Finally, in step 2508, the 3D scene representing the dual plane screen is converted to stereoscopic video, which is suitable for display on a variety of 3D display technology, such as a computer monitor, television, stereoscopic 3D display, camera, projector, virtual reality display, mobile device, or any other form of display. Further, in some embodiments, 3D glasses may be used to view the 3D images on the 3D display technology.

Conversion of a dual plane image to a stereoscopic image may enable a variety of use cases. For example, in one embodiment, a stereoscopic image of a presenter may be generated in the context of holo-porting as described in FIG. 14. Using the conversion techniques described, each audience member can experience his/her own 3D video feed from a remote location, using any suitable 3D display technology. This approach could result in significant cost savings for travel when used, for example, in the context of training presentations or retreats. Rather than requiring all audience members to travel to a single location, each audience member may instead remotely view the presentation from any location.

In some embodiments, the stereoscopic image may be shown on a display within a wearable device, such as glasses, a headset, a helmet, or any form of virtual reality display. The wearable device may contain sensors capable of communicating positional data to an ARHT engine 702, enabling the ARHT engine to adjust a virtual camera as described in FIGS. 39 and 40 to correspond to the wearer's position. This configuration, among others, may create an immersive, virtual reality-like experience, enabling viewers to feel as if they are collocated with the presenter.

Further, in some embodiments, a wearable device or other display system may incorporate a bookmarking feature. Such a feature would allow the viewer to indicate that he/she wishes to flag, or bookmark, a particular section or sections of a presentation for further review. A bookmarking feature may work in conjunction with an ARHT engine 702, wherein a user requesting to bookmark a section of a presentation may have his/her request communicated to and stored in remote storage 756.

A wearable device or other display system may similarly incorporate social networking features. For example, several users may bookmark the same or similar portions of a certain presentation. This information may be communicated to remote storage 756 with the user's unique identifier or iBeacon information. ARHT engine 702 may process the bookmark data, and communicate to each user who bookmarked the same or similar portions of a certain presentation the identities of those other users who bookmarked that material. ARHT engine 702 may also update the user's stored profile based on the bookmark information. This same technique may be applied using a variety of data gathered and stored in remote storage 756, including presentations viewed, location data, CRM data, and any other data that may be gathered.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

Moreover, use of the terms "he", "him", or "his", is not intended to be specifically directed to persons of the masculine gender, and could easily be read as "she", "her", or "hers", respectively.

What is claimed:

1. A three-dimensional image simulation device, at a first location, for managing a live event, comprising:
   an image capturing device for capturing live captured data corresponding to a presenter;
   a processor for generating, in real-time, hologram data based on the live captured data;
   an output interface for broadcasting the hologram data in real-time to at least one additional location containing an audience, wherein the hologram data is used to create a hologram of the presenter at the at least one additional location based on an apparent parallax effect in a simulated three-dimensional display device, the hologram creating a three-dimensional illusion for the audience regarding actual presence of the presenter at the at least one additional location;
   an input interface for receiving audience data from the at least one additional location regarding interaction between the hologram and the audience; and
   a display device for displaying at least one image based on the audience data to the presenter,
   wherein the at least one additional location includes a second location that is different from the first location, and a third location that is different from both the first and second locations, and
   wherein the processor is configured to:
   generate and display additional images representing the audience to the presenter based on the received audience data; and
   modify parameters for generating the hologram responsive to receiving the received audience data, wherein the modified parameters for generating the hologram lead to generation of the hologram which gives the impression to an audience member in the audience that the presenter is directly looking at the audience member when that person is being addressed by the presenter by looking at displayed generated additional images.

2. The three-dimensional image simulation device of claim 1, wherein the hologram data is broadcasted simultaneously to both the second and third locations, and audience data is received at the first location from both the second and third locations.

3. The three-dimensional image simulation device of claim 1, wherein the three-dimensional display device comprises a front display device and a background display device, wherein the front display device comprises a transparent front display device, arranged to display a first image of a first program material which is to be observed by a viewer, and the background display device arranged to display a second image of a second program material which is to be observed by a viewer, wherein the front display device and the background display device are separated to provide the apparent parallax effect between the first image and the second image.

4. The three-dimensional image simulation device of claim 3, wherein the first program material and the second program material are edited and synchronized one with the other so that the images from the background display device appear to be interrelated to, or merge into, the program material on the front display device, and thus provide a simulated 3D viewing experience.

5. The three-dimensional image simulation device of claim 4, wherein the processor is configured to:
   provide first program material to be displayed on a front display device of the simulated three-dimensional display; and
   provide second program material to be displayed on a second display device of the simulated three-dimensional display, wherein the first and the second program material are edited and synchronized one with the other so that the images from the background display device appear to be interrelated to, or merged into, the program material on the front display device.

6. The three-dimensional generation device of claim 1, wherein the first location is a studio where the presenter is present and the at least one additional location is a venue used to hold audiences and host events.

7. A method for managing a live event from a first location, comprising:
   capturing, at the first location, live captured data corresponding to a presenter;
   generating, in real-time, hologram data based on the live captured data;
   broadcasting the hologram data in real-time to at least one additional location containing an audience, wherein the hologram data is used to create a hologram of the presenter at the at least one additional location based on an apparent parallax effect in a simulated three-dimensional display device, the hologram creating a three-dimensional illusion for the audience regarding actual presence of the presenter at the at least one additional location;
   receiving audience data from the at least one additional location regarding interaction between the hologram and the audience;

generating and displaying additional images representing the audience to the presenter based on the received audience data; and modifying parameters for generating the hologram responsive to receiving the received audience data, wherein the modified parameters for generating the hologram lead to generation of the hologram which gives the impression to an audience member in the audience that the presenter is directly looking at the audience member when that person is being addressed by the presenter by looking at displayed generated additional images, and wherein the at least one additional location includes a second location that is different from the first location, and a third location that is different from both the first and second locations.

8. The method of claim 7, wherein the at least on additional location includes a second location that is different from the first location, and a third location that is different from both the first and second locations.

9. The method of claim 8, further comprising:

simultaneously broadcasting the hologram data to both the second and third locations; and receiving audience data at the first location from both the second and third locations.

* * * * *